United States Patent [19]

Phillips

[11] Patent Number: 5,103,715
[45] Date of Patent: Apr. 14, 1992

[54] POWER STEERING SYSTEM

[75] Inventor: Edward H. Phillips, Middletown, Calif.

[73] Assignee: Techco Corporation, Birmington, Mich.

[21] Appl. No.: 412,530

[22] Filed: Sep. 26, 1989

Related U.S. Application Data

[63] Continuation-in-part of Ser. No. 324,903, Mar. 17, 1989, Pat. No. 4,922,803.

[51] Int. Cl.$^5$ .............................................. F15B 9/10
[52] U.S. Cl. ............................................... 91/375 A
[58] Field of Search ........................ 91/375 R, 375 A; 384/108

[56] References Cited

U.S. PATENT DOCUMENTS

| | | | |
|---|---|---|---|
| 3,408,900 | 11/1968 | Tomita | 91/375 A |
| 3,657,967 | 4/1972 | Suzuki | 91/375 A |
| 3,705,751 | 12/1972 | Dee | 384/108 |
| 4,300,594 | 11/1981 | Bacardit | 91/375 R |
| 4,458,580 | 7/1984 | Masuda et al. | 91/375 R |
| 4,461,321 | 7/1984 | Bacardit | 91/375 R |
| 4,465,098 | 8/1984 | Bacardit | 91/375 R |
| 4,594,936 | 6/1986 | Bacardit | 91/375 R |
| 4,651,622 | 3/1987 | Yoshida | 91/375 R |

Primary Examiner—Edward K. Look
Assistant Examiner—F. Daniel Lopez
Attorney, Agent, or Firm—Harness, Dickey & Pierce

[57] ABSTRACT

An improved power steering system in which the ratio of output force to input torque is variable. The power steering system includes an input shaft as well as an inner valve member and an outer valve member which are able to generate hydraulic fluid pressure in response to the input torque. A rack assembly is provided for generating the output force in response to the hydraulic fluid pressure generated in response to the input torque. The improved power steering system further includes a pinion shaft which mechanically communicates with the rack assembly and provides a reference position for the improved power steering system. A torsion bar compliantly couples the inner valve member to the pinion shaft, a twist angle of the torsion bar serving to provide a position error signal to the improved power steering system. Finally, a torsion bar extension compliantly couples the torsion bar to the input shaft.

10 Claims, 33 Drawing Sheets

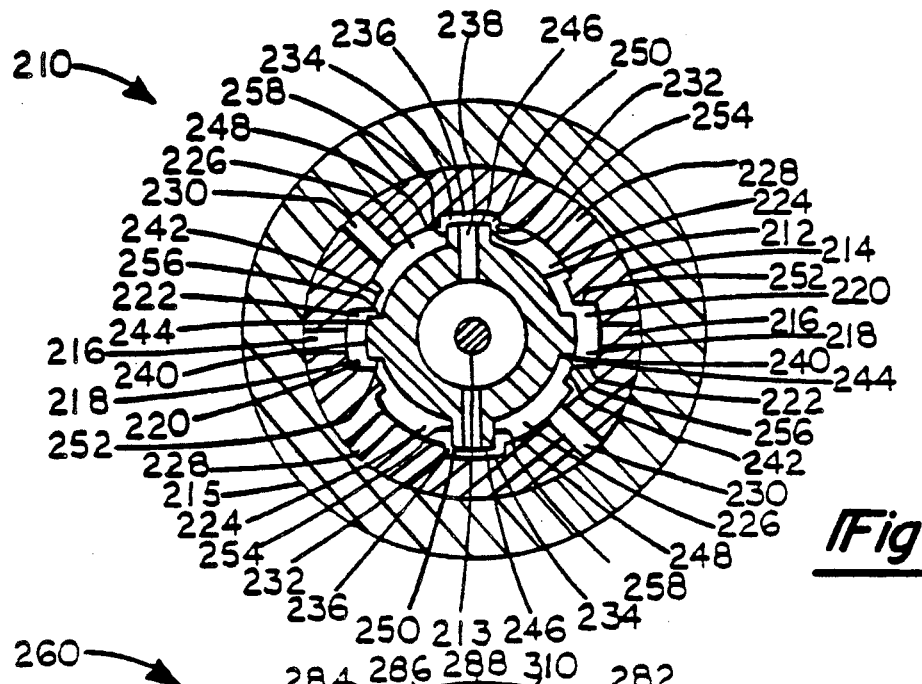
*Fig-1*
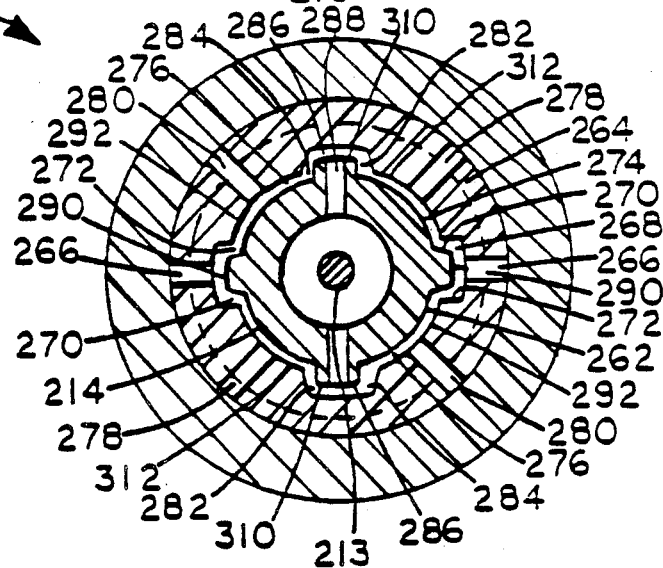
*Fig-2A*
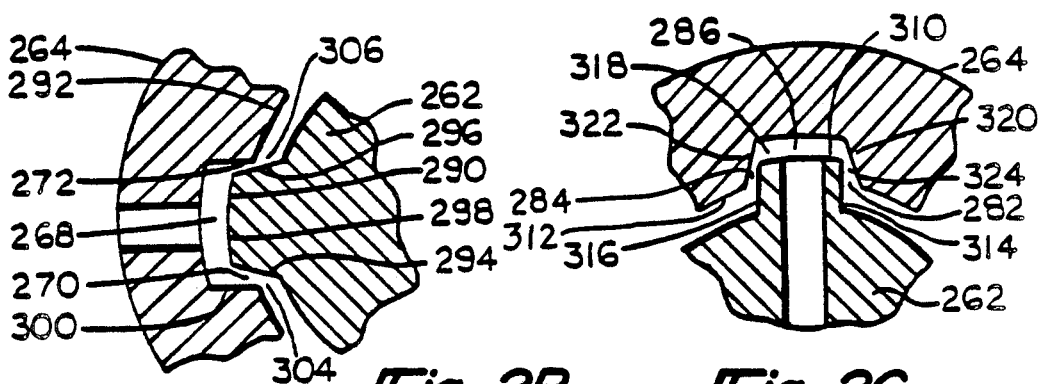
*Fig-2B*     *Fig-2C*

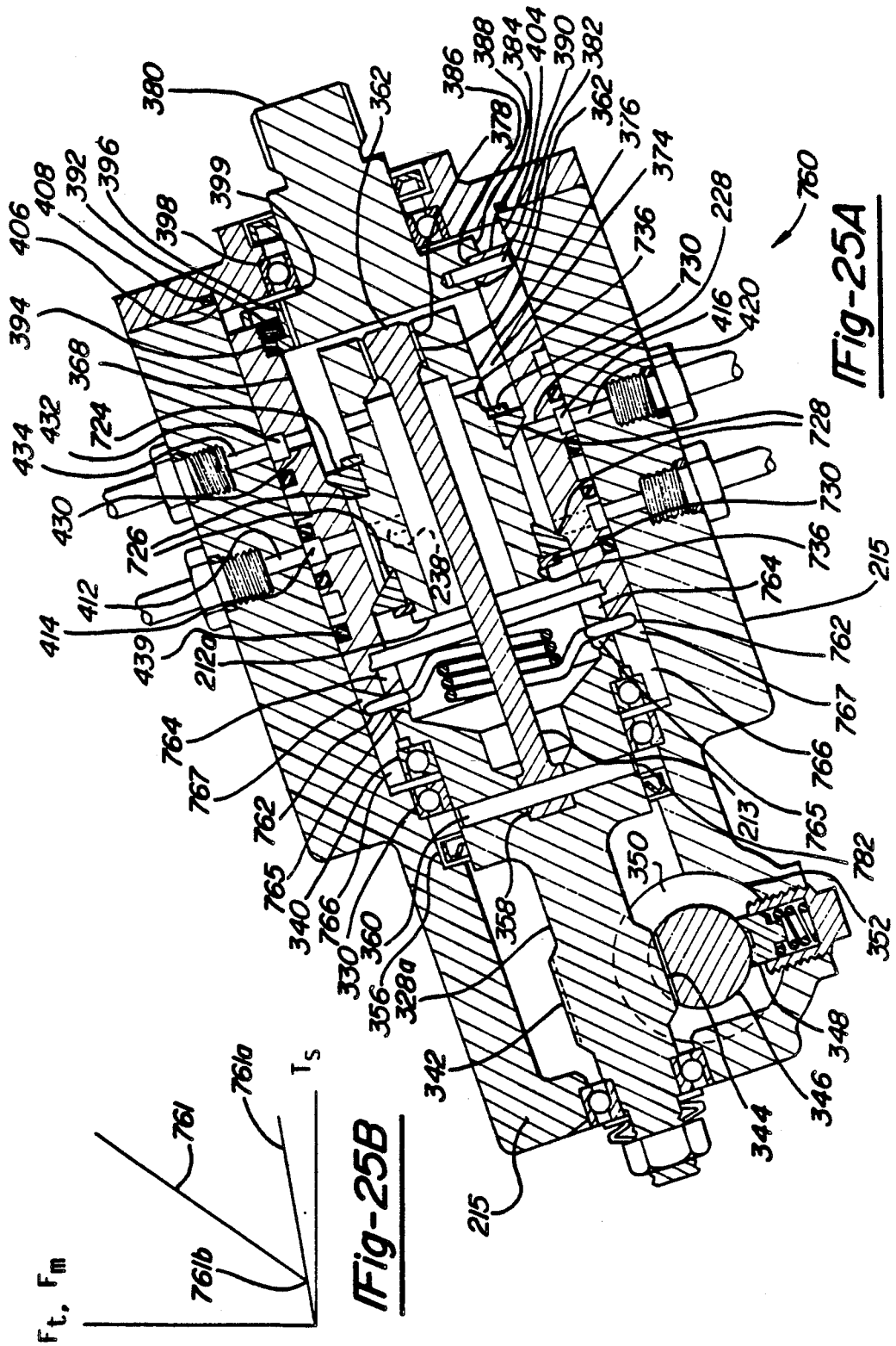

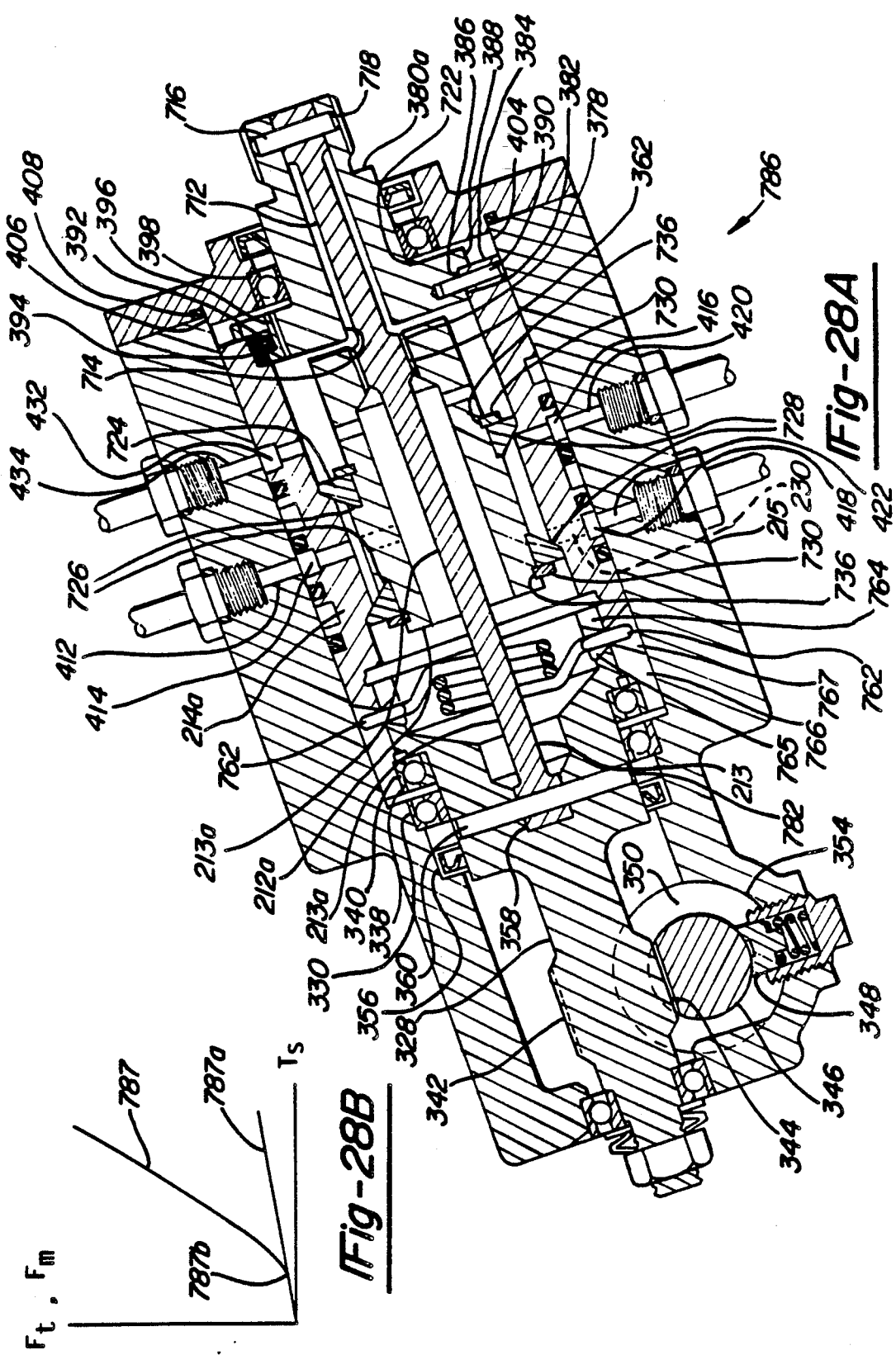

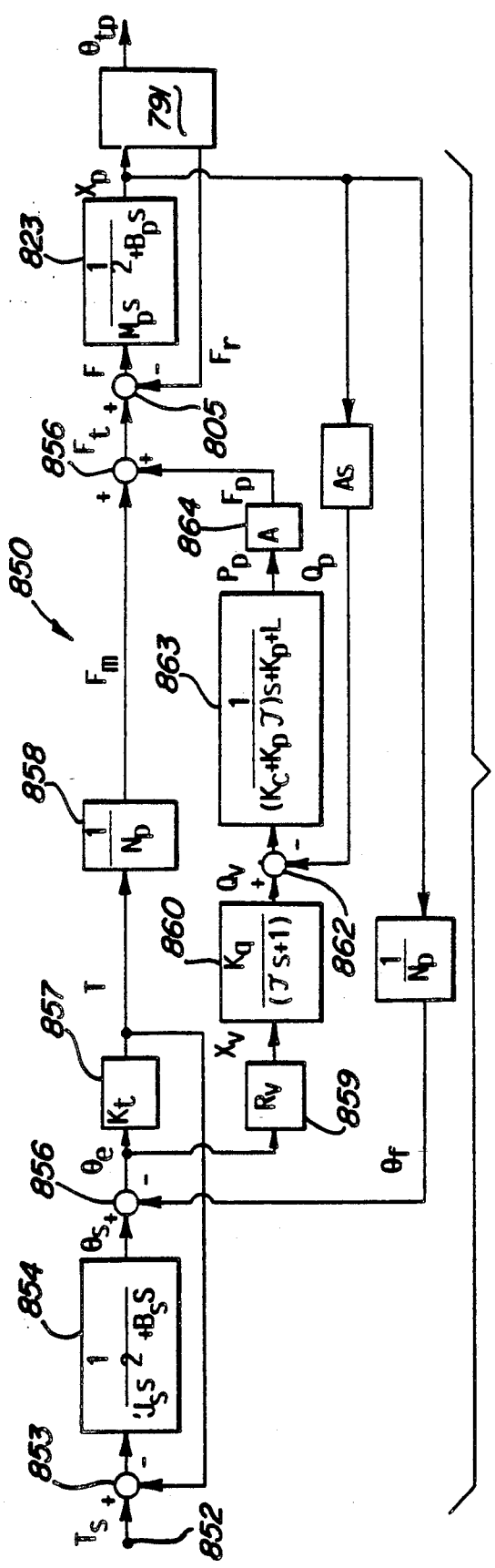
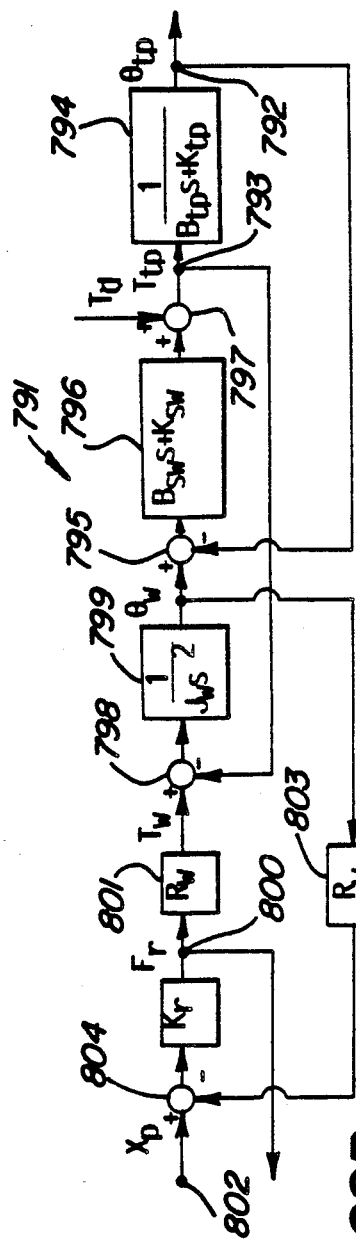
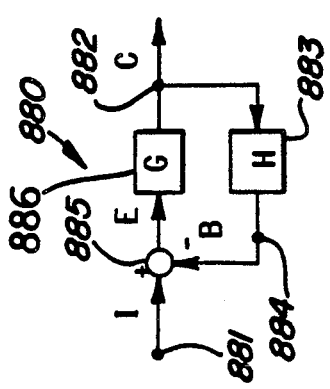
*Fig-33*
*Fig-29B*
*Fig-35*

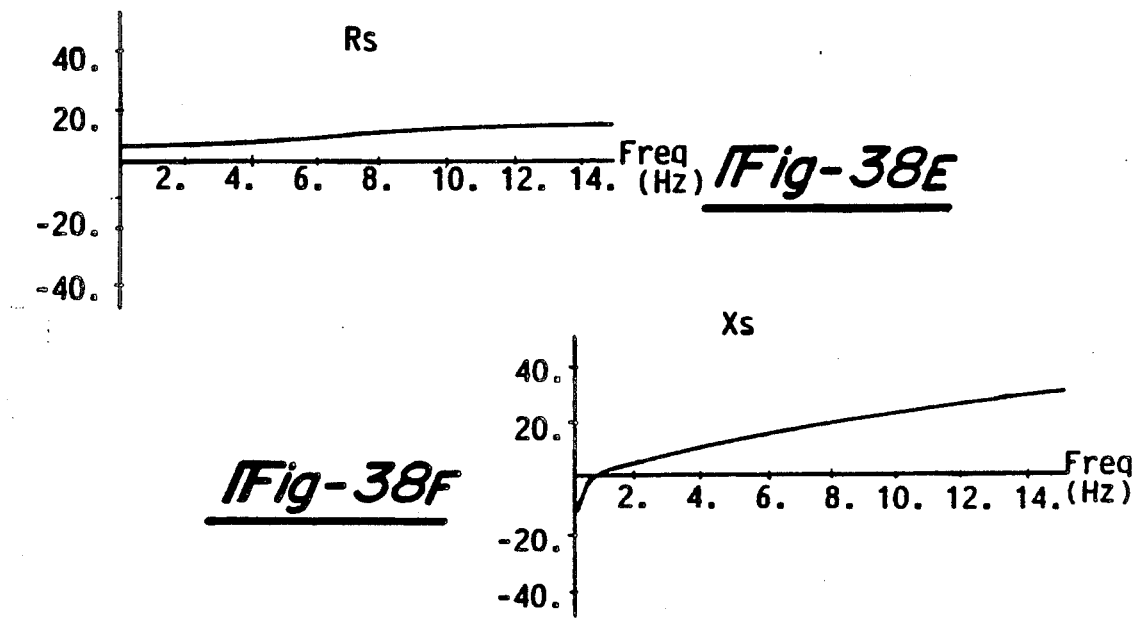
Fig-38E
Fig-38F
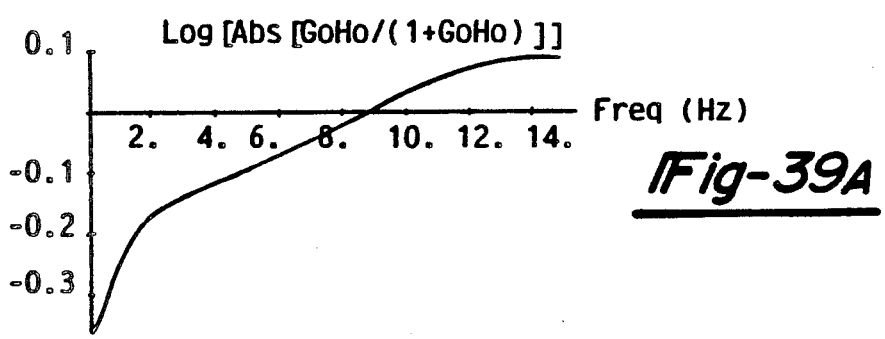
Fig-39A
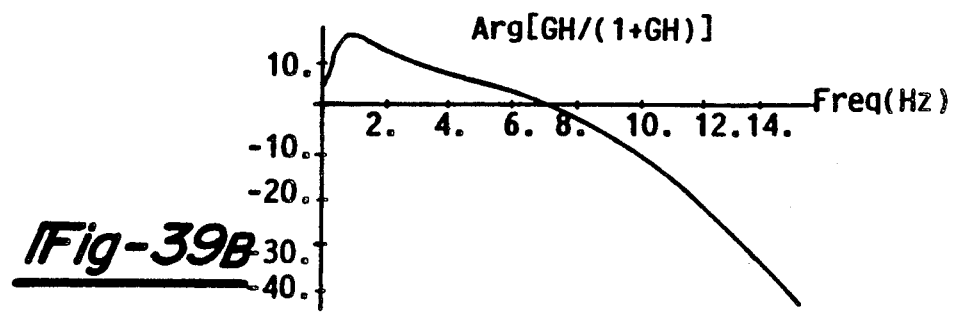
Fig-39B

POWER STEERING SYSTEM

CROSS-REFERENCE TO RELATED APPLICATION

This is a continuation-in-part application of U.S. patent application Ser. No. 324,903, filed on Mar. 17, 1989 now U.S. Pat. No. 4,922,803.

TECHNICAL FIELD

This invention relates generally to hydraulic control valves and particularly to rotary four-way open-center control valves which utilize constant flow rate hydraulic power sources.

BACKGROUND OF THE INVENTION

Four-way open-center rotary control valves which use constant flow rate hydraulic power sources are commonly utilized for controlling vehicular power steering systems. Such systems typically employ a four-way open-center rotary control valve (hereinafter "rotary valve") having position feedback. Road feel is artificially induced by deflection of a torsion bar.

An earlier type of power steering system provided feedback partially proportional to actual steering effort. This power steering system featured a four-way open-center hydraulic reaction control spool valve (hereinafter "reaction valve"). However, such systems were rather complex to manufacture and were replaced by power steering systems which feature the simpler rotary valves mentioned above.

A rotary valve is a four-way open-center flow control valve which has circumferentially close fitting inner and outer valve members. The inner and outer valve members usually feature four sets each of pressure, first and second output, and return slots. These four sets of slots are equally spaced (at 90 degrees) around the interfacing circumferences of the inner and outer valve members. Differentially controlled output flows and/or pressures in the first and second output slots are obtained by rotationally displacing the inner valve member with respect to the outer valve member.

The open-center configuration of the rotary valve allows a nominally constant flow hydraulic fluid source to be utilized. In normal operation at other than small valve displacements, system supply pressure nominally approximates differential output pressure (hereinafter "output pressure"). This results in minimum system power consumption but results in wildly erratic system control characteristics wherein assist levels can vary by more than 40:1.

In accordance with the present invention, a four-way open-center rotary control valve having internally generated hydraulic reaction torque (hereinafter "torque reaction valve") is provided. In preferred embodiments of the present invention, the hydraulic reaction torque is generated between inner and outer valve members which are formed with multiple control orifices having differing radii. The control orifices comprise input control orifices which meter fluid from a constant flow hydraulic fluid source into either of first and second output ports, and return control orifices which meter fluid returned therefrom to a tank.

The input control orifices are formed at smaller radii than the return control orifices. Thus, output pressure between the first and second output ports is additively applied to either side of each of a plurality of effectively enlarged ridge sections which form the return control orifices. The product of the output pressure, the summed areas of the enlarged ridge sections, and their effective radii generates the hydraulic reaction torque.

Output pressure is coupled to a utilization device, such as a power cylinder, via flow restrictors. The flow restrictors are controlled orifice devices which can have a nominally linear flow resistance characteristic. For this reason, values of differential pressure applied to the utilization device are less than the output pressure. The reduction of output pressure is nominally proportional to fluid flow rate through the utilization device. This results in a controlled damping ratio and stable operation of systems incorporating the flow restrictors of the present invention.

Improved performance can be obtained from a servo system comprising the torque reaction valve by introducing an orifice in parallel with a double acting utilization device also comprised within the servo system. Fluid flow rate through the orifice improves system damping and results in an improved control characteristic wherein over-sensitive response to small involuntary control inputs are precluded.

A power steering system utilizing a torque reaction valve exhibits a substantially linear characteristic wherein steering wheel torque is proportional to steering load. However, some would prefer a first type of improved torque reaction valve wherein moderately increasing values of closed-loop transfer function are provided concomitantly with increasing steering loads. This would enable increased tactile feel of lighter steering loads together with achieving decreased values of steering wheel torque at higher steering loads.

A strongly non-linear characteristic commonly referred to as "center-point feel" (at low steering loads) is often featured on expensive European automobiles. "Center-point feel" comprises a delay of the application of power steering assist by a vehicular power steering system until some nominal value of torque has been applied to the vehicle's steering wheel (i.e., between 5 and 10 in.lbs. of torque). Ideally this is accomplished with input and output members of the power steering system's control valve locked together so that no rotational compliance is introduced thereby. When additional steering wheel torque is applied this condition is followed by application of power steering assist. The advantages of "center-point feel" include tactile feel of the road by the driver and avoidance of externally induced perturbations of the steering system (i.e., such as by street car tracks).

Thus, some others would prefer a second type of improved torque reaction valve wherein "center-point feel" is incorporated. And, still others would prefer a third type of improved torque reaction valve wherein both increasing values of closed-loop transfer function and "center-point feel" are incorporated. These three types of improved torque reaction valves are comprised in preferred embodiments of the present invention as described hereinbelow.

SUMMARY OF THE INVENTION

In a torque reaction valve, position feedback is provided to an inner valve member via a torsion bar which is driven by a pinion member of an output rack-and-pinion set of the host power steering system. Torque reaction is identically present in the torsion bar, hydraulic interface between inner and outer valve members, and an input shaft. In a first embodiment of the present invention, a torsion bar extension additionally couples the inner valve member with the input shaft. Thus, input torque is split between the torsion bar extension and the hydraulic interface. Because the hydraulic interface has a non-linear torsional spring rate characteristic, non-linearly increasing values of reaction pressure are concomitant with increasing input torque values. This results in the increasing values of closed-loop transfer function called for above.

In a second embodiment of the present invention, the input shaft and the pinion are locked together via preloading them at a selected rotational orientation via preloaded spring means. As increasing values of torque are applied, rotation therebetween is prevented until the applied torque value exceeds the spring preload value. As further increasing values of torque are applied, rotational displacement occurs therebetween against the torsional spring rates of the spring means and the torsion bar.

In yet another embodiment of the present invention, the torsion bar extension of the first embodiment is combined with the preloaded spring means of the second embodiment. This results in the input shaft and pinion being locked together until the spring preload value is exceeded. This is followed by non-linearly increasing values of reaction pressure and concomitant power steering assistance.

BRIEF DESCRIPTION OF THE DRAWINGS

FIG. 1 is a diametrical section view of a torque reaction valve according to a preferred embodiment of the present invention.

FIG. 2A is a diametrical section view of a torque reaction valve according to an alternate preferred embodiment of the present invention.

FIGS. 2B and 2C are enlarged sectional views of an inlet control orifice and a return control orifice, respectively, of the torque reaction valve of FIG. 2.

FIG. 25A is a longitudinal section view which depicts another improved torque reaction valve wherein "center-point feel" is enabled via one or more "clothespin" springs which are disposed between the valve's outer (i.e., input) valve member and pinion shaft (i.e., mechanical output member).

FIG. 25B is graph illustrating static performance characteristics of the improved torque reaction valve of FIG. 25A.

FIG. 28A is a longitudinal section view which depicts yet another improved torque reaction valve wherein the increasing values of closed-loop transfer function of the improved torque reaction valve of FIG. 22A are combined with the "center point feel" of the improved torque reaction valve of FIG. 25A.

FIG. 28B is graph illustrating static performance characteristics of the improved torque reaction valve of FIG. 28A.

FIG. 29B is a block diagram which depicts the operation of an output section typical to the block diagrams shown in FIGS. 29A, 30, 31, 32, 33 and 34.

FIG. 33 is a block diagram which depicts the operation of a power steering system which incorporates a rotary valve.

FIG. 35 is a "canonical form" of feedback control system to which each of the block diagrams of FIGS. 29A through 34 can be reduced via computation of forward and feedback transfer functions.

FIGS. 38A through 38F are dynamic signature plots depicting tactile steering interface between a driver and a vehicle equipped with a power steering system comprising the torque reaction valve and operated as depicted in FIG. 36A.

FIGS. 39A through 39F are dynamic signature plots depicting tactile steering interface between a driver and a vehicle equipped with a power steering system comprising the torque reaction valve and operated as depicted in FIG. 36B.

FIGS. 41A through 41F are dynamic signature plots depicting tactile steering interface between a driver and a vehicle equipped with a power steering system comprising the rotary valve and operated as depicted in FIG. 37B.

DESCRIPTION OF THE PREFERRED EMBODIMENTS

Figure 3:
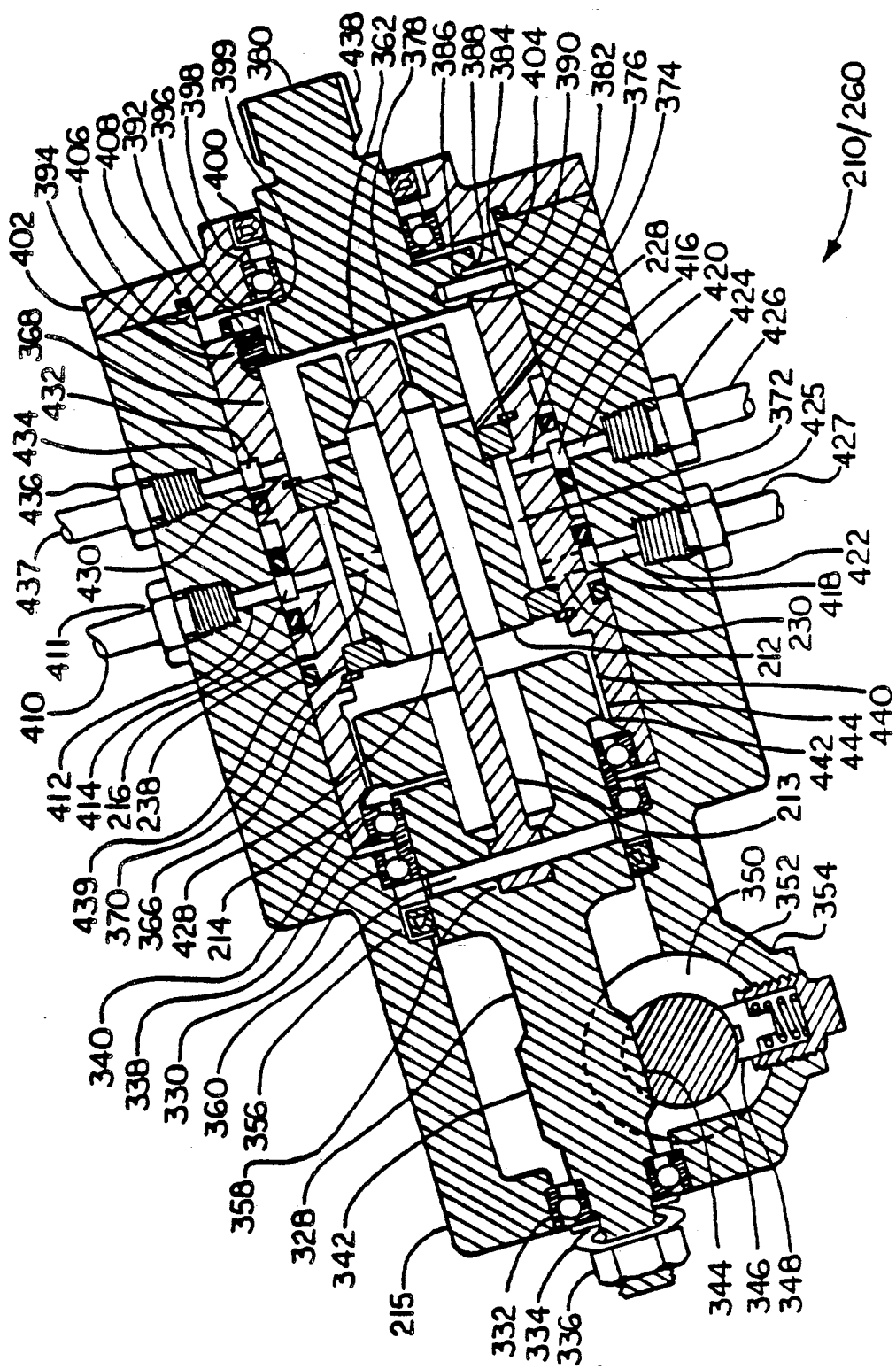
FIG. 3 is a longitudinal section view which is representative of the torque reaction valves of both FIGS. 1 and 2A-C.

The present invention embodies apparatus and control methods which enable proportional and stable control of the position of a hydraulically actuated, double acting utilization device. In the present invention, a torque reaction valve is provided wherein reaction torque is generated within the torque reaction valve itself. This is accomplished by applying output pressure directly between differential surfaces of first and second valve members. Torque application therebetween is unopposed by any spring member analogous to those commonly found on known types of reaction valves. One example is that of a so-called "star" valve as described in U.S. Pat. No. 4,217,932 by Juan S. Bacardit which is entitled HYDRAULIC ROTARY DISTRIBUTOR, PARTICULARLY FOR USE IN POWER STEERING SYSTEMS and was issued on Aug. 19, 1980.

Closed-loop servo systems utilizing the torque reaction valve of the present invention to position a mass are stabilized by energy loss associated with motion of the mass. In order to positively control the magnitude of such energy loss, a damper valve assembly, also of the present invention, may be introduced into hydraulic circuits comprised within such closed-loop servo systems.

Shown in FIG. 1 is a diametrical section view of a torque reaction valve 210. The torque reaction valve 210 comprises a torsion bar 213, inner and outer valve members 212 and 214, respectively, and a valve body 215. As will be described below, input torque is applied to the outer valve member 214 while feedback torque is applied to the inner valve member 212 via the torsion bar 213. Then the magnitude of the resulting output pressure is linearly related to the applied torque.

Fluid from a constant flow hydraulic fluid source (not shown) flows into the rotary valve 210 via input ports 216 and into pressure slots 218. The fluid then flows past either or both sets of first and second input control orifices 220 and 222, respectively, to sets of first and second output slots 224 and 226, respectively. A selected portion of the fluid flows out one of first and second output ports 228 and 230, respectively, to a double acting utilization device (not shown) and returns therefrom via the other one of the first and second output ports 228 and 230, respectively. The fluid then flows past either or both sets of first and second return control orifices 232 and 234, respectively, into return slots 236. The fluid is then returned to a tank (not shown) via return ports 238 and an internal drain path (also not shown).

All of the above described ports, slots and control orifices are depicted as balanced sets of two ports, slots and control orifices, respectively. Such balanced pairs of ports, slots and control orifices eliminate radial forces between the inner and outer valve members 212 and 214, respectively. In general, any number, N, of ports, slots and control orifices greater than one (arranged, however, in a balanced manner) may be utilized for the various sets of ports, slots and control orifices. Sets of four (i.e., N=4) ports, slots and control orifices are particularly common.

Outside surfaces 240 of the inner valve member 212 and inside surfaces 242 of the outer valve member 214 comprise functional surfaces of the first and second sets of input control orifices 220 and 222, respectively, and are radially sized with minimal clearance therebetween. Lands 244 of the inner valve member 212 are formed selectively narrower than the pressure slots 218 of the outer valve member 214 in order to effect proper underlapped valve input orifice (i.e., open center) characteristics. Similarly, outside surfaces 246 of the inner valve member 212 and inside surfaces 248 of the outer valve member 214 comprise functional surfaces of the first and second sets of return control orifices 232 and 234, respectively, and are sized with minimal clearance therebetween. Lands 250 of the inner valve member 212 are formed selectively narrower than the return slots 236 of the outer valve member 214 in order to effect proper underlapped valve return orifice characteristics. Representative differential widths of both of the pressure slots 218 and the return slots 236, and the lands 244 and lands 250, respectively, comprise a range of 4(mils) to 8(mils).

The output pressure comprises the difference between first and second values of pressure present in the first and second output slots 224 and 226, respectively.

The first and second values of pressure communicate with both lateral surfaces 252 and 254, and lateral surfaces 256 and 258, respectively. In addition, the outside surfaces 246 of the inner valve member are formed at larger radii than the outside surfaces 240 of the inner valve member. Thus, the lateral surfaces 254 and 258 are larger in area and are located at larger effective radii than the lateral surfaces 252 and 256, respectively. Therefore, non-zero output pressures will concomitantly generate torque between the inner valve member 212 and the outer valve member 214. The torque generated therebetween is determined by $$T = A_v P R_v$$

where T is the torque, $A_v$ is effective net valve area (and is equal to the product of the difference in radii between the outside surfaces 246 and the outside surfaces 240, length of the valve, and N), P is the output pressure and $R_v$ is the effective radius of the effective net valve area, $A_v$.

Shown in FIG. 2A is a diametrical section view of another preferred embodiment of a torque reaction valve 260 also of the present invention. The torque reaction valve 260 comprises inner and outer valve members 262 and 264, respectively. Fluid from a constant flow hydraulic fluid source (not shown) flows into the rotary valve 260 via input ports 266 and into pressure slots 268. The fluid then flows past either or both sets of first and second input control orifices 270 and 272, respectively, to sets of first and second output slots 274 and 276, respectively. A selected portion of the fluid flows out one of first and second output ports 278 and 280, respectively, to a double acting utilization device (not shown) and returns therefrom via the other one of the first and second output ports 278 and 280, respectively. The fluid then flows past either or both sets of first and second return control orifices 282 and 284, respectively, into return slots 286. The fluid is then returned to a tank (not shown) via return ports 288 and an internal drain path (also not shown).

All of the above described ports, slots and control orifices are depicted as balanced sets of two ports, slots and control orifices, respectively. Such balanced pairs of ports, slots and control orifices eliminate radial forces between the inner and outer valve members 262 and 264, respectively. In general, any number of ports, slots and control orifices greater than one (arranged, however, in a balanced manner) may be utilized for the various sets of ports, slots and control orifices. Sets of four ports, slots and control orifices are particularly common.

Outside surfaces 290 of the inner valve member 262 are formed at a larger radius than inside surfaces 292 of the outer valve member 264. This is shown more clearly in FIG. 2B which is an enlarged sectional view of one set of a pressure slot 268 and first and second input control orifices 270 and 272, respectively. The first and second input control orifices 270 and 272, respectively, comprise lateral surfaces 294 and 296 of a land 298 of the inner valve member 262 and lateral surfaces 300 and 302 of the pressure slot 268, respectively. The lateral surfaces 294 and 296, and the lateral surfaces 300 and 302, are formed such that gaps 304 and 306 therebetween become progressively narrower with respect to fluid flow direction which occurs from larger to smaller radii therebetween. Thus, the first and second input control orifices 270 and 272, respectively, are formed in the manner of reducing nozzles whose exit widths are the minimum values of the gaps 304 and 306, respectively.

Outside surfaces 310 of the inner valve member 262 are formed at a larger radius than inside surfaces 312 of the outer valve member 264. This is shown more clearly in FIG. 2C which is an enlarged sectional view of one set of a return slot 286 and first and second return control orifices 282 and 284, respectively. The first and second return control orifices 282 and 284, respectively, comprise lateral surfaces 314 and 316 of a land 318 of the inner valve member 262 and lateral surfaces 320 and 322 of the return slot 286, respectively. The lateral surfaces 314 and 316, and the lateral surfaces 320 and 322, are formed such that gaps 324 and 326 therebetween become progressively narrower with respect to fluid flow direction which occurs from smaller to larger radii therebetween. Thus, the first and second return control orifices 282 and 284, respectively, are formed in the manner of reducing nozzles whose exit widths are the minimum values of the gaps 324 and 326, respectively. Ideally, the exit widths of the gaps 304, 306, 324 and 326 are all made substantially equal wherein representative gap width values comprise a range of 2(mils) to 4(mils).

Although the lateral surfaces 314 and 316 are depicted as being formed parallel to one another, they may be formed in a manner identical to the lateral surfaces 294 and 296. If this is done, the toothlike configuration of the inner valve member 262 may be formed on conventional spur gear fabricating equipment. Then the lateral surfaces 320 and 322 are formed at a larger angle, thus maintaining the reducing nozzle configurations of the return control orifices 282 and 284.

The output pressure comprises the difference between first and second values of pressure present in the first and second output slots 274 and 276, respectively. The first and second values of pressure communicate with both lateral surfaces 294 and 314, and lateral surfaces 296 and 316, respectively. Even though the outside surfaces 290 and 310 of the inner valve member 262 may be formed at equal radii (as shown in FIG. 2A), the effective radial positions of the first and second return control orifices 282 and 284, respectively, are formed at larger radii than the effective radial positions of the first and second input control orifices 270 and 272, respectively. This is because the effective radial position of the first and second input control orifices 270 and 272, respectively, are formed at substantially the same radius as the inner surfaces 292 of the outer valve member 264.

Thus, portions of the lateral surfaces 314 and 316 which are subjected to the output pressure are larger in area and are located at larger effective radii than portions of the lateral surfaces 294 and 296 which are subjected to the output pressure, respectively. Therefore, non-zero output pressures will concomitantly generate torque between the inner valve member 262 and the outer valve member 264. The torque generated therebetween is determined by $$T = A_v P R_v$$

(where in this case $A_v$ is equal to the product of the difference in radii of the portions of the lateral surfaces 314, 316, and 294 and 296, respectively, which are subjected to the output pressure, the length of the valve, and N).

Shown in FIG. 3 is a longitudinal section view which is representative of either the torque reaction valve 210 or the torque reaction valve 260. (The description that follows uses the part numbers shown in FIG. 1 for the torque reaction valve 210. However, the following description applies equally to the torque reaction valve 260 and could be repeated using the part numbers shown in FIGS. 2A-C. Therefore, it should be considered to be a generic discussion equally applicable to both the torque reaction valves 210 and 260.)

Disposed within the lower end of the valve body 215 is a pinion shaft 328. It is located therein by ball bearings 330 and 332 wherein axial preload is provided by Belleville spring washers 334 and retaining nut 336. Mounted adjacent the ball bearing 330 is another ball bearing 338 upon whose outer race is located the lower end of the outer valve member 214 via a counterbore 340 therein.

Pinion gear teeth 342 are formed on the pinion shaft 328. Rack gear teeth 344 of a rack assembly 346 are held in mesh with the pinion gear teeth 342 by a spring loaded bearing yoke 348 in a known manner. Axially disposed along the rack assembly 346 is a piston 350. The piston 350 is located within a double acting cylinder 352 formed within a casting 354 which also comprises the valve body 215—all formed in a known manner. A shaft seal 356 provides a barrier to migration of either hypoid oil commonly utilized to lubricate the rack-and-pinion gear section or power steering fluid commonly utilized as fluid within the torque reaction valve 210.

Fixedly mounted within a bore 358 formed within the pinion shaft 328 is the lower end of the torsion bar 213. The torsion bar 213 is retained and rotationally oriented therein by a pin 360. The upper end of the torsion bar 213 is formed with a male spline 362. To facilitate later assembly of the inner valve member 212 thereon, the male spline 362 is formed with a number of teeth equal to an integral multiple of the number N of sets of ports, slots and control orifices comprises in the inner and outer valve members 212 and 214, respectively, wherein the teeth are rotationally oriented in a selective manner with respect to the pin 360.

The outer valve member 214 is formed with a counterbore 366 in its lower end and a counterbore 368 in its upper end. The inner valve member 212 is axially assembled within the outer valve member 214. Barrier rings 370 are assembled within the counterbores 366 and 368 and forcibly retained at the ends thereof by beveled internal retaining rings such as Waldes Truarc part number N5002-112 manufactured by Waldes Kohinoor, Inc. of Long Island City, N.Y.

The axial region 372 (of the axially assembled inner and outer valve members 212 and 214, respectively) comprises the active portions of the torque reaction valve 210 as shown in FIG. 1. The respective lengths of the active portions of the inner and outer valve members 212 and 214 are formed such that there is minimal axial operating clearance between the inner valve member 212 and the barrier rings 370. The minimal operating clearance provides a nominal flow barrier between the various slots and control orifices. Concomitantly, bores 374 of the barrier rings 370 and shaft portions 376 of the inner valve member 212 are formed such that a free running bearing fit is established therebetween.

A splined hole 378 is formed in the upper end of the inner valve member 212. The splined hole 378 is sized such that it achieves a slidable mesh with the male spline 362. In addition, it is rotationally oriented such that a selected orientation of the inner valve member with respect to the male spline and therefore the pin 360 can be maintained. Thus, feedback torque is transmitted substantially without hysteresis from the pinion shaft 328 to the inner valve member 212 via the pin 360, angular deflection of the torsion bar 213, and mesh of the male spline 362 and the splined hole 378. This method of transmitting the feedback torque avoids axial overconstraint between the inner valve member 212 and either of the barrier rings 370.

An input shaft 380 is located with respect to counterbore 382 and face 384 of the outer valve member 214 by a pilot boss 386 and a shoulder 388. It is affixed thereto alternately by a plurality of pins 390 or a plurality of set-screws 392 wherein the set-screws 392 are threadably engaged in threaded half holes 394 in the outer valve member 214 and bear against the bottom of half holes 396 in the input shaft 380. The advantage of affixing the input shaft 380 to the outer valve member 214 via the plurality of set-screws 392 is that subsequent disassembly of the torque reaction valve 210 is thereby facilitated.

A ball bearing 398 and a shaft seal 400 are installed in an input housing 402. A wave washer 399, the ball bearing 398 and shaft seal 400 are slidably assembled over the input shaft 380 as the input housing 402 is axially installed onto the valve body 215. The input housing 402 is located radially in main bore 404 of the valve body 215 by a pilot boss 406, and affixed to the valve body 215 by threaded bolts (not shown). Hydraulic fluid is prevented from leaking between the input housing 402 and the valve body 215 by an O-ring seal 408.

Fluid flows through the torque reaction valve 210 generally as described above with respect to FIG. 1. However, detailed fluid flow into and/or out of the rotating assembly of the inner and outer valve members 212 and 214, respectively, is as follows:

Input fluid flows from a fluid source (not shown) through an input line 410, input fitting 411 and input passage 412 through an input slip ring 414 and finally to each of the input ports 216. Similarly, output fluid flows to or from either of the sets of first and second output ports 228 and 230, respectively, via first or second output slip rings 416 and 418, respectively, through first or second output passages 420 and 422, respectively, first or second output fittings 424 and 425, respectively, and first and second output lines 426 and 427, respectively, to or from either end of the cylinder 352, respectively. Finally, return fluid from the return ports 238 flows into an annular cavity 428 occupying the space between the torsion bar 213 and the inside of the inner valve member 212, out through return holes 429 and 430, and through return slip ring 432, return passage 434, return fitting 436 and return line 437 to a tank (not shown). In addition, four seal rings 439 are utilized to preclude leakage from the input slip ring 414 or either of the output slip rings 416 and 418.

In operation, a torque T(in.lbs) is applied to splines 438 formed on the input shaft 380. The torque is transmitted to the outer valve member 214 via the pins 390 or set-screws 392 and the outer valve member 214 rotates slightly. One of the sets of first and second input control orifices 220 or 222, respectively, and the other of the sets of return control orifices 232 or 234, respectively, is enlarged in area while the opposite sets are reduced in area. Output pressure is generated which may result in motion of the piston 350 via fluid flow to and from the cylinder 352. Any motion of the piston 350 will concomitantly result in motion of the rack assembly 346 and "follow up" rotational motion of the pinion 328 and lower end of the torsion bar 213. This rotational motion of the lower end of the torsion bar 213 will generally lag the rotation of the outer valve member 214 by a slight angle which may be thought of as the servo system error angle.

Concomitantly, the applied torque will be opposed by an identical torque generated by the output pressure acting upon the effective net valve area as defined above (i.e., wherein $T=A_v PR_v$). This torque will also cause the inner valve member 212 to rotate in the same direction as the outer valve member 214 (but with less error than the pinion shaft 328) and impart concomitant rotation to the upper end of the torsion bar 213 via the splined hole 378 and the male spline 362. The simultaneous lagging rotation of the lower end and almost full rotation of the upper end of the torsion bar 213 results in the torsion bar 213 twisting by an angle $\theta_e$(rad.). The angle $\theta_e$ is a measurement error angle with the value $$\theta_e = 10.2(l_t T/Gd_t^4)$$

where $l_t$ is the effective length of the torsion bar 213, G is the shearing modulus of elasticity, and $d_t$ is the diameter of the effective length of the torsion bar 213. Thus, the relative angular displacement of the inner valve member 212 with respect to the pinion shaft 328 is linearly related to the applied torque T and has the value $\theta_e$—which can be evaluated as defined above.

Should a failure of the hydraulic system occur (i.e., such as by failure of a pump supplying fluid to the torque reaction valve 210), the feedback torque will be absent and $\theta_e$ must be otherwise limited. This is accomplished in the torque reaction valve 210 by a tangentially loose fitting spline set 440 comprising a male spline 442 formed on the upper end of the pinion shaft 328 and a female spline 444 formed within the outer valve member 214. Thus, such a failure would result in the applied torque T being directly applied to the pinion shaft 328 via the spline set 440. (I.e., representative nominal values for the angular clearance of the male spline 442 within the female spline 444 comprise a range of ±0.05(rad.) to ±0.2(rad.)).

To facilitate axial assembly of the pre-assembled inner and outer valve members 212 and 214, respectively, onto the ball bearing 338 and the male spline 362 of the torsion bar 213, the spline set 440 is formed with a number of teeth equal to an integral multiple of the number N of sets of ports, slots and control orifices comprises within the pre-assembled inner and outer valve members 212 and 214, respectively.

Although application to vehicular power steering has been assumed hereinabove in discussing the torque reaction valve 210, no such limitation in its use is appropriate. The torque reaction valve 210 can be used together with any hydraulically actuated, double acting utilization device to perform a wide variety of tasks. All that is required to complete closed-loop systems utilizing the torque reaction valve 210 is a suitable feedback path enabling application of feedback torque to the bottom end of the torsion bar 213.

Rotational motions greater than the angle $\theta_e$ are not necessarily required in such systems. For instance, the torque reaction valve 210 could be used in a very simple servo system to position a cylinder driven slide against a travel limit. All that would be required would be a spring bias on the rack assembly 346 which urges the cylinder driven slide toward the travel limit. When the travel limit struck the end of the rack assembly 346, the servo system would control the cylinder driven slide's position against the travel limit. The possibilities are endless and no attempt is made to catalog them by including a large number of additional application oriented figures herein.

Figure 4:
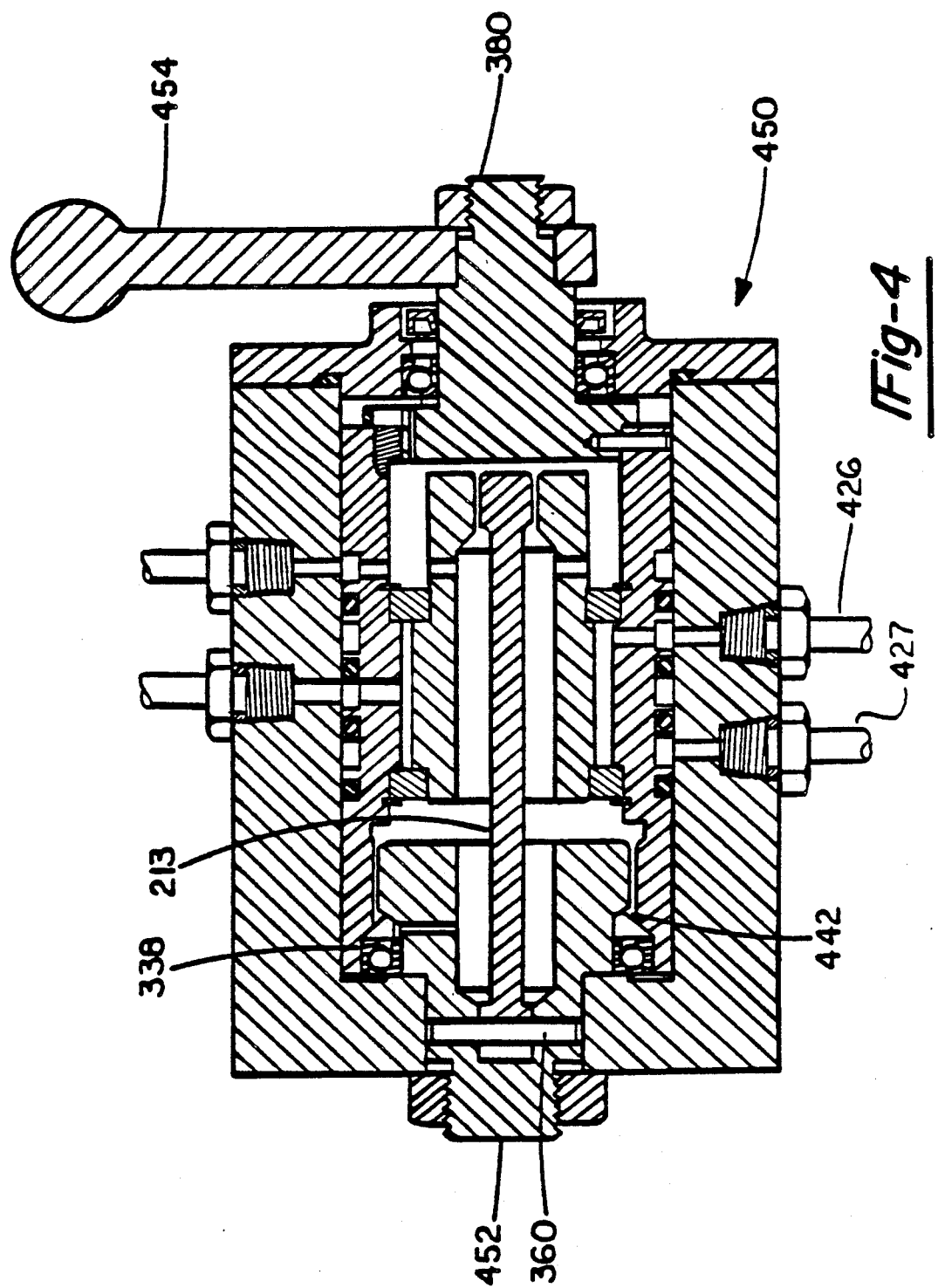
FIG. 4 is a longitudinal section view of a hand operated controller which comprises a torque reaction valve.

In addition, it is possible to use the basic apparatus of the torque reaction valve as an independent controller without feedback. For instance, shown in FIG. 4 is a simple differential pressure controller 450. In the differential pressure controller 450 the rotationally movable pinion shaft 328 is replaced by an immovable reaction torque fitting 452. In addition to providing an anchor for the lower end of the torsion bar 213 (via the pin 360), the reaction torque fitting 452 comprises the male spline 442 and provides a cylindrical mounting surface for the ball bearing 338. A handle 454 is mounted on the input shaft 380. Thus, rotation of the handle 454 is possible within the angle $\pm \theta_e$ (max.) with concomitant linearly related differential output pressure available at the first and second output lines 426 and 427, respectively. Again, possible applications are limitless. For instance, such a differential pressure controller could be utilized in an "open-loop" control system for opening or closing a large hydraulically actuated valve.

Figure 5:
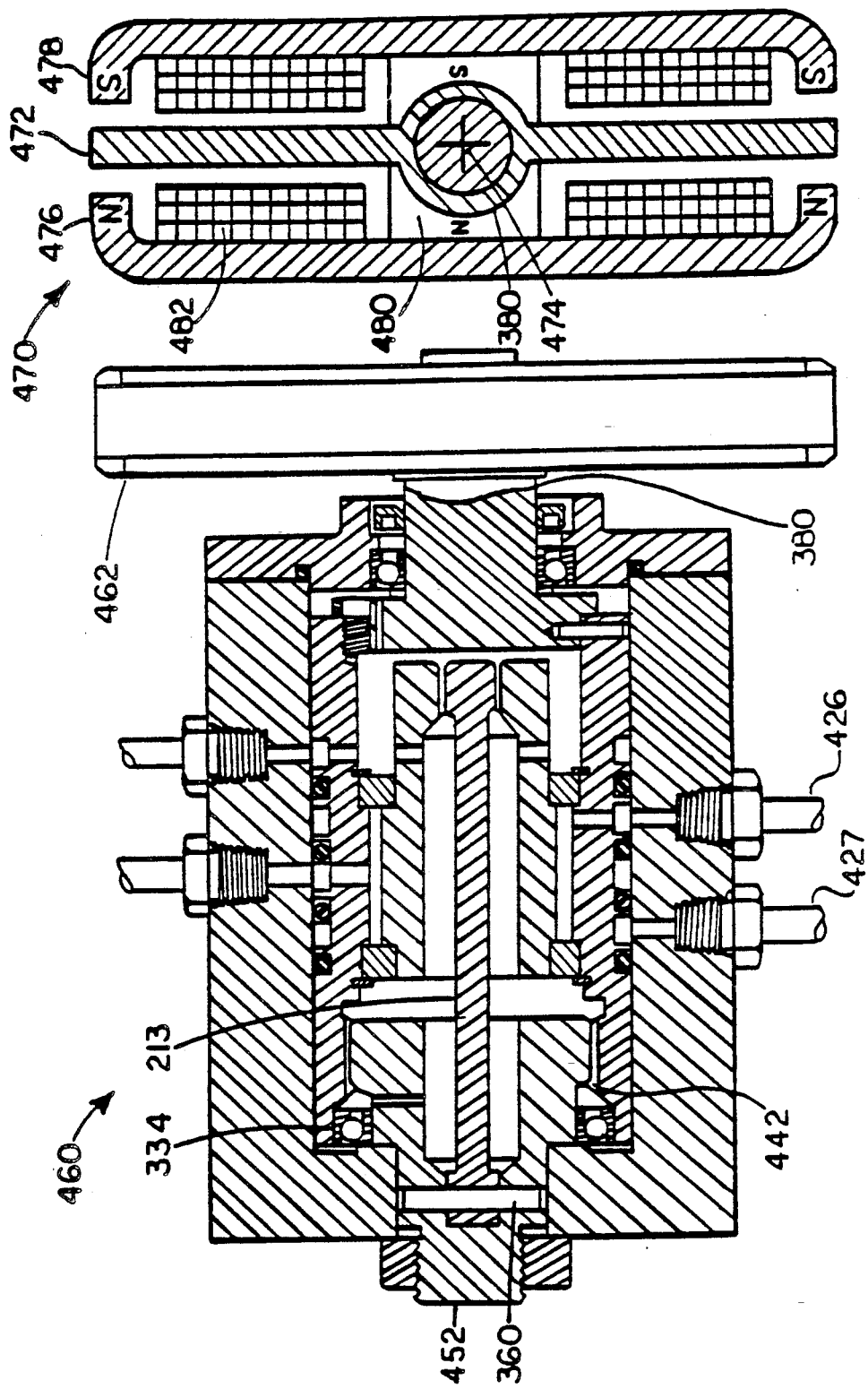
FIG. 5A is a longitudinal section view of an electro-hydraulic servo valve which comprises a torque reaction valve.
FIG. 5B is an end view which illustrates a preferred embodiment of a limited excursion torque motor utilized with the electro-hydraulic servo valve shown in FIG. 5A.

If electro-mechanical or other controllable drive means are substituted for the handle 454, a servo-valve is brought into being. For instance, shown in FIG. 5A is an electro-mechanical (i.e., motor driven) servo-valve 460. The electro-mechanical servo-valve 460 is identical with the differential pressure controller 450 except that the handle 454 has been replaced by an electrically actuated motor 462. Suitable examples of electrically actuated motors can be found in a line of limited rotation DC torque motors manufactured by Aeroflex Laboratories Inc. of Plainview, N.Y.

An alternate preferred embodiment for a limited rotation DC torque motor is shown in FIG. 5B. Shown in FIG. 5B is a torque motor 470. The design of the torque motor 470 is closely related to DC torque motors used by a number of manufacturers for activating two-stage servo-valves of present design. Usually, such DC torque motors are utilized to position a pilot flapper valve and comprise a motor pivot which is located eccentrically with respect to the DC torque motor itself. Often such pivots comprise a flexure tube which serves to exclude fluid from the pilot flapper valve from the DC torque motor. Typical examples of such DC torque motor controlled two-stage servo-valves can be found in a line of servo-valves manufactured by Moog Inc. of East Aurora, N.Y.

In the torque motor 470, an armature bar 472 is affixed concentrically about the input shaft 380. Thus, the armature bar 472 pivots a pivot point 474 which is substantially coincident with the center line of the input shaft 380. Pole pieces 476 and 478 are mounted upon field magnets 480. The field magnets are unidirectionally oriented (magnetically) such that the pole piece 476 is north poled and the pole piece 478 is south poled. A pair of armature coils 482 are provided wherein both of the armature coils 482 are hooked up in an additive manner so that the armature bar 472 becomes an electro-magnet whose pole orientation and magnitude are set by current direction and magnitude in the armature coils 482.

Typically, the armature bar 472 is formed from a "soft" magnetic material having a tall but narrow hysteresis loop of small area. The combined dimensions of the armature bar 472, the field magnets 480 and the pole pieces 476 and 478 are controlled such that clearance is provided between the ends of the armature bar and the pole pieces 476 and 478 for maximum values of $\theta_e$.

In operation, a current passing through the armature coils 482 causes one end of the armature bar 472 to be north poled and the other to be south poled. Then the north poled end of the armature bar 472 is repelled by the north poled pole piece 476 and attracted by the south poled pole piece 478. Conversely, the south poled end of the armature bar 472 is attracted by the north poled pole piece 476 and repelled by the south poled pole piece 478. Thus, torque is generated by the armature bar 472. Currents in the armature coils 482 (and therefore flux levels in the armature bar 472) are held to values wherein a substantially linear relationship between current and motor torque is maintained.

As noted hereinabove, closed-loop servo systems utilizing the torque reaction valve 210 to position a mass are stabilized by energy loss associated with motion of the mass. Similarly generated energy loss will also have a stabilizing effect upon systems utilizing hydraulic circuits controlled by either the differential pressure controller 450 or the electro-mechanical servo-valve 460.

Under optimum conditions, suitable energy loss may be generated independent from the hydraulic circuits. For instance, an automotive type shock absorber could be coupled to a load to control oscillations of a system which comprises one of these hydraulic circuits. Alternately, a damper valve assembly may be introduced into either, or both, of the first and second output fittings 424 and 425, respectively, or lines 426 and 427, respectively.

An optimum damper valve assembly for this purpose is characterized by having a selected hydraulic resistance (hereinafter "resistance") function. In general, a simple orifice having a square law flow characteristic wherein pressure drop is proportional to fluid flow rate (hereinafter "flow rate") squared is unacceptable. Its resistance function would be determined by $$R_a = P_a/Q_a = Q_a/10000A_a^2 = (P_a)^{.5}/100A_a$$

where $R_a$ is the resistance of the orifice, $P_a$ is the pressure drop (hereinafter "pressure") across the orifice, $Q_a$ is the fluid flow rate through the orifice, and $A_a$ is the area of the orifice. Thus, the resistance of an orifice increases linearly with increasing flow rate.

Figure 6:
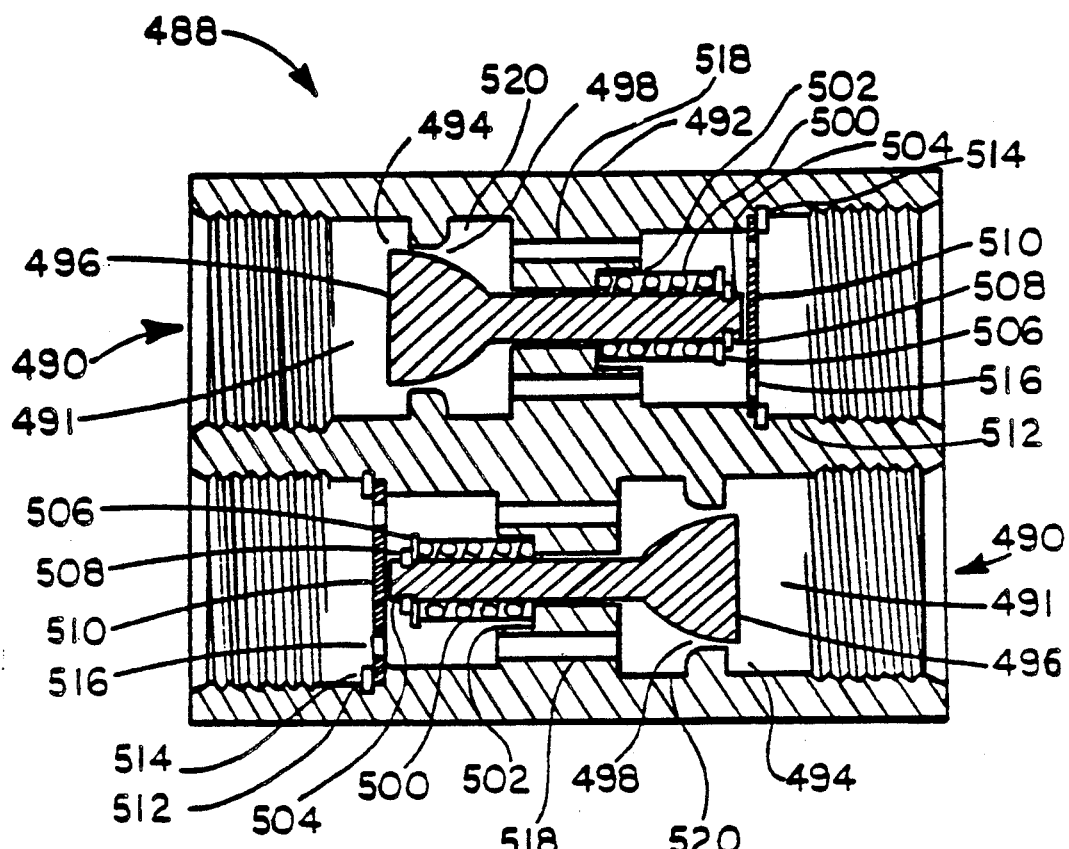
FIG. 6 is a sectional view of two directional controlled orifice flow restrictors (herein called a "hydraulic resistor") which are mounted side-by-side and oriented in opposite directions.

A damper valve assembly 488 having a selected resistance function is shown in FIG. 6. The damper valve assembly 488 comprises two damper valves 490, each having nominal one-way flow characteristics. They are mounted side-by-side in bores 491. Valve body 492 and the damper valves 490 are oriented therein in reversed flow directions to accommodate two-way flow. Each damper valve 490 comprises a set of the following items:

An oversize orifice counterbore 494 is formed in the valve body 492 which counterbore 494 is selectively filled by a contoured valve member 496. Thus an annular orifice 498 is formed which has a selected resistance vs. flow characteristic determined by and individually selected contour on the contoured valve member 496 as combined with selected stiffness and preload of a spring 500 used to retard outward motion of the contoured valve member 496. The spring 500 is located in a counterbore 502 and applies force to a stem 504 of the contoured valve member 496 via a washer 506 and a retaining ring 508. Return travel of the contoured valve member 496 is limited by a disc 510 which is retained in a counterbore 512 in the valve body 492 by a retaining ring 514. Fluid passage to the annular orifice 498 is effected via holes 516 and 518 formed in the disc 510 and valve body 492, respectively, and an annular chamber 520 also formed in the valve body 492.

Figure 7:
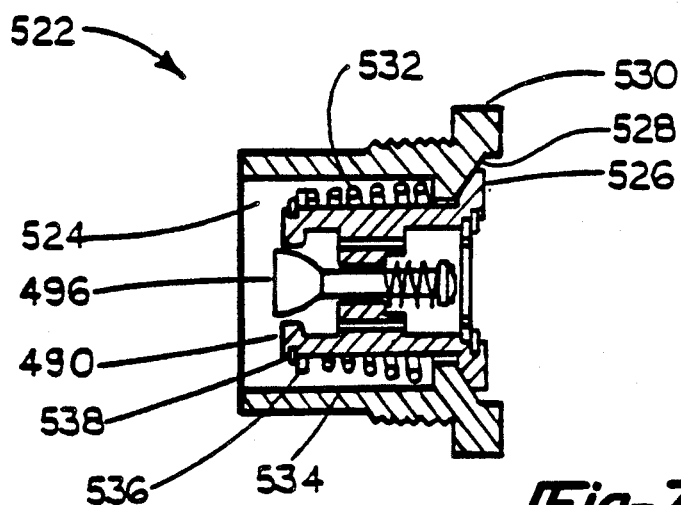
FIG. 7 is a sectional view of a single controlled orifice flow restrictor mounted within a check valve.

Shown in FIG. 7 is an alternate damper valve assembly 522 wherein a damper valve 490 is mounted in a bore 524 in a check valve 526 wherein one set of all of the above described counterbores, spring, retaining rings, disc and holes are formed or disposed in similar juxtaposition to a contoured valve member 496. The check valve 526 is urged against a spherical seat 528 formed in a check valve body 530 by a spring 532 which is located in a counterbore 534 and applies seating force to the check valve 526 via a washer 536 and retaining ring 538.

The damper valve 490 is oriented so that its nominal flow direction is opposite that of the check valve 526. Thus, a flow is nominally unimpeded in one direction but encounters a resistance R in the other. Utilizing one of the damper valve assemblies 522 in each of output lines 426 and 427 enables similar pressures to be maintained in either side of the double acting cylinder 352 for similar motions in either direction.

Figure 8:
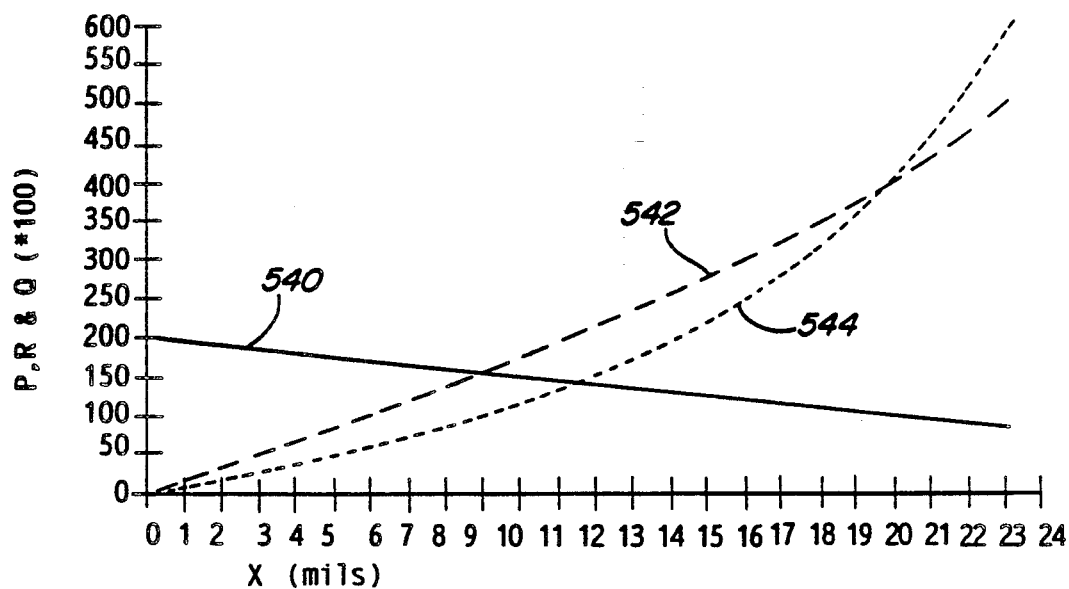
FIG. 8 is a graph showing flow resistance, pressure drop and flow rate vs. displacement for a controlled orifice flow restrictor.

While a single valued resistance value is often chosen as the resistance function for a particular design of the damper valve 490, a selected variable resistance function may be chosen as well. For instance, shown in FIG. 8 are a set of performance curves for a damper valve 490 wherein a resistance function that decreases with respect to motion of the contoured valve member 496 is used. Resistance function, $R(lbs.sec./in.^5)$, is illustrated by curve 540 while pressure drop, $P_d(lbs/in.)$ and flow rate, $Q_d(in.^3 sec.)$, are ted by curves 542 and 544, respectively. In FIG. 8, the values shown for R, $P_d$ and $Q_d$ assume zero preload of the spring 500 and they are plotted vs. displacement of the contoured valve member 496, X(mils). A procedure for designing a damper valve 490 is illustrated via the following example calculation for a damper valve 490 having the performance depicted in FIG. 8.

Because the annular orifice 298 has a wedge shaped flow, its flow coefficient is about 50 percent higher than a sharp edged orifice. Thus, $$Q_d = P_d/R = 150A_d(P_d)^{.5}$$

where $A_d$ is the flow area of the annular orifice 298. Also, $$R = 200 - 5000X_d,$$

$$A_d = \pi[(0.047)^2 - r_d^2]$$

where $X_d$ is a displacement value for the contoured valve member 496 and $r_d$ is a valve representative of a particular radius of the contoured valve member 496. Also, valve force is determined by $$F_d = K_d X_d = P_d \pi r_d^2$$

where $K_d$ is the spring constant of the spring 500 which is determined by the relationship $$P_d = 400(\text{lbs/in.}^2) \text{ when } X_d = 20(\text{mils}).$$

Figure 9:
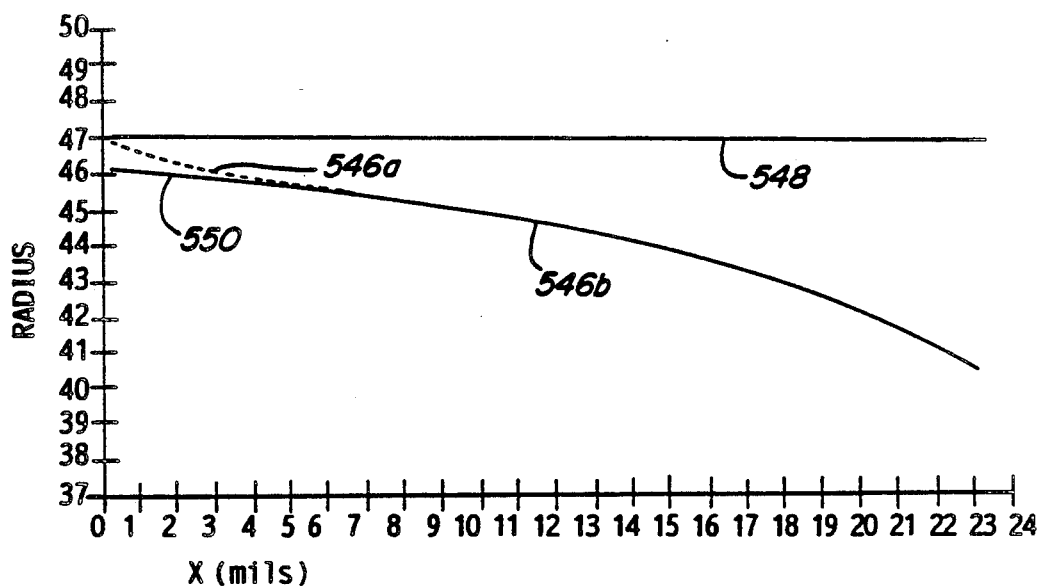
FIG. 9 is a graph showing contoured valve member clearance vs. displacement for a controlled orifice flow restrictor.

When these equations are mutually solved, $X_d$ is found by $$X_d = [(20 + 0.0309 P_d) - (400 - 1.236 P_d + (0.01189 P_d)^{1.5} + (0.000955 P_d)^2)^{.5}]/1000$$

and points generating the curves 540, 542 and 544 are evaluated in a transcendental manner. In addition, values of $r_d$ are also calculated. These values are plotted as curves 546a and 546b in FIG. 9. At $X_d = 0$, the curve 546a has the same value as curve 548 whose value is that of the inside radius of the counterbore 494.

However, the above equations assume that all energy loss in the damper valve 490 is due to kinetic energy loss. Actual loss is partially due to viscous flow energy loss. In fact this form of energy loss is dominant for very small clearances. For instance, power steering fluid has an absolute viscosity of 0.0000171(lb.sec./in.²) at an operating temperature of 170(deg.F.) and according to a formula presented in a book entitled HYDRAULIC CONTROL SYSTEMS by Herbert E. Merritt and published by John Wiley & Sons, Inc., $$R' = P_d/Q_d = 6 \mu L_d/\pi r_d c_d$$

where R' is the resistance of such an orifice and $L_d$ is a length associated with a portion of smaller values of $c_d$. $c_d$, in turn, is the radial clearance between the curve 548 and a combined curve 550 and 546b. The curve 550 is a chosen continuation of the curve 546b which designates contour requirements of the contoured valve member 496 to effect the values of R shown by the curve 540 in FIG. 8.

Figure 10A:
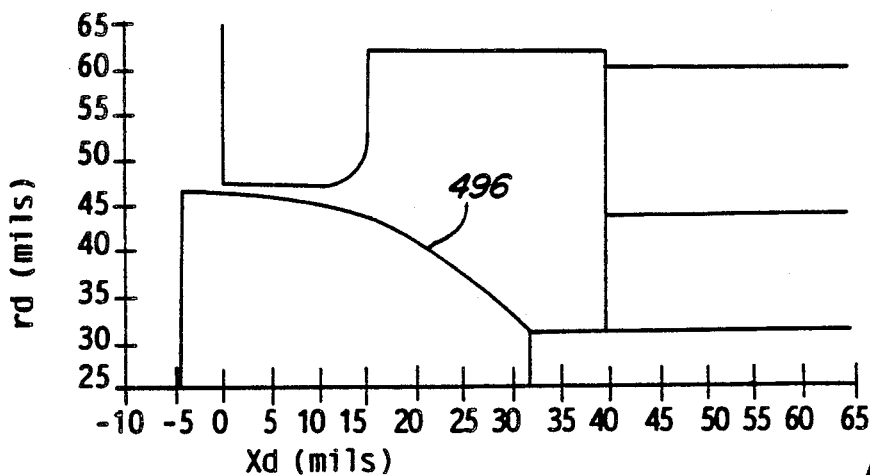
FIGS. 10A, 10B and 10C are diagrammatic graphs which illustrate positions of a controlled orifice for displacements corresponding to zero, quarter and full flow, respectively.
Figure 10B:
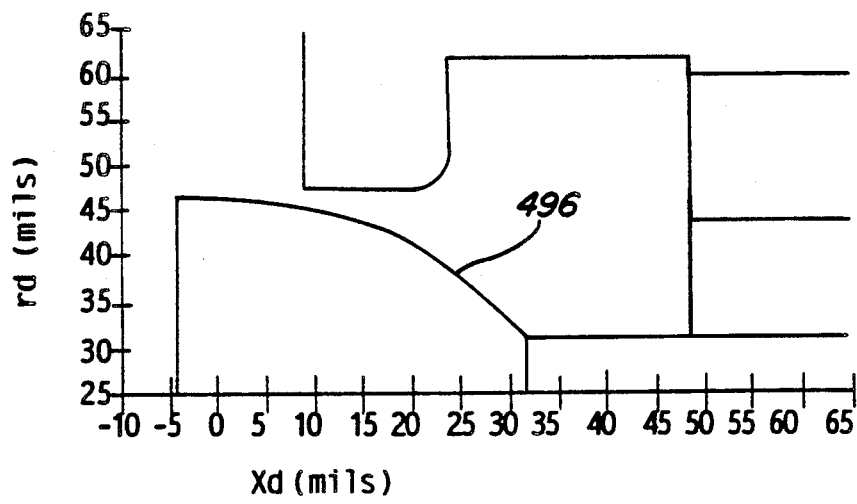
Figure 10C:
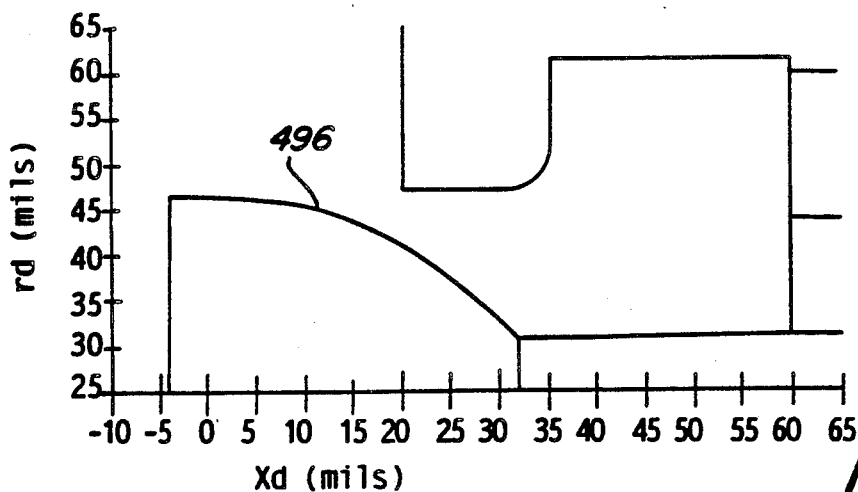

The actual contour of the contoured valve member 496 is determined by progressively taking the values of $c_d$ resulting from the difference between the curve 548 and the curves 546b and 550 and swinging radii with a compass to generate a curve which is then used for the actual contour. Shown in FIGS. 10A, 10B and 10C are enlarged views of the actual contour of the contoured valve member 496 wherein $X_d = 0$(mils), 8.9(mils) and 20.0(mils), respectively. These are values of $X_d$ for which $Q_d = 0$(in.³/sec.), 1(in.³/sec.) and 4(in.³/sec.), respectively.

Figure 11:
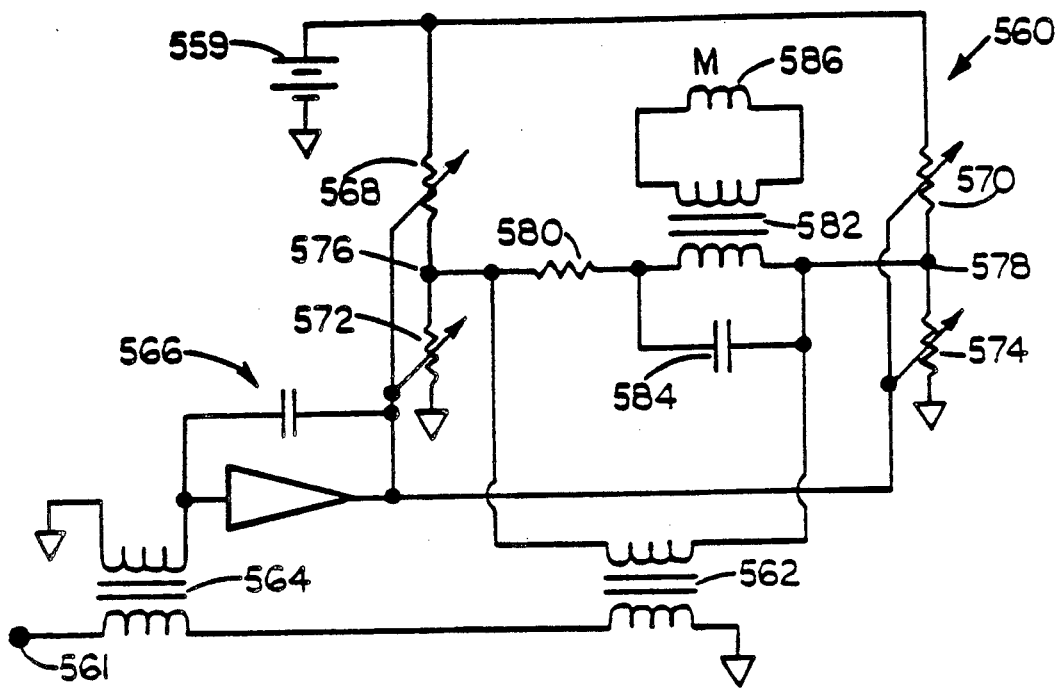
FIG. 11 is a schematic drawing for a simple open-loop control system wherein a torque reaction valve and a hydraulic resistor are utilized to control the position of a mass via a double acting hydraulic cylinder.

Open-loop operation of the torque reaction valve 210 augmented by a particular damper valve assembly 488 having a single valued resistance of 200(lb.sec./in.⁵) can be determined by analyzing a schematic circuit 560 shown in FIG. 11. If an effective radius, $R_v$, of an effective valve area, $A_v$, is chosen equal to 0.4(in.), then $$F_v = T/0.4$$

where $F_v$ is the force imposed upon the effective valve area, $A_v$, and T if the torque imposed upon the input shaft 380.

As illustrated in the schematic circuit 560, a pump unit 559 delivers input flow rate $Q_s$ to a bridge circuit comprising variable resistors 568, 570, 572 and 574. In addition, $F_v$ is applied to the primary of an ideal transformer 562 (which has the ratio $A_v$:1) via a terminal 561 and the primary of an ideal velocity transformer 564. The ideal velocity transformer 564 converts tangential valve velocity $DX_v/dt$ into valve displacement $X_v$ via action of a hypothetical integrating operational amplifier 566. The valve displacement $X_v$ results in variation of values of the variable resistors 568 and 570, whose values correspond to the flow characteristics of the first and second input control orifices 270 and 272, respectively, and the variable resistors 572 and 574, whose values correspond to the flow characteristics of the first and second return control orifices 282 and 284, respectively. Output pressure P appears between circuit nodes 576 and 578.

The output pressure P is applied to a circuit comprising a resistor 580 that is series connected with a parallel combination of the primary of an ideal transformer 582 and a capacitor 584, all in parallel with the secondary of the ideal transformer 562. The ideal transformer 582 simulates the area of the piston 350 (which has the ratio $A_p$:1). The ideal transformer 582 transforms pressure applied to the piston 350 into force which is applied to an inductor 586 (which has the value M). The capacitor 584 simulates the capacitance of the fluid trapped in the cylinder 352 (which has the value C). The ideal transformer 562 simulates the effective net valve area (which has the ratio $A_v$:1). The transforming action of the ideal transformer 562 simulates the relation $$P = F_v/A_v.$$

(The above designated circuit elements have the following values in the examples below: M = 0.25(lb.sec.²/in.), C = 0.000025(in.³/lb), $A_p$ = 1(in.²) and $A_v$ = 0.1(in.²).).

As soon as a circuit becomes more complex than a series or parallel combination of circuit elements, the simplest way to analyze it is by using a method known as the Ladder Method, which method is explained in a book entitled ELECTRICAL ENGINEERING CIRCUITS by Hugh Hildreth Skilling and published by John Wiley & Sons, Inc. In utilizing this method for the pressure/flow problems herein, a velocity of $dX_m/dt$ is assumed to flow in the inductor 586. Then the flow rate across the primary of the transformer 582 is $A_p(dX_m/dt)$ and the pressure drop across the primary of the transformer 582 is $(jwM/A_p)(dX_m/dt)$. This pressure is divided by the impedance of the capacitor 584, $(-j/wC)$ to determine the flow rate through the capacitor 582 (which is $(-1)(w^2MC/A_p)(dX_m/dt)$). These flow rates are then summed and multiplied by the resistance value of the resistance 580, R, to determine the pressure drop across the resistor 580. This pressure drop is summed with the pressure drop across the primary of the transformer 582 to determine a concomitant value for the output pressure P. This is multiplied by the effective valve area $A_v$ which results in an equation relating $(dX_m/dt)$ to $F_v$ in terms of R, $A_p$, $A_v$, w, M and C. Finally, the resulting equation is rearranged and the Laplace-transform variable s is applied which results in the block transfer function $$X_mF_v=(1/RA_pA_v)/s[(MC/A_p^2)s^2+(M/RA_p^2)s+1]$$

Figure 12A:
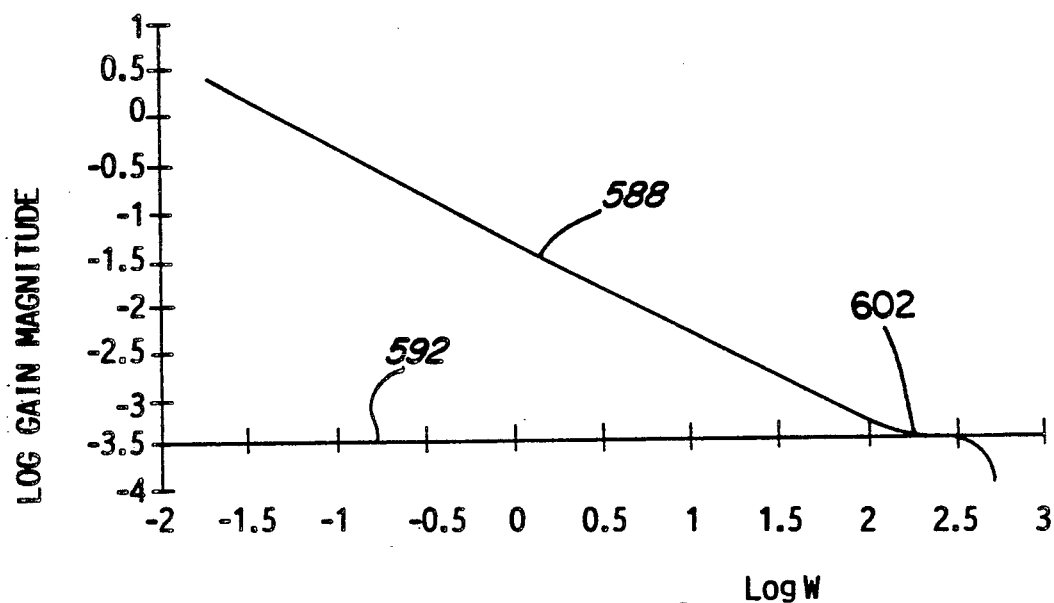
FIGS. 12A and 12B are Bode diagrams which illustrate the dynamic performance range of the open-loop control system of FIG. 11.
Figure 12B:
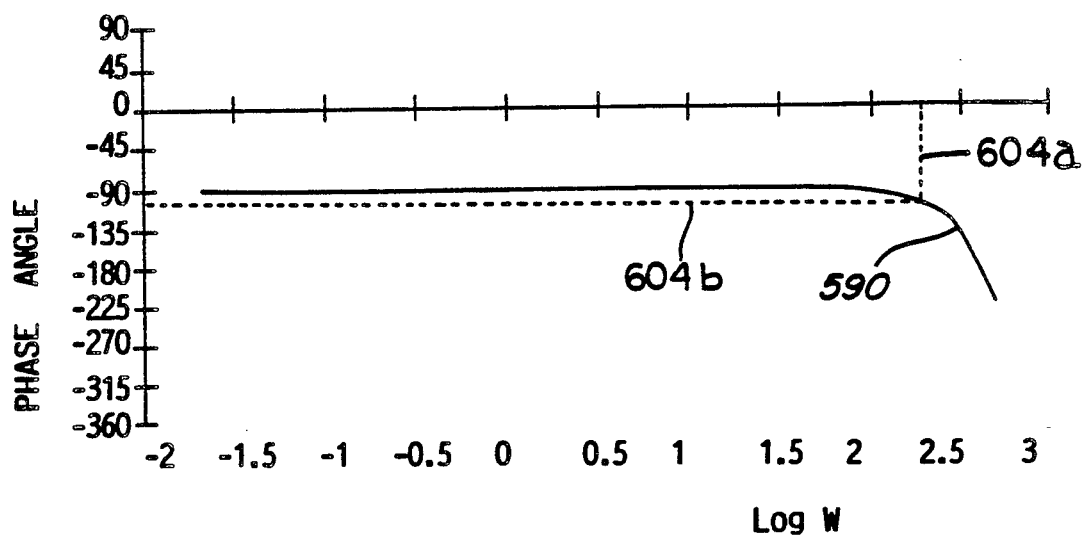

Shown in FIGS. 12A and 12B are Bode diagrams for the gain magnitude and phase angle, respectively, of this block transfer function (as evaluated by using the circuit values mentioned above). A curve 588 depicts the log of the magnitude of $X_m/F_v$ shown in FIG. 12A and a curve 590 depicts the concomitant phase angle shown in FIG. 12B.

Figure 13:
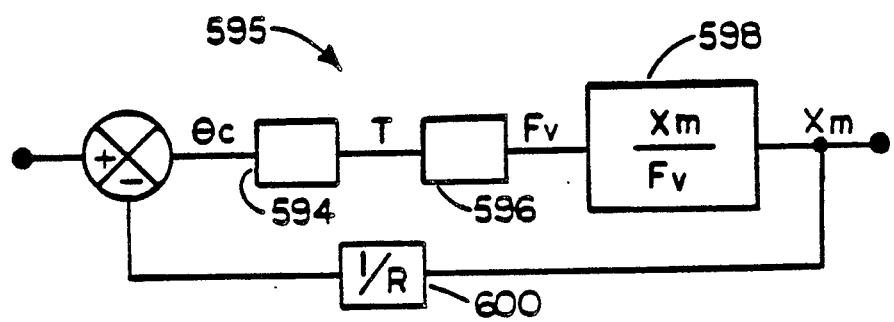
FIG. 13 is a block diagram which depicts a closed-loop servo system comprising the open-loop control system illustrated in FIG. 11.

The torsional stiffness of the torsion bar 213 determines the log $(X_m/F_v)$ value of the abscissa 592. Shown in FIG. 13 is a simplified block diagram 595 for a closed-loop servo system comprising the closed-loop system described by the schematic circuit 560 and the mechanical features of the torque reaction valve 210. Comprised in a block 594 is the torsional stiffness value of 400(in.lb/rad.) selected for the torsion bar 213. (Thus, a maximum value of $\theta_e=0.1$(rad.) results in T=40(in.lb).) The torque value is then divided by R=0.4(in.) in block 596 to determine a value for $F_v$. (Yielding a maximum value of $F_v=100$(lbs) which when divided by $A_v=0.1$(in.$^2$) results in a maximum value of P=1000(lb/in.$^2$). $X_m$ is determined via multiplication of $X_m/F_v$ in block 598, which block comprises the above defined block transfer function). $X_m$ is fed back via block 600 whose value is the inverse of the radius of the pinion 328, $1/N_p=1/0.333$(in.). Finally, the $X_m/F_v$ value of the abscissa 592 is that value for the block 598 which will result in a loop gain of 1. This value is the inverse of the product of the values of the blocks 594, 596 and 600, or 0.000333(in./lb). Therefore, the abscissa 592 is plotted at log (0.000333) = −3.477.

The phase angle associated with unity gain cross-over (at point 602), determines the stability of the closed-loop servo system. This angle is shown (via following lines 604a and 604b) to be −106(deg.) in FIG. 12B. However, the nature of the curves 588 and 590 at frequencies slightly higher than that corresponding to unity gain cross-over (i.e., 182(rad./sec.)=29.0(Hz)) suggests that slight changes in gain could lead to stability problems. This problem can easily be corrected by reducing the torsional stiffness of the torsion bar 213. However, that would concomitantly diminish the other performance parameters of the closed-loop servo system.

One might be tempted to change the value of R. Increasing the value of R would reduce the gain, but would also reduce circuit damping. If carried far enough, this would result in the curve 588 having a resonance-like characteristic. Reducing the value of R would increase the gain. In fact, if R is reduced to near zero values, $X_m/F_v$ becomes $A_p.MA_vs^2$ (which equals $(-1)(A_p/MA_vw^2)$) with a concomitant constant phase angle value of −180(deg.).

Another way to increase circuit damping is to introduce a "leak" across the primary of the transformer 582. The conductance of such a "leak" would obviously serve to dampen any oscillations of the parallel circuit comprising the mass 586, transformer 582 and capacitor 584. However, because it would be in series with the resistor 580, it would also reduce the maximum pressure available at the primary of the transformer 582 and the concomitant maximum force available to move the mass 586.

Figure 14:
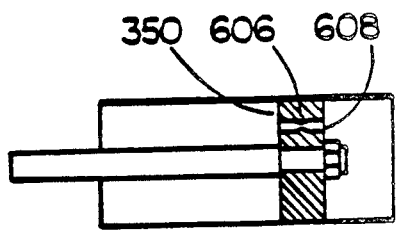
FIG. 14 is a sectional view of an orifice which is hydraulically in parallel with a piston of the double acting cylinder and which is used to improve the dynamic characteristics of the open-loop control system of FIG. 11.

On the other hand, if a system having more realistic load characteristics is assumed, a non-linear resistor, such as an orifice whose resistance is $R_b=(P_b)^{.5}/100A_b$, may be utilized as the "leak". The increasing resistance, with respect to pressure, of such an orifice limits the loss of maximum force available to move the mass 586. For instance, consider a system having a load characterized by $$F=F_o+K_1X_m+K_2(dX_m/dt)$$

where F is a load force encountered by the mass 586 whenever it moves, $F_o$ is a coulomb (friction) force component of the load force, $K_1$ is a load spring constant (i.e., such as the restoring caster angle derived force encountered by a vehicular steering system), and $K_2$ is load damping constant (i.e., such as encountered by scrubbing soft rubber against an abrasive surface. The nature of such a load force permits an orifice 606 as shown in FIG. 14 to be utilized anywhere in parallel with the primary of the transformer 582. As shown in FIG. 14, one convenient location for mounting the orifice 606 is in a hole 608 formed in the piston 350.

Figure 15:
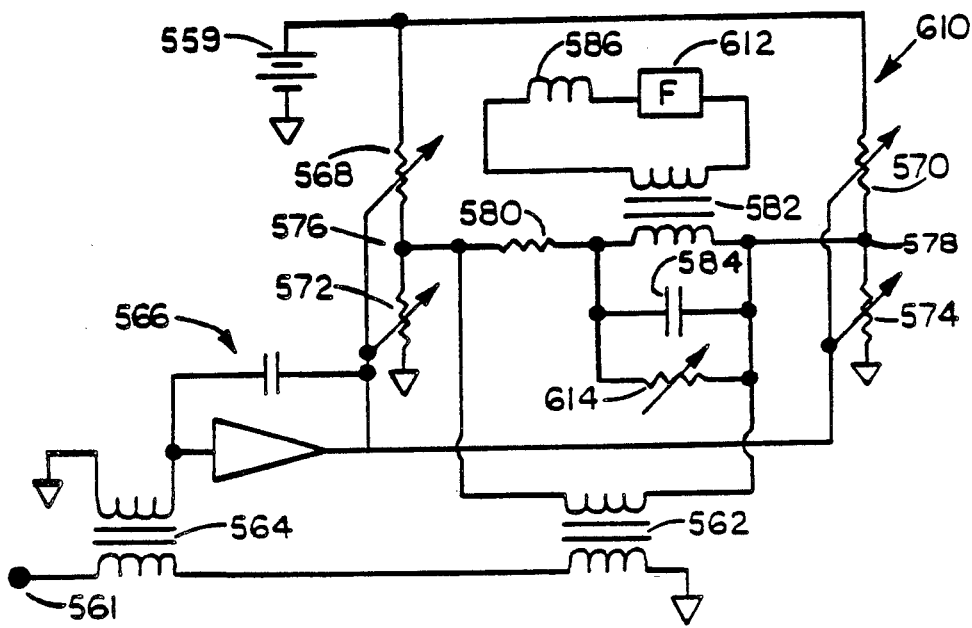
FIG. 15 is a schematic drawing of an enhanced open-loop control system which additionally comprises the orifice shown in FIG. 10 and a block representing a load placed upon the piston of the double acting cylinder.

Shown in FIG. 15 is a schematic circuit 610 which has been modified to include a block 612 comprising the load force F and a variable resistor 614 depicting the variable resistance of the orifice 606. The schematic circuit 610 is analyzed generally in the same manner as the schematic circuit 560. However, the pressure drop across the primary of the transformer 582 is now $(jwM/A_p)(dX_m/dt)+(F/A_p)$ and the flow rate through the capacitor 584 is now $(-1)(w^2MC/A_p)(dX_m/dt)+(-C/A_p)(dF/dt)$. The function (dF/dt) can be found via the equation $$dF/dt=K_1(dX_m/dt)+K_2(d^2X_m/dt^2).$$

In addition, there is a parallel flow rate through the variable resistor 614 of $(jwM/R_bA_p)(dX_mdt)+F/R_bA_p)$.

Because of the $K_1X_m$ term in the load force F, the system is no longer a so-called type 1 system. That is, the denominator of a resulting block transfer function is no longer multiplied by the Laplace transform variable s to the first power. The practical result of this is that there will be a residual steady state error in $X_m$ and concomitant non-zero steady state values of F and P. For this reason, and for the reason that some persons skilled in the art may not be familiar with Laplace-transformations, the resulting equations for determining the gain magnitude and phase angle of a new block transfer function are presented as follows:

$$X_m/[F_v - ((R + R_b)A_vF_o/R_bA_p)] =$$
$$(1/RA_pA_v)/[(K_1(R + R_b)/RR_bA_p^2) -$$
$$(((R + R_b)M/RR_bA_p^2) + (K_2C/A_p^2))w^2 +$$
$$jw(1 + (K_1C/A_p^2) + (K_2(R + R_b)/RR_bA_p^2) - (MCw^2/A_p^2))]$$

and $$\phi = -\tan^{-1}[1 + (K_1C/A_p^2) + (K_2(R + R_b)/RR_bA_p^2) -$$
$$(MCw^2/A_p^2)]w/,$$
$$[(K_1(R + R_b)/RR_bA_p^2) - (((R + R_b)M/RR_bA_p^2) +$$
$$(K_2C/A_p^2))w^2],$$

respectively.

Steady state values of these equations can be evaluated by setting w=O. When the relation T=0.4F is included, the following equations describe torque and phase angle as a function of $K_1$, $R$, $R_b$, $A_p$, $A_v$, $F_o$ and $X_m$ under steady state conditions:

$$T = 0.4[(R + R_b)A_v/R_bA_p](F_o + K_1X_m) \text{ and}$$

$$\phi = 0(\text{rad.}), \text{ respectively.}$$

Figure 16:
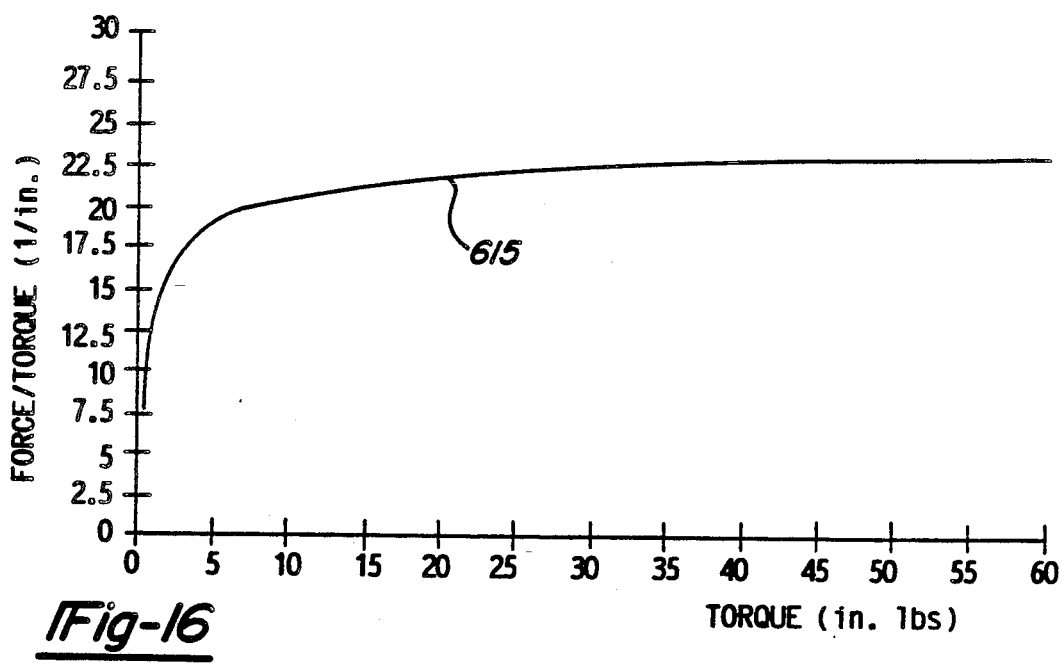
FIG. 16 is a graph illustrating output force/torque vs. torque for the open-loop control system of FIG. 15.

As mentioned above, most of the circuit values previously mentioned are used in evaluating the above equations, including $M = 0.25(\text{lb.sec.}^2/\text{in.})$, $C = 0.000025(\text{in.}^5/\text{lb})$, $A_p = 1(\text{in.}^2)$ and $A_v.1(\text{in.}^2)$. However, $K_1$, $K_2$, $R$ and $R_b$ may vary as a function of load conditions. Shown in FIG. 16 is a curve 615 which depicts output force/torque vs. torque for $K_1 = 100(\text{lb/in.})$, $R = 200(\text{lb.sec./in.}^5$ and $R_b = 63.25(F/A_p^2)^{.5}(\text{lb.sec/in.}^5))$ where the output force, F, equals the sum, $F_o + K_1X_m$.

(This value for $R_b$ requires an orifice sized via the following procedure:

$$R_b = (1/A_p^2)(dF/dQ_b) = [d(Q_b^2/10000A_b^2)/dQ_b]$$

$$= [Q_b/5000A_b^2] = [100A_b(F/A_p^2)^{.5}/5000A_b^2],$$

thus $63.25(F/A_p^2)^{.5} = (.02/A_b)(F/A_p^2)^{.5}$, or $A_b = (.02/63.25) = .000316(\text{in.}^2)$, and $d_b = .0226(\text{in.})$ where $d_b$ is the diameter of the orifice 606).

Figure 17A:
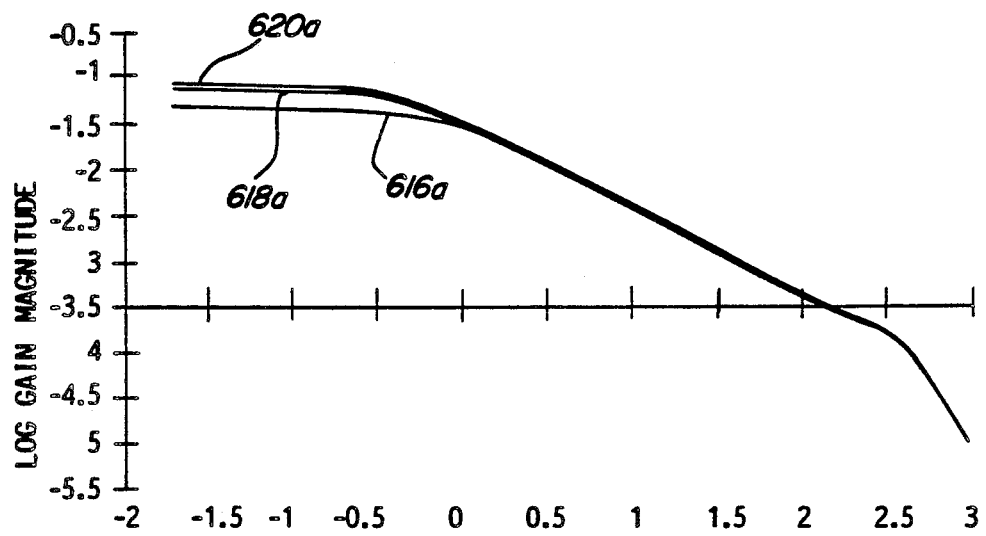
FIGS. 17A and 17B are Bode diagrams which illustrate the dynamic performance range of the open-loop control system of FIG. 15 for output forces of 10(lbs), 100(lbs.), and 1000(lbs.).
Figure 17B:
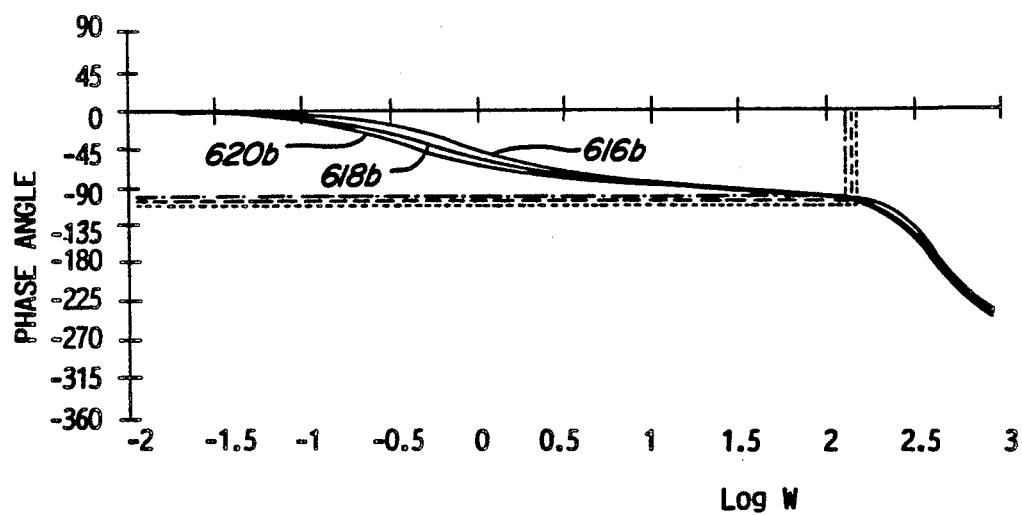

Shown in FIGS. 17A and 17B are Bode diagrams for the gain magnitude and phase angle, respectively, of the new block transfer function for the following assumed values for $K_1$, $K_2$, $R$ and $R_b$ which correspond to $F = 10(\text{lbs})$, $100(\text{lbs})$ and $1000(\text{lbs})$ and near zero values of $dX_m/dt$: $K_1 = 100(\text{lbs/in.})$; $K_2$ $10(\text{lbs.sec./in.})$, $20(\text{lb.sec./in.})$ and $40(\text{lb.sec./in.})$, respectively; $R = 200(\text{lb.sec./in.}^5)$; and $R_b = 200(\text{lb.sec./in}^5)$, $632.5(\text{lb.sec./in.}^5)$ and $2000(\text{lb.sec./in.}^5)$, respectively. In FIGS. 17A and 17B, curves 616a and 616b, 618a and 618b, and 620a and 620b correspond to $F = 10(\text{lbs})$, $100(\text{lbs})$ and $1000(\text{lbs})$, respectively.

Figure 18A:
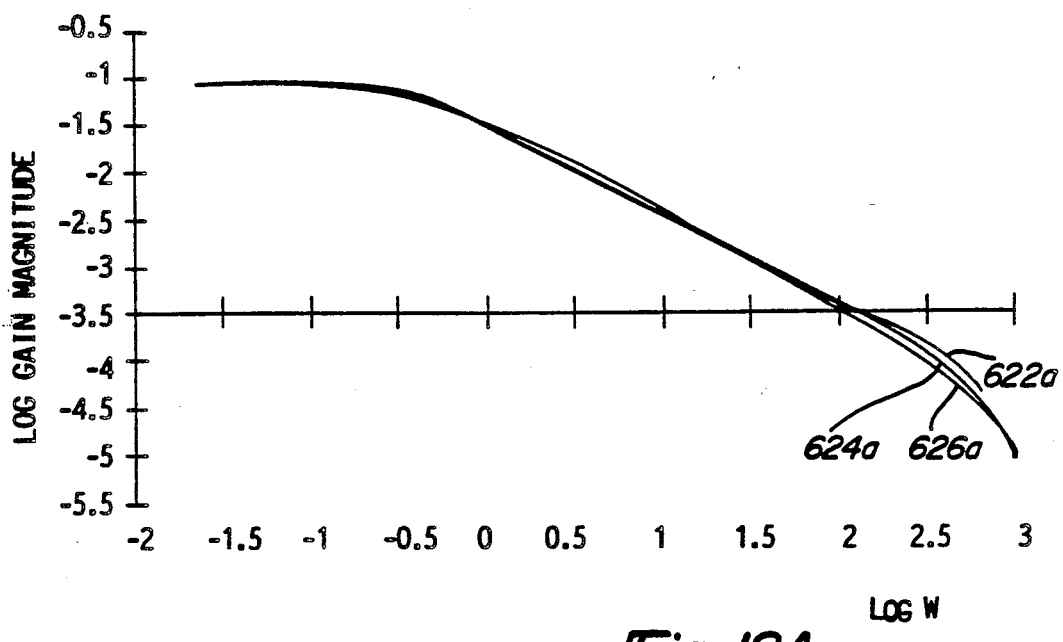
FIGS. 18A and 18B are Bode diagrams which illustrate the dynamic performance range of the open-loop control system of FIG. 15 for velocities of 0(in./sec.), 1(in./sec.), and 4(in./sec.) and an output force of 1000(lbs.).
Figure 18B:
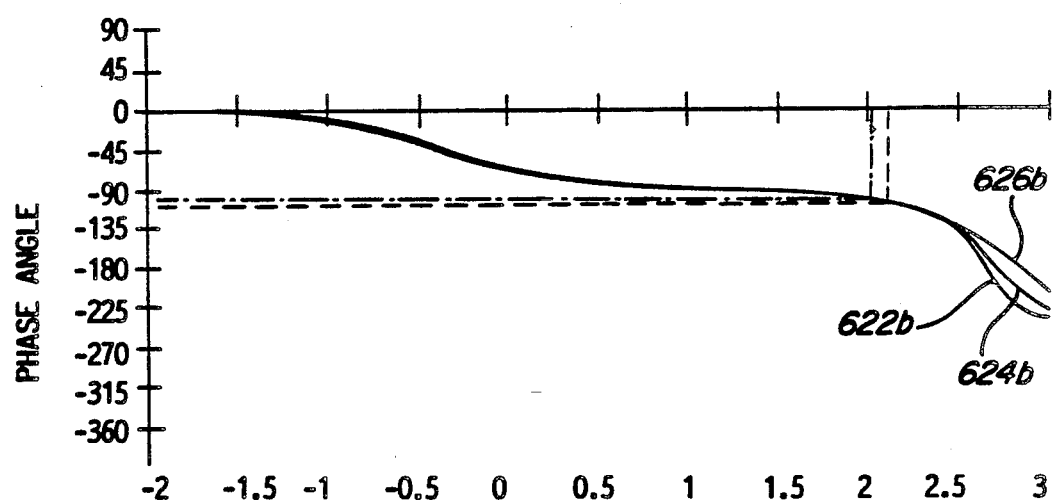

Shown in FIGS. 18A and 18B are Bode diagrams for the gain magnitude and phase angle, respectively, of the new block transfer function for the following assumed values for $K_1$, $K_2$, $R$ and $R_b$ corresponding to $F = 1000(\text{lbs})$ and $dX_m/dt = 0(\text{in./sec.})$, $1(\text{in./sec.})$ and $4(\text{in./sec.})$: $K_1 = 100(\text{lbs/in.})$; $K_2 = 40(\text{lb.sec./in.})$, $80(\text{lb.sec./in.})$ and $160(\text{lb.sec./in.})$, respectively; $R = 200(\text{lb.sec./in.}^5)$, $150(\text{lb.sec./in.}^5)$ and $100(\text{lb.sec./in.}^5)$, respectively; and $R_b = 2000(\text{lb.sec./in.}^5)$. In FIGS. 18A and 18B curves 622a and 622b, 624a and 624b, and 626a and 626b correspond to $dX_mdt = 0(\text{in./sec.})$, $1(\text{in./sec.})$ and $4(\text{in./sec.})$, respectively. All of the curves shown in FIGS. 17A, 17B, 18A and 18B depict stable operation with very acceptable phase angles and margins of error.

Figure 19:
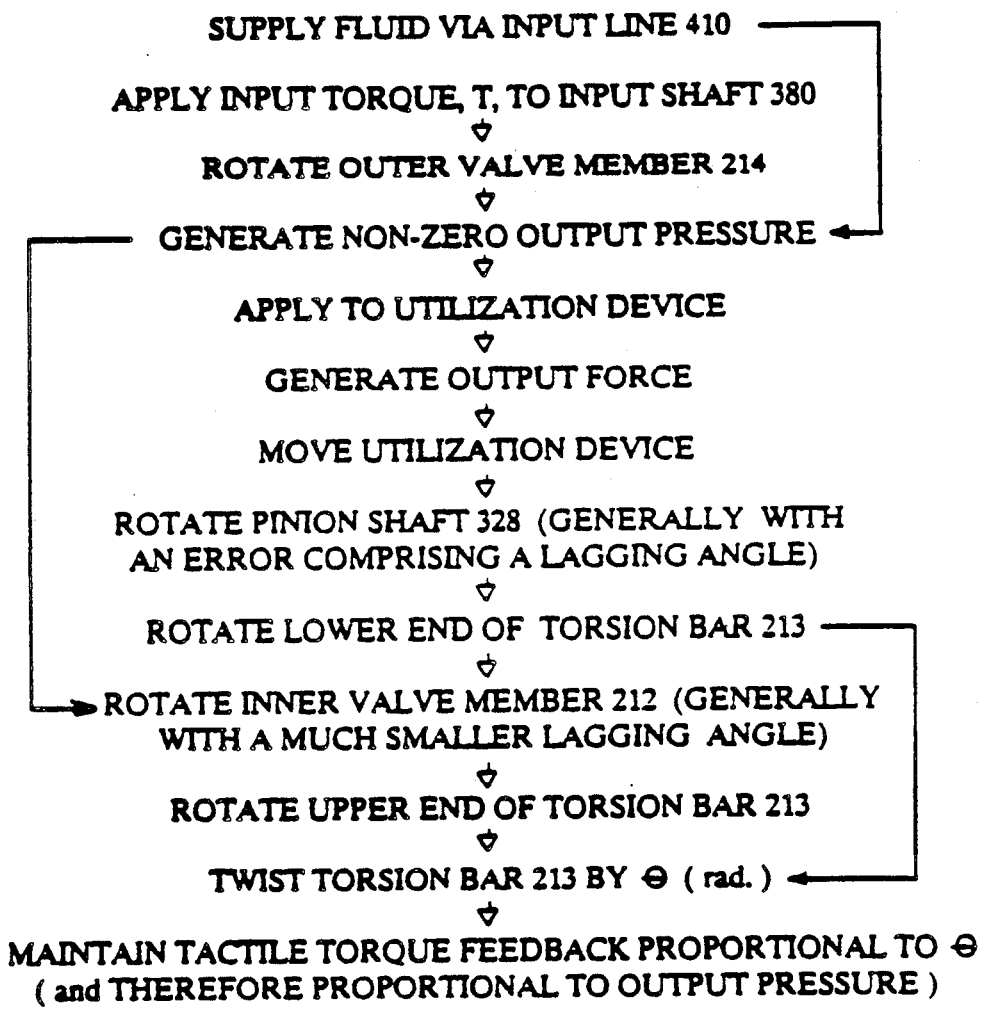
FIG. 19 is a flowchart outlining a method of controlling a closed-loop servo system comprising a torque reaction valve.

FIG. 19 is a flowchart that outlines the procedure followed in controlling a closed-loop servo system comprising a torque reaction valve 210. Fluid is supplied to the torque reaction valve 210 via input line 410. Torque is applied to input shaft 380 which causes outer valve member 214 to rotate. Non-zero output pressure is generated and applied to a utilization device. The utilization device generates an output force which (in general) results in movement of the utilization device. The movement of the utilization device causes counter-rotation of pinion shaft 328 and the lower end of torsion bar 213. The output pressure also causes inner valve member 212 to rotate—which causes rotation of the upper end of the torsion bar 213. Combined counter-rotation of its lower end and rotation of its upper end causes the torsion bar 213 to twist by $\theta_e$. The twisting of the torsion bar 213 maintains tactile torque feedback (to the input shaft 380) which is proportional to $\theta_e$ (and therefore proportional to the output pressure).

Figure 20:
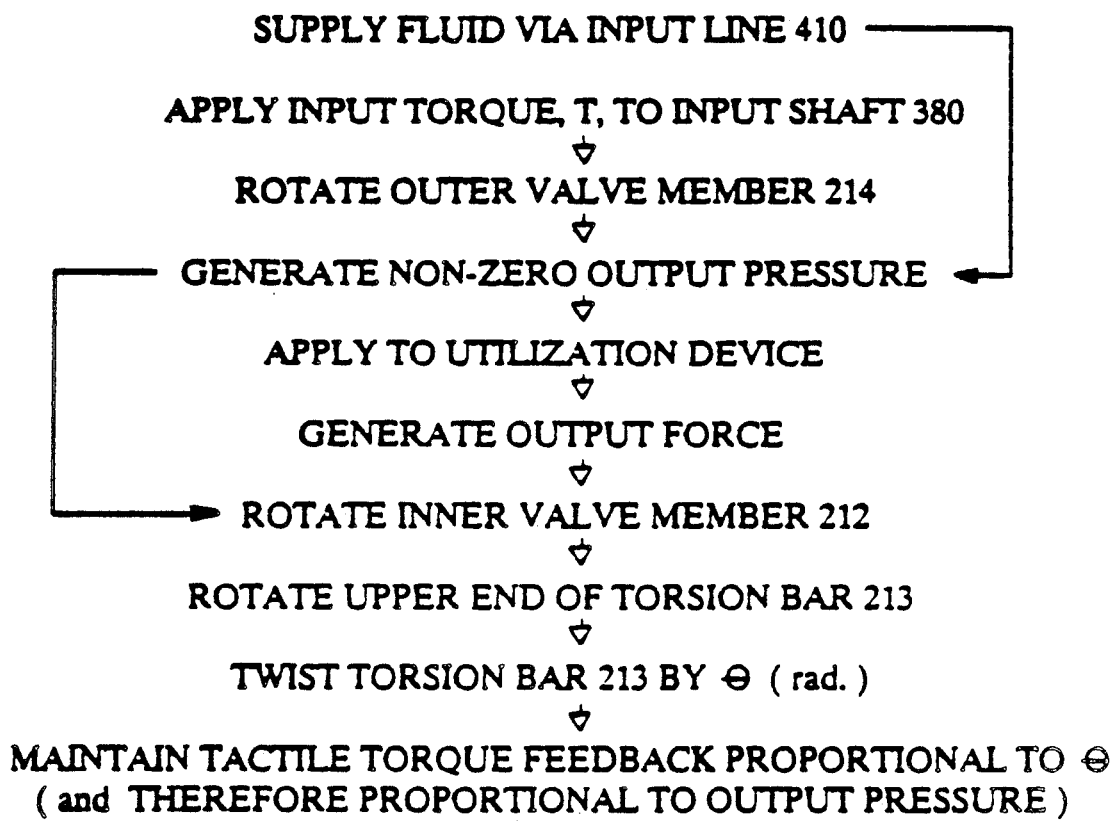
FIG. 20 is a flowchart outlining a method of controlling an open-loop servo system comprising a hand operated controller.

FIG. 20 is a flowchart that outlines the procedure followed in controlling an open-loop servo system comprising a differential pressure controller 450. Fluid is supplied to the differential pressure controller 450 via input line 410. Torque is applied to input shaft 380 which causes outer valve member 214 to rotate. Non-zero output pressure is generated and applied to a utilization device. The utilization device generates an output force. The output pressure also causes inner valve member 212 to rotate—which causes rotation of the upper end of the torsion bar 213. The rotation of its upper end causes the torsion bar 213 to twist by $\theta_e$. The twisting of the torsion bar 213 maintains tactile torque feedback (to the input shaft 380) which is proportional to $\theta_e$ (and therefore proportional to the output pressure.

Figure 21:
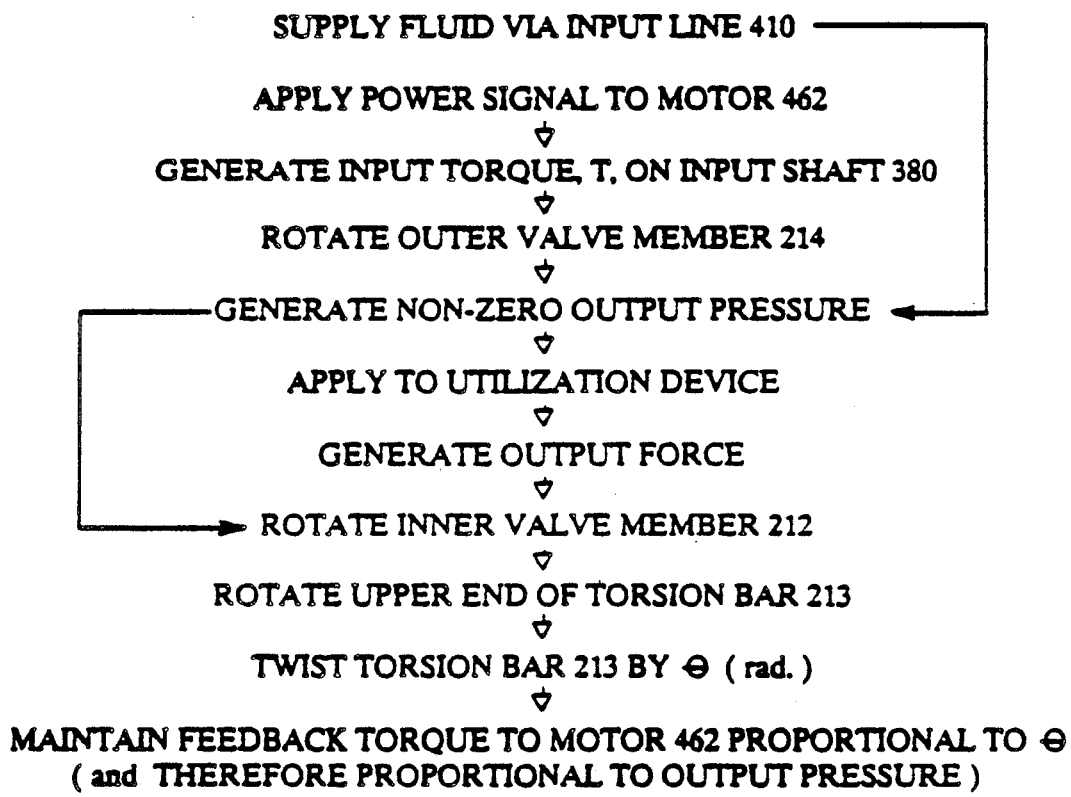
FIG. 21 is a flowchart outlining a method of controlling a closed-loop or open-loop servo system comprising an electro-hydraulic servo valve.

FIG. 21 is a flowchart that outlines the procedure followed in controlling a servo system (either open- or closed-loop) comprising an electro-hydraulic servo valve 460 via input line 410. A power signal is applied to motor 462 which exerts torque on input shaft 380. This causes outer valve member 214 to rotate. Non-zero output pressure is generated and applied to a utilization device. The utilization device generates an output force. The output pressure also causes inner valve member 212 to rotate—which causes rotation of the upper end of the torsion bar 213. The rotation of its upper end causes the torsion bar 213 to twist by $\theta_e$. The twisting of the torsion bar 213 maintains feedback torque to the motor 462 (via the input shaft 380) which is proportional to $\theta_e$ (and therefore proportional to the output pressure.

Figure 22:
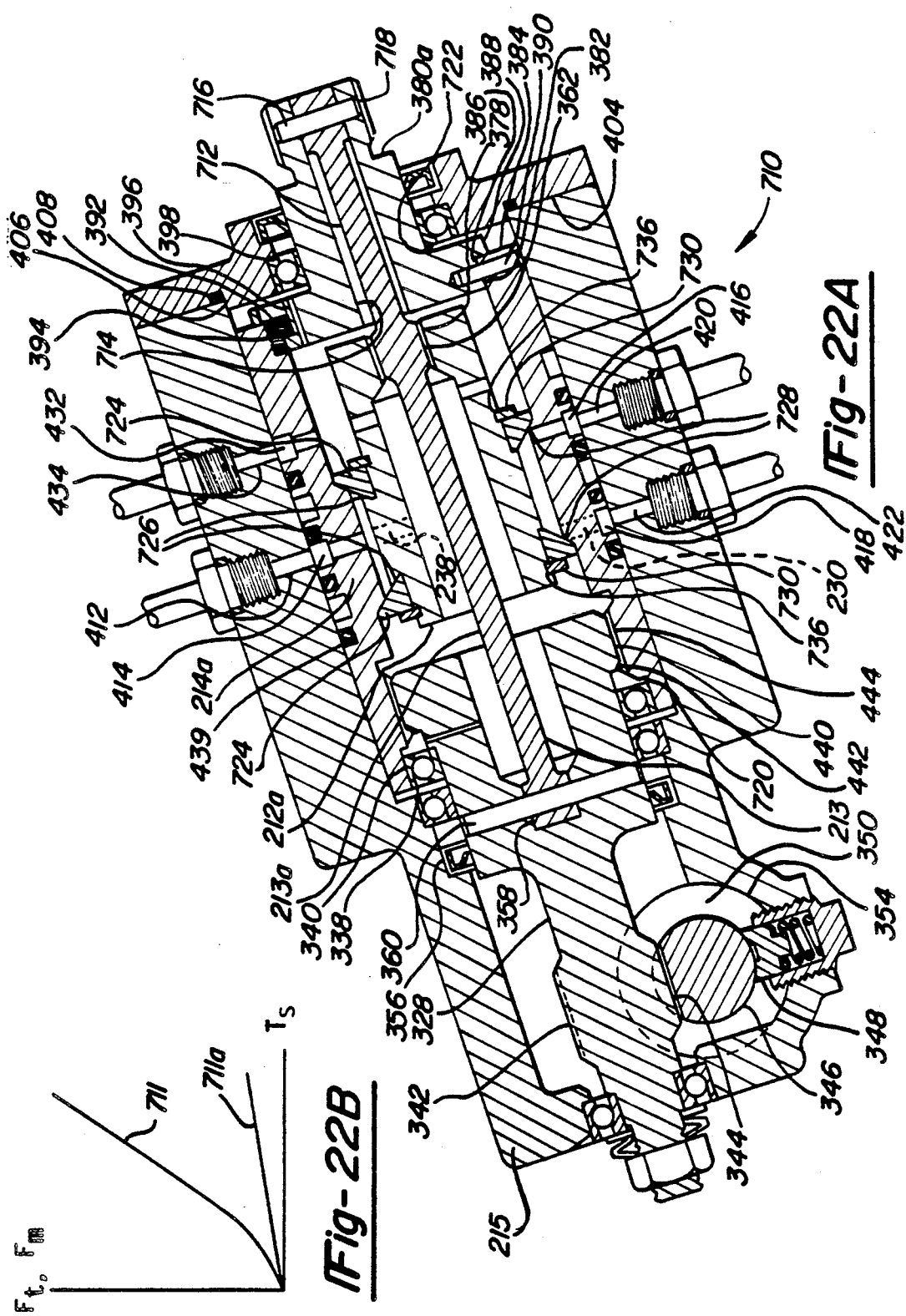
FIG. 22A is a longitudinal section view which depicts an improved torque reaction valve wherein increasing values of closed-loop transfer function are enabled via an extension of the valve's torsion bar.
FIG. 22B is graph illustrating static performance characteristics of the improved torque reaction valve of FIG. 22A.

Other preferred embodiments of the present invention will now be described with reference to FIGS. 22A-41F. Shown in FIG. 22A is a longitudinal section view of an improved torque reaction valve 710 which comprises first and second improvements to either of the torque reaction valves 210 or 260 as shown in FIG. 3 and fully described hereinabove. A first improvement comprises means adapted for increasing values of closed-loop transfer function concomitant with increasing values of steering wheel torque. A second improvement comprises means adapted for providing rotational hydrostatic bearing support between inner and outer valve members 212a and 214a, respectively.

(Suffix letters "a" or "b" are added to a part designation number to denote that the part so designated has been changed significantly to implement other preferred embodiments of the present invention. In each case, such changes are fully described hereinbelow.)

The means for increasing values of closed-loop transfer function comprise a torsion bar extension 712 (of a torsion bar 213a) which is positioned in a cylindrical cavity 714 formed in an input shaft 380a. It is secured thereat via a pin 716. Assembly of the improved torque reaction valve 710 comprises securing the torsion bar 213a to a pinion shaft 328 via a pin 360 and constraining the torsion bar 213a rotationally within the inner valve member 212a via a male spline 362 and a splined hole 378, respectively. Subsequently, the torsion bar extension 712 is secured to the input shaft 380a via the pin 716.

The input shaft 380a, together with the inner valve member 212a and the outer valve member 214a, provide means for receiving said input torque and generating hydraulic fluid pressure in response thereto. The torsion bar 213a provides means for compliantly coupling the inner valve member 212a to a reference position, while the pinion shaft 328 provides means for establishing the reference position. Finally, the torsion bar extension 712 provides means for compliantly coupling the inner valve member 212a to the input shaft 380a.

Indexing tolerance between rotational positions of the torsion bar 213a/pinion shaft 328 interface (as secured by the pin 360) and the male spline 362/splined hole 378 interface are nominal because they serve only to locate the tangentially loose fitting spline set 440 at its approximate center when the inner and outer valve members 212a and 214a, respectively, are hydraulically centered (i.e., when differential output pressure has a zero value). On the other hand, indexing tolerance between rotational positions of the male spline 362/splined hole 378 and the torsion bar extension 712/input shaft 380a (as secured by the pin 716) is critical because the torsion bar extension 712 should be unstressed when the inner and outer valve members 212a and 214a, respectively, are hydraulically centered.

A preferred method of achieving the required indexing tolerance between the rotational positions of the male spline 362/splined hole 378 and the torsion bar extension 712/input shaft 380a comprises hydraulically powering up an assembly which includes the inner and outer valve members 212a and 214a, respectively, the torsion bar 213a (including, of course, the torsion bar extension 712), and the input shaft 380a. The inner and outer valve members 212a and 214a, respectively, are allowed to center themselves via internally generated reaction torque. Then a hole 718 is formed in both the input shaft 380a and the torsion bar extension 712 for receiving the pin 716. If desired, valve output pressure can be measured during the procedure to ensure that it has zero value (i.e., in the absence of input torque applied to the input shaft 380a).

When input torque (i.e., from a steering wheel via a steering shaft) is applied to the input shaft 380a, the input torque is split between the torsion bar extension 712 and the outer valve member 214a. Incremental changes in the values of torque present in the torsion bar extension 712 and the outer valve member 214a are proportional to torsion bar extension stiffness, $K_f$, and valve stiffness, $K_v$ (i.e., the torsional stiffness of the hydraulic interface between the inner and outer valve members 212a and 214a, respectively), respectively. The valve stiffness is derived from the internally generated reaction torque. This is done via differentiation of the internally generated reaction torque with respect to a deflection angle, $\theta_v$. The deflection angle $\theta_v$ is common to both rotational deflection of the torsion bar extension 712 and rotation of the outer valve member 214a with respect to the inner valve member 212a. $K_f$ and $K_v$ can be determined by the following formulas:

$$K_f = (G d_f^4)/(10.21 l_f)$$

where G is the shearing modulus of elasticity, $d_f$ is the diameter of the torsion bar extension 712, and $l_f$ is the length of the torsion bar extension 712, and $$K_v = 2 A_v (R_v / 200 N_v l_v)^2$$
$$[(Q_s - Q_v)^2/(X_o + X_v)^3 + (Q_s + Q_v)^2/(X_o + X_v)^3]$$

where $A_v$ is effective valve area as discussed above, $R_v$ is valve radius, $N_v$ is the number of slot sets, $l_v$ is valve slot length, $Q_s$ is supply flow rate, $Q_v$ is output flow rate (i.e., differential output flow rate from the improved reaction valve 710), $X_o$ is centered valve clearance (between the inner and outer valve members, 212a and 214a, respectively), and $X_v$ is tangential valve motion.

Torque present in the torsion bar extension 712 has the value $T_f = K_f \theta_v$, where $\theta_v$ is the twist angle of the torsion bar extension 712. Valve motion can be found by $X_v = R_v \theta_v$. And, internally generated reaction torque, $T_v$, can be found by the following formula:

$$T_v = R_v A_v / (200 N_v l_v)^2$$
$$[((Q_s - Q_v)/(X_o - X_v))^2 - ((Q_s + Q_v)/(X_o + X_v))^2].$$

Finally, torque input to the input shaft 380a has the value $T = T_f + T_v$. Alternately, these equations can be solved in an iterative fashion for any particular desired value of input torque, T.

Shown in FIG. 22B is a curve 711 which illustrates static performance characteristics of a power steering system which incorporates the improved torque reaction valve 710. Steering force values, $F_t$, depicted by the curve 711 include mechanical steering force values, $F_m$, depicted by curve 711a. Hydraulically derived steering force values, $F_p$, comprise the values depicted by the curve 711 less the values depicted by the curve 711a. The mechanical force values result from meshing of pinion gear teeth 342 with rack gear teeth 344 of a rack assembly 346 (which includes a piston (not shown) of the power steering system).

As shown in FIG. 3, the assembly which comprises the outer valve member 214 and the input shaft 380 is constrained for rotational movement only (with respect to the valve body 215). This is accomplished by ball bearings 338 and 398 which are shown as being axially constrained by the valve body 215, pinion shaft 328, outer valve member 214 and input shaft 380 by suitable shoulders and/or washers. Thus, relative axial motion of that assembly is precluded in the torque reaction valves 210 and 260.

However, in the improved torque reaction valve 710 of the present invention, a similar axial constraint is already provided via securing the input shaft 380a to the torsion bar extension 712 by the pin 716. Thus, the ball bearings 338 and 398 should be relieved of their axial constraints as described above. This is shown in FIG. 22A by removing the wavewasher 399 and providing operational clearances at points 720 and 722. Alternately, the ball bearings 338 and 398 could be replaced by sleeves or needle bearings as desired (not shown).

Spherical "teacup" hydrostatic bearings 724 are mounted on both ends of the inner valve member 212a against concave spherical seats 726 formed therein. The hydrostatic bearings 724 rotate within matching concave spherical seats 728 formed in the outer valve member 214a.

Figure 23:
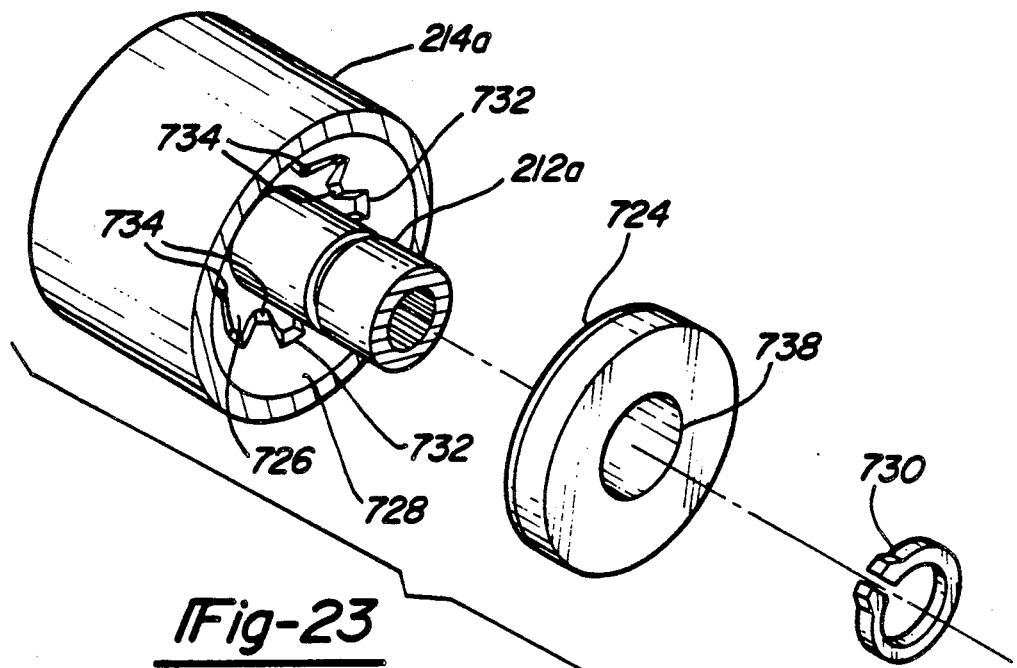
FIG. 23 is an exploded isometric view which depicts operational details of hydrostatic bearings utilized in the improved torque reaction valve.

Hydraulic functioning of the hydrostatic bearings 724 is illustrated in FIG. 23. Shown in FIG. 23 is an exploded view comprising one set of spherical seats 726 and 728, hydrostatic bearing 724 and a retaining ring 730. Pressurized hydraulic fluid necessary for supporting the hydrostatic bearing 724 (for free rotation with respect to the spherical seat 728) is provided from each one of pressure slots 732 and pressurized ones of output slots 734.

Assembly of the hydrostatic bearings 724 is effected via axially positioning them against the spherical seats 726 and forcibly retaining them with the retaining rings 730. This is accomplished by utilizing beveled edge grooves 736 which are axially located in the inner valve member 212a as shown in FIG. 22A. As each retaining ring 730 contracts into its respective beveled edge groove 736, it is urged into a desired axial retaining position whereby it provides the forcible retention of its respective hydrostatic bearing 724.

Because it is desirable to operate the hydrostatic bearings 724 with minimal clearance (to the spherical seats 728), precision methods of manufacture are required for each one of the hydrostatic bearings 724 and the spherical seats 726 and 728. The fundamental geometry of the hydrostatic bearings 724 is formed accurately via methods commonly utilized in the optics industry to form accurate plano-convex lenses. This includes forming a center hole 738 concentrically.

Figure 24A:
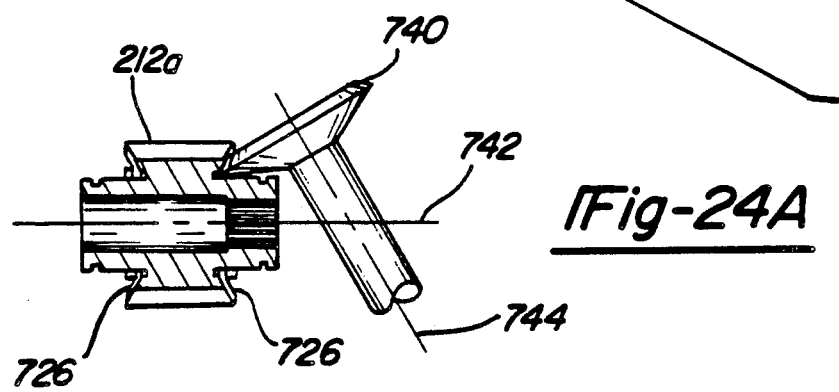
FIGS. 24A and 24B are sectional views which depict precision methods of manufacture for mounting and rotational concave seats for the hydrostatic bearings on inner and outer valve members of the torque reaction valve, respectively.
Figure 24B:
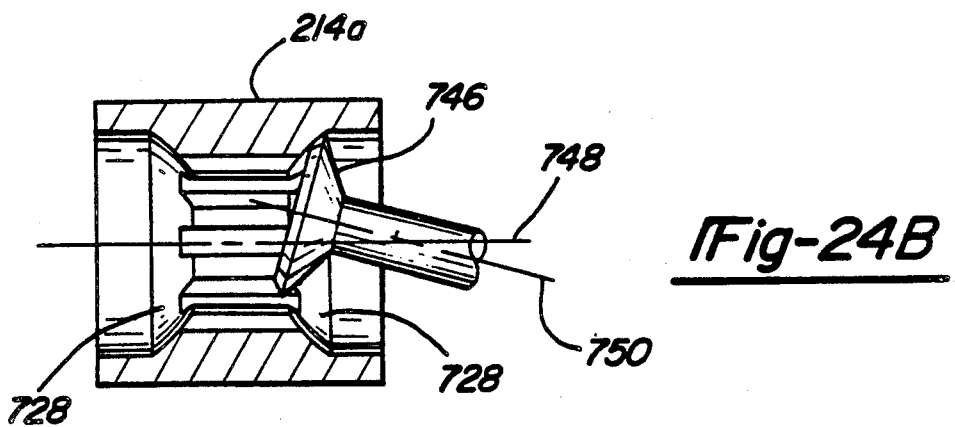

Shown in FIGS. 24A and 24B is a manufacturing method (also known in the optical industry) used for generating the spherical seats 726 and 728, respectively. Shown in FIG. 24A is a "cup" grinding wheel 740 used for grinding the spherical seat 726. In order for the grinding wheel 740 to generate the spherical seat 726 it is necessary for axes of rotation 742 (of the inner valve member 212a) and 744 (of the grinding wheel 740) to intersect at the geometric (i.e., spherical) center of the spherical seat 726. Similarly shown in FIG. 24B is another "cup" grinding wheel 746 used for grinding the spherical seat 728. As before, it is necessary for axes of rotation 748 and 750 to intersect at the geometric center of the the spherical seat 728. In addition, the relative axial positions of the grinding wheels 740 and 746 along both sets of axes 742 and 744, and, 748 and 750, respectively, are adjusted so that the spherical seats 726 and 728 will end up in their correct axial positions and formed with their correct radii.

Shown in FIG. 25A is a longitudinal section view of another improved torque reaction valve 760 which comprises means adapted for providing "center-point feel". As described above, "center-point feel" comprises a delay of the application of power steering assist by a vehicular power steering system until some nominal value of torque has been applied to the vehicle's steering wheel (i.e., between 5 and 10 in.lbs. of torque). Ideally this is accomplished with input and output members of the power steering system's control valve locked together so that no rotational compliance is introduced thereby.

One means of locking the input and output members of the power steering system's control valve together is via preloading them at a selected rotational orientation via spring means. As increasing values of torque are applied, rotation therebetween is prevented until the applied torque value exceeds spring preload value. As further increasing values of torque are applied, rotational displacement occurs therebetween against the torsional spring rate of the spring means (in addition to torsion bar and hydraulic interface stiffnesses).

Figure 26:
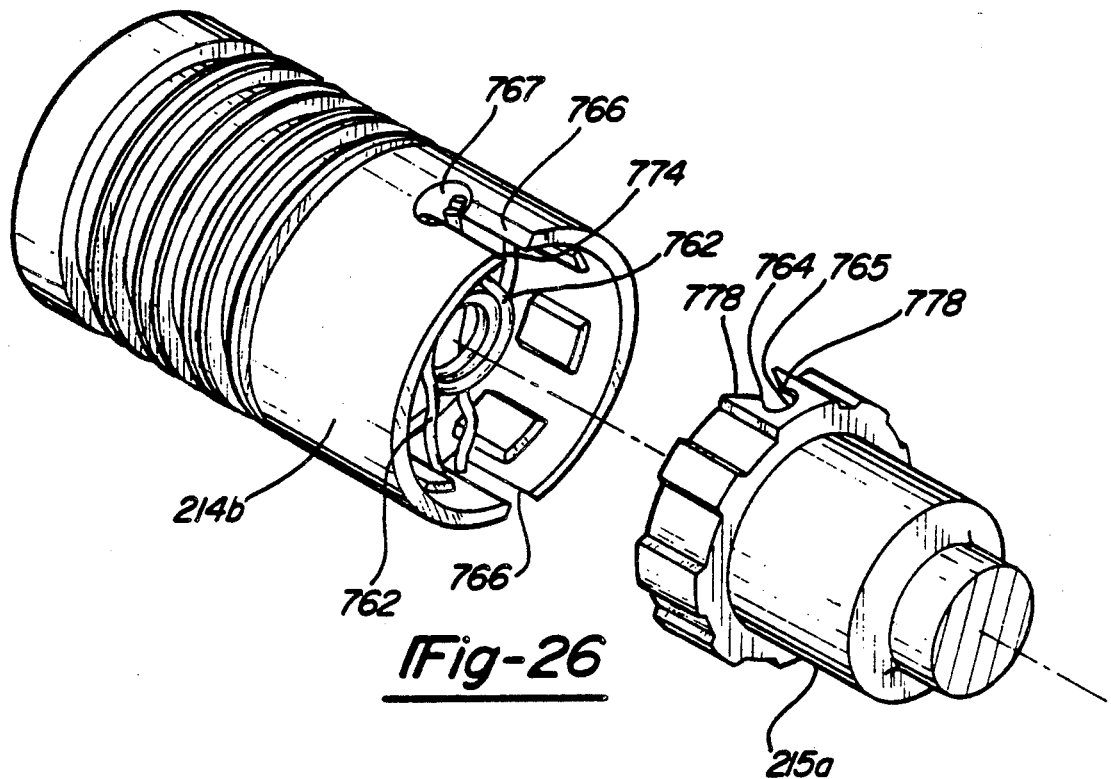
FIG. 26 is an exploded isometric view which illustrates assembly and operational characteristics of the "clothespin" springs.
Figure 27A:
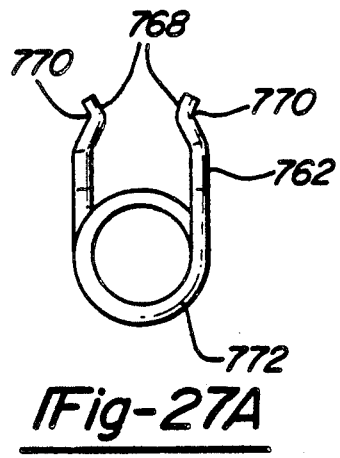
FIGS. 27A and 27B are orthogonal views showing forming details of the "clothespin" springs.
Figure 27B:
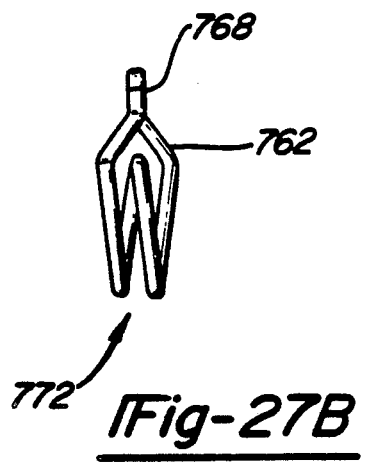

Shown in FIG. 25A are two modified "clothespin" springs 762 mounted within two sets of "keyhole" slots 764 and 766 which comprise transversely elongated eyes 765 and 767, respectively, which provide preload biasing means. The slots 764 and 766 are formed in a modified pinion shaft 328a and an additionally modified outer valve member 214b, respectively. A clearer view of the assembly of the springs 762 within the transversely elongated eyes 765 and 767 is shown in FIG. 26 while forming details of the springs 762 are shown in FIGS. 27A and 27B.

Generally, the springs 762 have a form similar to that of a "clothespin" spring. However, their ends 768 are formed generally parallel to a radial direction and transversely in line. In addition, a "V" shaped configuration 770 is formed proximate to each end—also in a transversely aligned manner. Finally, the springs 762 are formed with their coil sections 772 having an extended pitch which enables both of the springs 762 to be "threaded" together prior to assembly within the slots 766 as shown in FIG. 26.

To effect such assembly, the "threaded" together springs 762 are turned sideways and inserted into the axial sections of the slots 766. Then they are "sprung" into final position with the selected preload value. The slots 766 are formed with a radially tapered shape (as shown at position 774) and with the elongated eyes 767 in order to provide proper seating for the "V" shaped configurations 770 of the springs 762. Later when the pinion shaft 215a is inserted into the outer valve member 214b, tapered leading edges 778 urge the ends 768 of the springs 762 together to allow entry thereof into the elongated eyes 765 of the slots 764.

The elongated eyes 765 and 767 of the slots 764 and 766, respectively, are formed with substantially the same transverse length and taper. Thus, the "V" shaped configurations 770 make contact with both ends of both sets of elongated eyes 765 and 767. Further thus, the outer valve member 214b and the pinion shaft 215a will be held in a locked rotational position with the sets of elongated eyes 765 and 667 in alignment until torque applied thereto exceeds the selected preload level.

During assembly of the improved torque reaction valve 760 it is necessary to perform a precision alignment before forming a hole 782 and installing the pin 360 in a manner similar to that described above with respect to the hole 718 and pin 716. This will allow the torsion bar 213 to be unstressed when the elongated ends 776 and 778 are aligned.

Note that the improved torque reaction valve 760, as shown in FIGS. 25A and 26, utilizes two of the springs 762. In general any number of the springs 762 may be used. In fact, an improved torque reaction valve utilizing only one of the springs 762 might be preferred because it would be simpler to manufacture and assemble. For instance, if only one spring 762 is used, the coil section 772 can be formed in a close-wound manner. Further, only one set of the slots 764 and 766 would be required.

However, if only one of the springs 762 is used then radial forces will appear in the bearings supporting the outer valve member 214b and the pinion shaft 215a whenever input torque is applied to the input shaft 380. As is evident from inspection of FIG. 26, such radial forces are eliminated by using two equally spaced, identical springs 762. Any equally spaced plurality of the springs 762 will accomplish this also. The pitch of the coil section 772 will have to be adjusted to accommodate the actual number of springs 762 that are utilized, however.

Shown in FIG. 25B is a curve 761 which illustrates static performance characteristics of a power steering system which incorporates the improved torque reaction valve 760. Steering force values, $F_t$, depicted by the curve 761 include mechanical steering force values, $F_m$, depicted by curve 761a. Hydraulically derived steering force values, $F_p$, comprise the values depicted by the curve 761 less the values depicted by the curve 761a.

The derivative of the curve 761 is substantially discontinuous at point 761b. This characteristic is typical in many European automobiles It is typically felt as harshness in the static steering characteristic and is not preferred by everyone.

Shown in FIG. 28A is a longitudinal section view of another improved torque reaction valve 786 which incorporates the features of both the improved torque reaction valves 710 and 760. The static performance characteristics of the improved torque reaction valve 786 comprise "center-point feel" followed by a smooth transition toward pure torque reaction as determined by the non-linear behavior caused by the inclusion of the torsion bar extension 712. Any particular transition characteristic will be determined by selected values of $K_v$ and $K_f$ according to the design equations presented hereinabove.

Shown in FIG. 28B is a curve 787 which illustrates static performance characteristics of a power steering system which incorporates the improved torque reaction valve 786. Steering force values, $F_t$, depicted by the curve 787 include mechanical steering force values, $F_m$, depicted by curve 787a. Hydraulically derived steering force values, $F_p$, comprise the values depicted by the curve 787 less the values depicted by the curve 787a.

The derivative of the curve 787 is substantially continuous at point 787b. As noted above, this results in a softer transition between "center-point feel" and the onset of pure torque reaction. It results in a significant lessening of the feeling of harshness in static steering characteristic and may be preferred by some.

As noted hereinbefore, vehicular power steering systems are closed loop servo systems wherein selected operational characteristics of a four-way open-center control valve determine whether the vehicular power steering system is a stable closed-loop servo system. In order to achieve stable operation, an open-loop transfer function describing the operation of such a vehicular power steering system must pass through unity gain with a lagging phase angle of less than 180 degrees. It is helpful to generate block diagrams which can be used to characterize the functional relationships between the various components (known hereinafter as control elements) of the power steering systems being so analyzed.

Figure 29A:
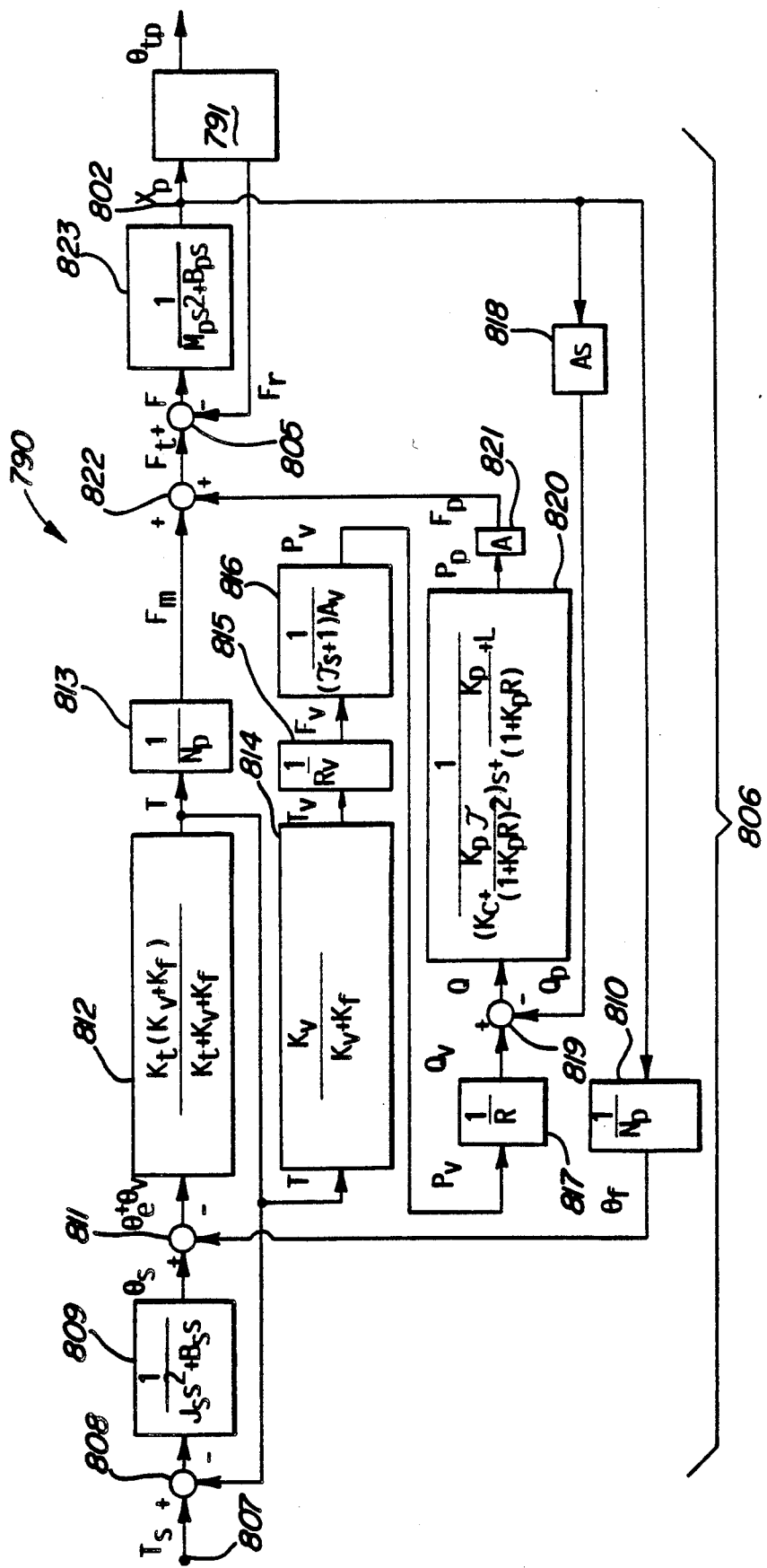
FIG. 29A is a block diagram which depicts the operation of a power steering system which incorporates the improved torque reaction valve of FIG. 22A.

Shown in FIG. 29A is a block diagram 790 depicting operation of a power steering system which incorporates the improved torque reaction valve 710. Shown in FIG. 29B is an output section block diagram 791 which is pertinent to understanding the block diagram 790. The block diagram 791 depicts the operational characteristics of a host vehicle's structure, wheels, tires and tire patch. It is also typical for each of several block diagrams to follow (i.e., those shown in FIGS. 30, 31, 32, 33 and 34).

The output signal of a power steering system determines the average steering angle achieved at the host vehicle's tire patches, $\theta_{tp}$, which is located in the block diagram 791 at output terminal 792. $\theta_{tp}$ is determined by the sum of the torques applied to the tire patches, $T_{tp}$ (located at terminal 793), multiplied by control element $1/(B_{tp}s+K_{tp})$ (tire patch damping and spring rate terms, respectively) shown at block 794. $T_{tp}$ is determined by the difference between average dirigible wheel angle, $\theta_w$, and $\theta_{tp}$ (which difference is achieved via summing point 795), multiplied by control element $(B_{sw}s+K_{sw})$ (side wall damping and spring rate terms, respectively) shown at block 796—plus any disturbing torque (as shown at summing point 797). $\theta_w$ is determined by the difference between the sum of the torques applied to the wheels, $T_w$, and $T_{tp}$ (which difference is achieved via summing point 798), multiplied by control element $1/(J_w s^2)$ (wheel moment of inertia term) shown at block 799. $T_w$ is determined by the sum of the forces applied to wheel lever arms, $F_r$ (located at terminal 800), multiplied by a control element $R_w$ (wheel lever arm radius) shown at block 801. $F_r$ is determined by the difference between the position of a piston (or rack) of the host power steering system, $X_p$ (located at terminal 802), and $\theta_w$ multiplied by another control element $R_w$ shown at block 803 (which difference is achieved via summing point 804), multiplied by control element $K_r$ (overall stiffness of the host vehicle's structure—including its tie rod assembly).

The principle function of a host power steering system is to determine $X_p$. It is not able to do this independently from the elements of the output section 791. This is because $F_r$ is fed back from terminal 799 to a position located within the host power steering system. In the block diagram 790 this occurs at summing point 805 which is located within control section 806.

Inputs to the control section 806 are made at input terminal 807 by applying torque to the host vehicle's steering wheel (not shown). Torque present at the input shaft 380a, T, is subtracted therefrom (which subtraction is performed by summing point 808). The product of $(T_s - T)$ and control element $1/(J_s s^2 + B_s s)$ (Steering wheel moment of inertia and steering shaft damping terms, respectively) shown at block 809 determines steering wheel angle $\theta_s$. The difference between $\theta_s$ and $\theta_f$ (rotational position feedback as determined by the product of $X_p$ and a control element $1/N_p$, where $N_p$ is the radius of the pinion gear formed on the pinion shaft 215, shown at block 810), which difference is generated via summing point 811, generates a system input error angle. The system input error angle comprises a twist angle of portion 713 of the torsion bar 213a, $\theta_e$, plus a valve deflection angle, $\theta_v$. The product of $(\theta_e + \theta_v)$ and control element $K_t(K_v + K_f)/(K_t + K_v + K_f)$ ($K_t$ is torsion bar stiffness, $K_v$ is valve torsional stiffness and $K_f$ is torsion bar extension stiffness) shown at block 812 provides the torque which is present at the input shaft, T.

Mechanically derived steering force, $F_m$, is provided by the product of T and another control element $1/N_p$ shown at block 813. Hydraulically derived steering force, $F_p$, is provided via a product of T and a string of control elements as follows: T multiplied by control element $K_v/(K_v + K_f)$ shown at block 814 generates net valve torque $T_v$ (which is the hydraulically generated valve reaction torque). $T_v$ multiplied by control element $1/R_v$ (1/valve radius) shown at block 815 generates tangential valve force $F_v$. $F_v$ multiplied by control element $1/(\tau s + 1)A_v$ ($\tau$ is hydraulic supply time constant and $A_v$ is effective valve area) shown at block 816 generates differential valve output pressure $P_v$. $P_v$ multiplied by control element $1/R$ (1/damper valve resistance as defined in U.S. patent application Ser. No. 324,903) shown in block 817 generates differential valve output flow rate $Q_v$. The difference between $Q_v$ and $Q_p$ (power steering system cylinder flow rate as determined by the product of $X_p$ and control element $A_s$ (piston area term) shown at block 818) (which difference is achieved via summing point 819) generates net power steering system flow rate Q. Q multiplied by control element $1/[(K_c+(K_p\tau)/(1+K_pR)^2)s+(K_p/(1+K_pR))+L]$ ($K_c$ is a hydraulic fluid bulk modulus derived compressibility term, $K_p$ is a flow-pressure coefficient of the valve orifices and L is a cylinder leakage term which partially comprises, $1/R_b$, where $R_b$ is the orifice resistance mentioned hereinabove) shown at block 820 generates differential piston pressure $P_p$. $P_p$ multiplied by control element A shown at block 821 generates the hydraulically derived steering force $F_p$. $F_p$ is summed with $F_t$ at summing point 822 to generate total steering force $F_t$. $F_r$ is subtracted from $F_t$ at the summing point 805 to generate net steering force F. And finally, F multiplied by control element $1/(M_ps^2+B_ps)$ (where $M_p$ is piston mass and $B_p$ is piston damping coefficient) shown at block 823 generates $X_p$.

(A procedure for calculating $K_p$ can be found in the book entitled HYDRAULIC CONTROL SYSTEMS. The procedure can be found on page 97 of that book whereat $K_p$ is called $K_{c0}$.)

Figure 30:
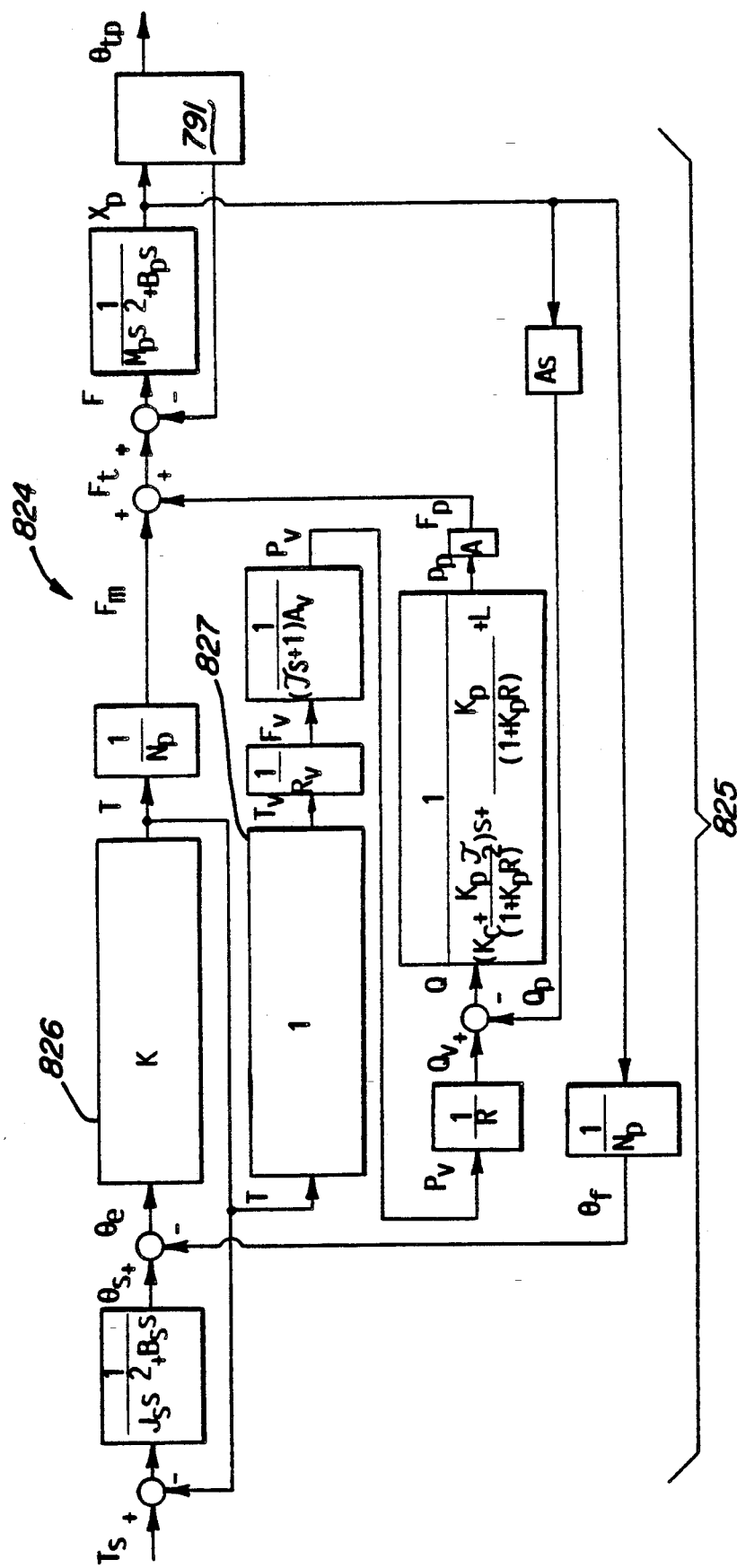
FIG. 30 is a block diagram which depicts the operation of a power steering system which incorporates the torque reaction valve described in FIGS. 1 through 21.

Shown in FIG. 30 is a block diagram 824 depicting operation of a power steering system which incorporates either one of the torque reaction valves 210 or 260. The only difference between block diagram 790 and block diagram 834 is a less sophisticated control section 825 which comprises control element K shown at block 826 (instead of block 812) and control element 1 shown at block 827 (instead of block 814). Because the control element K is single-valued (i.e., it is torsional stiffness of the torsion bar 213 comprised in the block 594 included in the block diagram 595 of FIG. 13), the gain of a power steering system incorporating either one of the torque reaction valves 210 or 260 is substantially single-valued (i.e., it is comprised within a substantially linear system). On the other hand, because the control elements $K_t(K_v+K_f)/(K_t+K_v+K_f)$ (shown at the block 812) and $K_v/(K_v+K_f)$ (shown at the block 820), and their product $K_tK_v/(K_t+K_v+K_f)$ (shown at the block 820), contain the non-single-valued valve torsional stiffness term $K_v$, the gain of a power steering system incorporating the improved torque reaction valve 810 not single-valued. This results in the non-linear static performance characteristics shown by the curve 711 of FIG. 22B.

Figure 31:
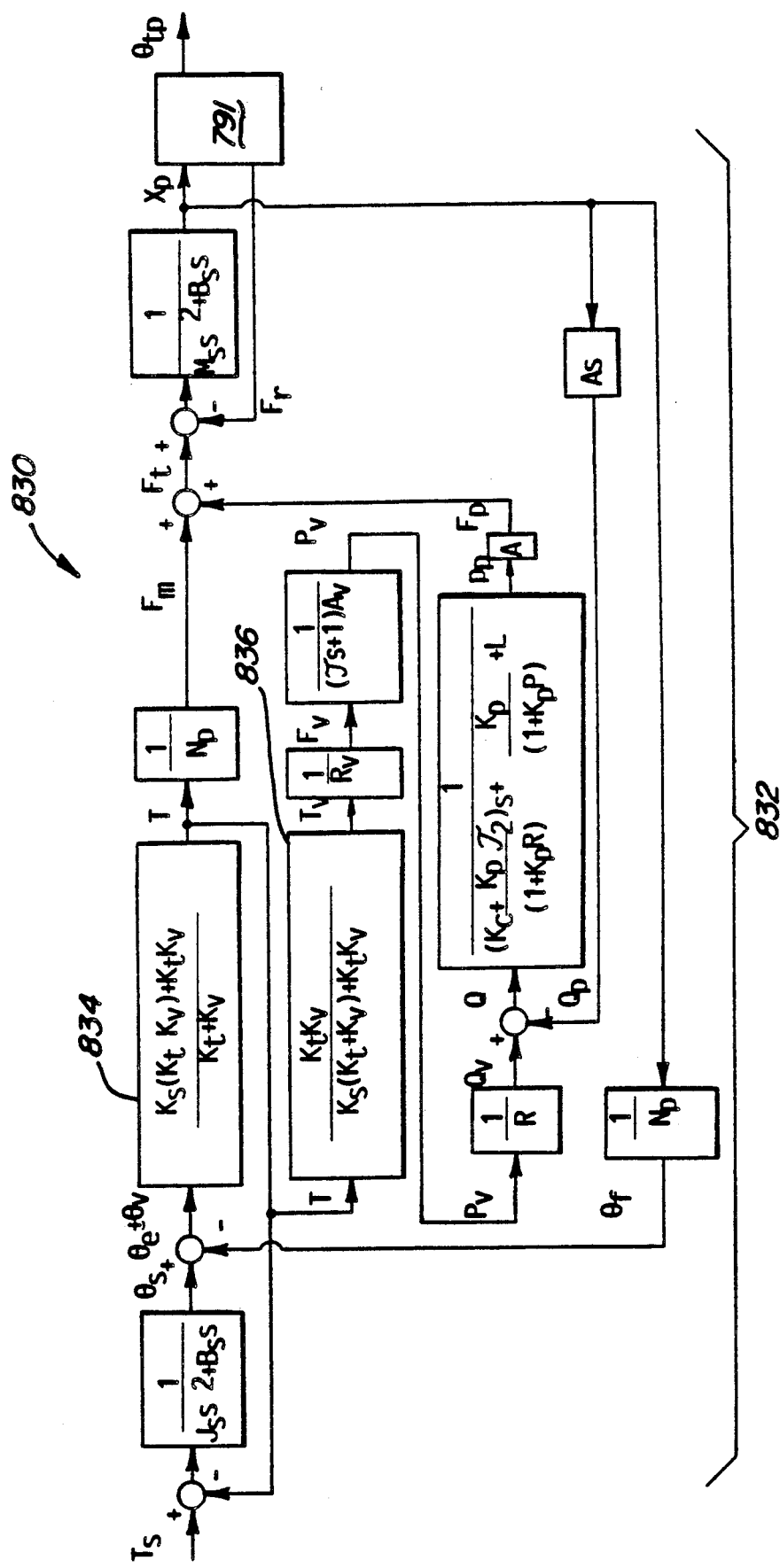
FIG. 31 is a block diagram which depicts the operation of a power steering system which incorporates the improved torque reaction valve of FIG. 25A.

Shown in FIG. 31 is a block diagram 830 depicting operation of a power steering system which incorporates the improved torque reaction valve 760 when it is operated with sufficient steering wheel torque to exceed spring preload value of the modified "clothespin" springs 762. The only difference between block diagram 790 and block diagram 830 is a new control section 832 which comprises control element $[K_s(K_t+K_v)+(K_tK_v)]/(K_t+K_v)$ shown at block 834 (instead of block 812) and control element $(K_tK_v)/[K_s(K_t+K_v)+(K_tK_v)]$ shown at block 836 (instead of block 814).

Figure 32:
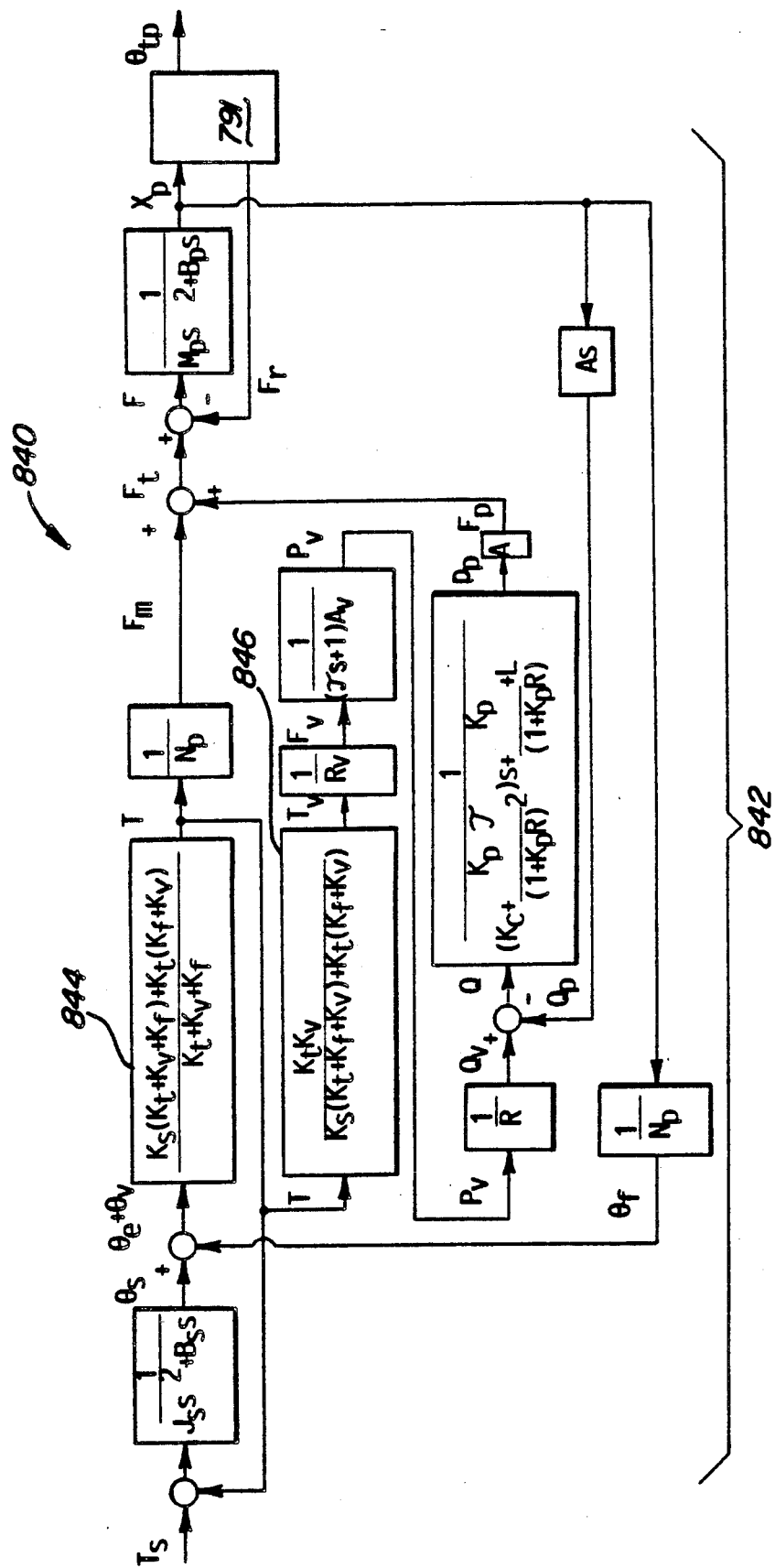
FIG. 32 is a block diagram which depicts the operation of a power steering system which incorporates the improved torque reaction valve of FIG. 28A.

Shown in FIG. 32 is a block diagram 840 depicting operation of a power steering system which incorporates the improved torque reaction valve 786 when it is operated with sufficient steering wheel torque to exceed spring preload value of the modified "clothespin" springs 762. The only difference between block diagram 790 and block diagram 840 is a new control section 842 which comprises control element $[K_s(K_t+K_f+K_v)+K_t(K_f+K_v)]/(K_t+K_f+K_v)$ shown at block 844 (instead of block 812) and control element $(K_tK_v)/[K_s(K_t+K_f+K_v)+K_t(K_f+K_v)]$ shown at block 846 (instead of block 814).

Shown in FIG. 33 is a block diagram 850 depicting operation of a power steering system which incorporates a rotary valve. These is a new control section 851 which is fully described below.

Inputs to the control section 851 are made at input terminal 852 by applying torque to the host vehicle's steering wheel (not shown). Torque present at an input shaft of the rotary valve, T, is subtracted therefrom (which subtraction is performed by summing point 853). The product of $(T_s-T)$ and control element $1/(J_ss^2+B_ss)$ shown at block 854 determines steering wheel angle $\theta_s$. The difference between $\theta_s$ and $\theta_f$, which difference is generated by summing point 856, generates a system input error angle. The system input error angle comprises a twist angle of a torsion bar, $\theta_e$, only. The product of $\theta_e$ and control element $K_t$ shown at block 857 provides the torque which is present at the input shaft, T.

Mechanically derived steering force, $F_m$, is provided by the product of T and control element $1/N_p$ shown at block 858. Hydraulically derived steering force, $F_p$, is provided via a product of $\theta_e$ and a string of control elements as follows: $\theta_e$ multiplied by control element $R_v$ shown at block 859 generates tangential valve position $X_v$. $X_v$ multiplied by control element $K_q/(\tau s+1)$ ($K_q$ is flow gain of the rotary valve) shown at block 860 generates differential valve output flow rate $Q_v$. The difference between $Q_v$ and $Q_p$ (which difference is achieved via summing point 862) generates net power steering system flow rate Q. Q multiplied by control element $1/[(K_c+K_p\tau)s+K_p+L]$ shown at block 863 generates differential piston pressure $P_p$. $P_p$ multiplied by control element A shown at block 864 generates the hydraulically derived steering force $F_p$. $F_p$ is summed with $F_m$ at summing point 865 to generate total steering force $F_t$. $F_r$ is subtracted from $F_t$ at summing point 805 to generate net steering force F. And finally, F multiplied by control element $1/(M_ps^2+B_ps)$ shown at block 823 generates $X_p$.

(A procedure for calculating $K_q$ can be found in the book entitled HYDRAULIC CONTROL SYSTEMS. The procedure can also be found on page 97 of that book whereat $K_q$ is called $K_{q0}$).

Other types of reaction valves are known. One example is that of the so-called "star" valve mentioned hereinabove. There are two significant differences between the star valve and the improved torque reaction valve 710. First, it has no element functionally like the torsion bar 213. Second, it has negligible flow resistance such as that provided by the damper valve resistance R. These factors result in some significant differences in performance characteristics when the star valve is compared to the improved torque reaction valve 710.

Figure 34:
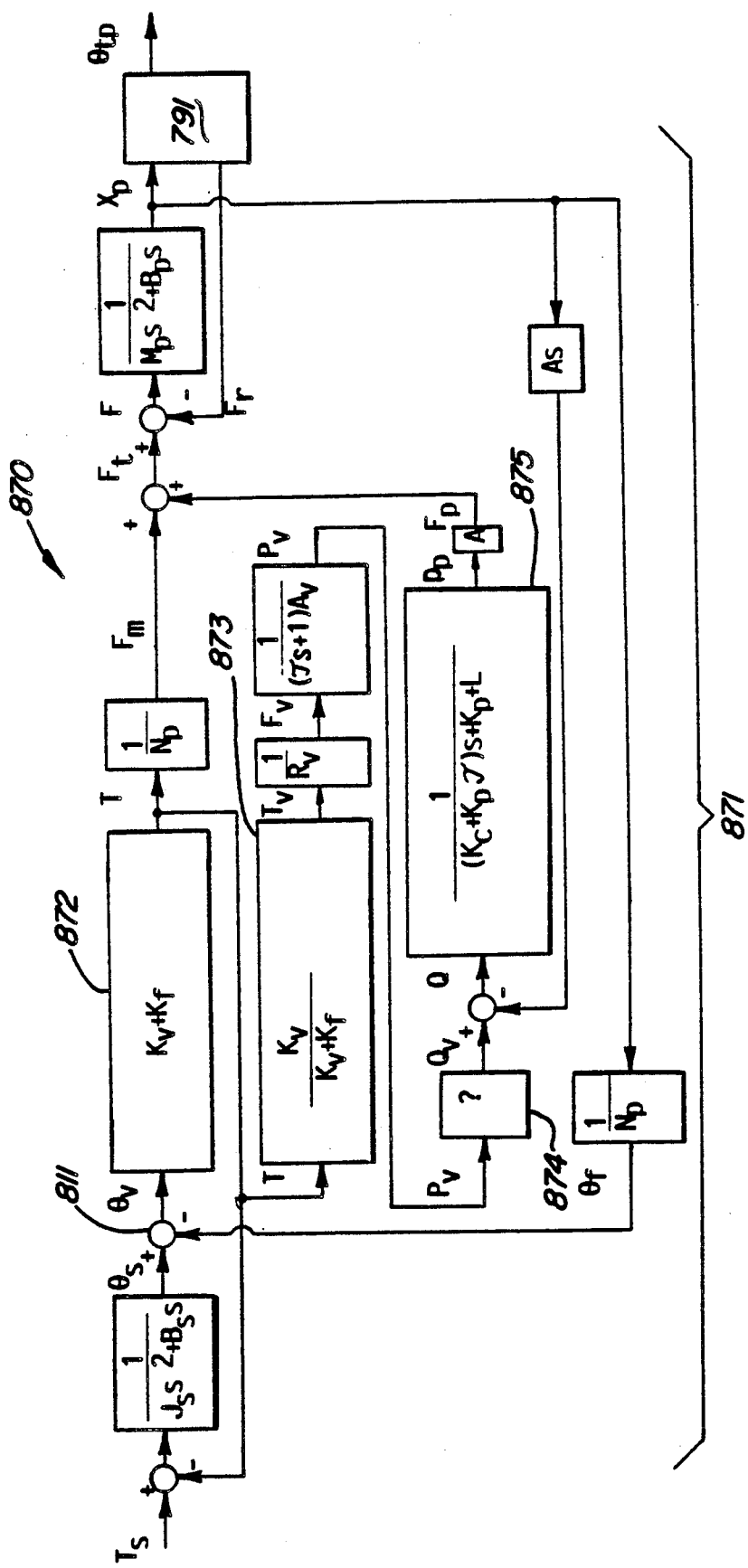
FIG. 34 is a block diagram which depicts the operation of a power steering system which incorporates a type of reaction valve known as a "star" valve.

Shown in FIG. 34 is a block diagram 870 depicting operation of a power steering system which incorporates a "star" valve. The only difference between block diagram 790 and block diagram 870 is a new control section 871 which comprises control element $(K_v+K_f)$ shown at block 872 (instead of block 812), control element $K_v/(K_v+K_f)$ shown at block 873 (instead of block 814), an unknown control element (?) shown at block 874 (in place of the control element 1/R depicted in the block 817), and control element $1/[(K_c+K_p\tau)s+K_p+L]$ shown at block 875 (instead of block 820). Also, because there is no torsion bar, $\theta_e$ equals zero. Thus, only $\theta_v$ appears after the summing point 811.

Each of the block diagrams 790, 830, 840, 850 and 870 is very complex. In order to adequately comprehend the performance of the power steering systems they depict, it is necessary to reduce them to a simple form.

Shown in FIG. 35 is a "canonical form" block diagram 880. Each of the block diagrams 790, 830, 840, 850 and 870 can be reduced to this format via computation of suitable forward and feedback transfer functions. In the block diagram 880 an input signal, I, is applied to input terminal 881. Closed-loop response of the block diagram 880 yields an output signal, C, at output terminal 882. C multiplied by control element H shown at block 883 generates a feedback signal, B, which appears at feedback terminal 884. B is subtracted from I at summing point 885 to generate an error signal, E. Finally, E multiplied by control element G shown at block 886 to actually generates the output signal C.

It is desirable for any power steering system (represented by the block diagram 880) to operate in a stable manner. This will occur if the product GH decreases in value and goes through the value 1 with its argument having a lagging value less than 180 degrees. If this is true then any disturbing signal input to the system will be damped out and the system's operation will be stable.

Assuming that the operation is stable, it can be seen that the ratio B/R is a normalized indicator of the performance of any power steering system represented by the block diagram 880. In fact, the ratio B/R is known as the primary feedback ratio. It has the value $$B/R = GH/(1+GH).$$

Two different "primary" feedback ratios, B/R and $B_oR_o$, are of interest herein. $B/R = GH/(1+GH)$ is concerned with how well a power steering system responds (with respect to frequency) to torque values input to the steering wheel (i.e., as in $X_p/T_s$). $B_oR_o = G_oH_o/(1 = G_oH_o)$ is concerned with how well a power steering system responds (also with respect to frequency) to physical displacement error signal values input to the steering wheel (i.e., as in $X_p/(\theta_e + \theta_v)$. Thus, it is necessary to evaluate G, $G_o$, H and $H_o$ for each of the Block diagrams 790, 830, 840, 850 and 870.

Because the output section 791 is universally used, the following constants can be used for all equations that follow:

$$Q_1 = B_{sw}s + K_{sw},$$

$$Q_2 = (B_{sw} + B_w)s + (K_{sw} + K_w),$$

$$Q_3 = J_w s^2 + Q_1 - Q_1^2/Q_2 + K_r R_w^2 \text{ and}$$

$$Q_4 = M_p s^2 + B_p s + K_r.$$

It is also useful to define the following:

$$Q_5 = \tau s + 1,$$

$$Q_6 = (K_c + K_p \tau)s/(1 + K_p R)^2 + K_p/(1 + K_p R) + L \text{ and}$$

$$Q_7 = (K_c + K_p \tau)s + K_p + L.$$

For the block diagram 790

$$G_o = Q_3 K_t (K_v + K_f)[(Q_6/N_p) + (AK_v)/(K_v + K_f)(RR_vQ_5A_v)]/(K_t + K_v + K_f)[Q_6(Q_3Q_4 - (K_rR_w)^2) + A^2Q_3s],$$

$$H_o = 1/N_p,$$
$$G = G_o/G_8$$
where
$$G_8 = J_s s^2 + B_s s + K_t(K_v + K_f)/(K_t + K_v + K_f) \text{ and}$$
$$H = (1/N_p)(J_s s^2 + B_s s).$$

For the block diagram 830

$$G_o = Q_3[K_s(K_t + K_v) + K_tK_v][Q_6/N_p + AK_tK_v/(K_s(K_t + K_v) + K_tK_v)RR_vQ_5A_v]/ (K_t + K_v)[Q_6(Q_3Q_4 - (K_rR_w)^2) + A^2Q_3s],$$

$$H_o = 1/N_p,$$
$$G = G_o/G_9$$
where
$$G_9 = J_s s^2 + B_s s + [K_s(K_t + K_v) + K_tK_v]/(K_t + K_v) \text{ and}$$
$$H = (1/N_p)(J_s s^2 + B_s s).$$

For the block diagram 840

$$G_o = Q_3[K_s(K_t + K_v + K_f) + K_t(K_v + K_f)][(Q_6/N_p) + (AK_tK_v)/(K_s(K_t + K_v + K_f) + K_t(K_v + K_f))RR_vQ_5A_v]/(K_t + K_v + K_f)[Q_6(Q_3Q_4 - (K_rR_w)^2) + A^2Q_3s],$$

$$H_o = 1/N_p,$$
$$G = G_o/G_{10}$$
where $$G_{10} = J_s s^2 + B_s s + [K_s(K_t + K_v + K_f) + K_t(K_v + K_f)]/(K_t + K_v + K_f)$$

and $H = (1/N_p)(J_s s + B_s s).$

For the block diagram 850

$$G_o = Q_3[(K_tQ_7/N_p) + (AR_vK_q)/Q_5]/[Q_7(Q_3Q_4 - (K_rR_w)^2) + A^2Q_3s],$$

$$H_o = 1/N_p,$$
$$G = G_o/G_{11}$$
where
$$G_{11} = J_s s^2 + B_s s + K_t \text{ and}$$
$$H = (1/N_p)(J_s s^2 + B_s s).$$

For the block diagram 870

$$G_o = Q_3(K_v + K_f)[(Q_7/N_p) + A(?)K_v/(K_v + K_f)R_vQ_5A_v]/[Q_7(Q_3Q_4 - (K_rR_w)^2) + A^2Q_3s],$$

$$H_o = 1/N_p,$$
$$G = G_o/G_{12}$$
where
$$G_{12} = J_s s^2 + B_s s + (K_v + K_f) \text{ and}$$
$$H = (1/N_p)(J_s s^2 + B_s s).$$

A direct method of determining stability criteria is to plot log[Abs[GH]] against Arg[GH]. If this plot does not encircle Arg[GH] = −180 degrees when log[Abs[GH]] equals zero, then the power steering system under study will be stable. Such a plot is known as a Nichols Chart.

Figure 36A:
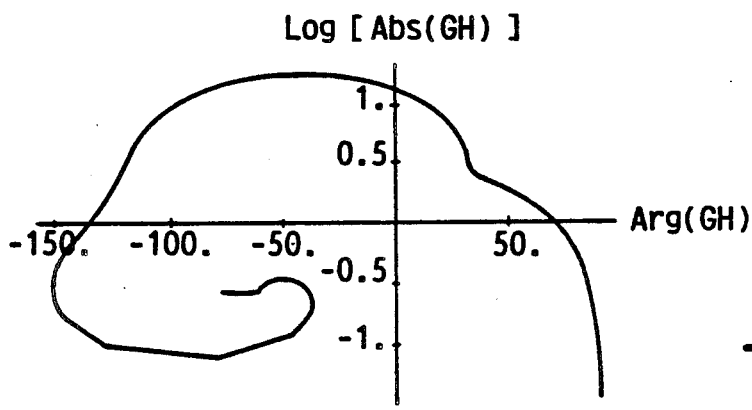
FIGS. 36A and 36B are Nichols Charts which depict stability characteristics of a power steering system which utilizes a torque reaction valve for low and moderate values of steering load, respectively.
Figure 36B:
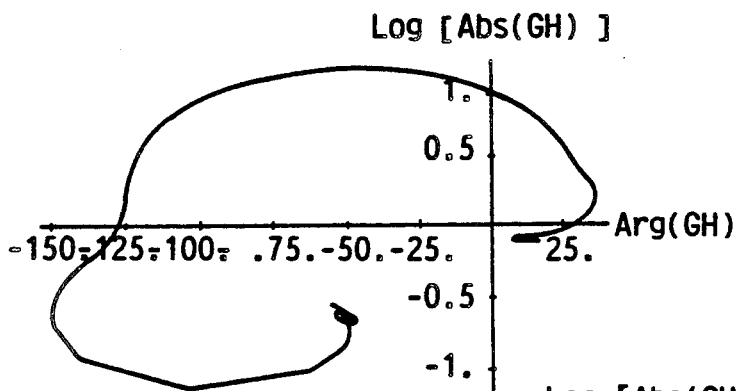

FIGS. 36A and 36B are Nichols Charts which depict stability characteristics of a power steering system utilizing nominal values for its various control elements and a torque reaction valve as described in connection with FIGS. 1-21. The FIGS. 36A and 36B depict system stability for low and moderate values of steering load, respectively. It can be clearly seen that Arg[GH] is considerably above −180 degrees for each load value at Log[Abs[GH]] equal to zero. Thus, this power steering system's operation will be stable.

Figure 37A:
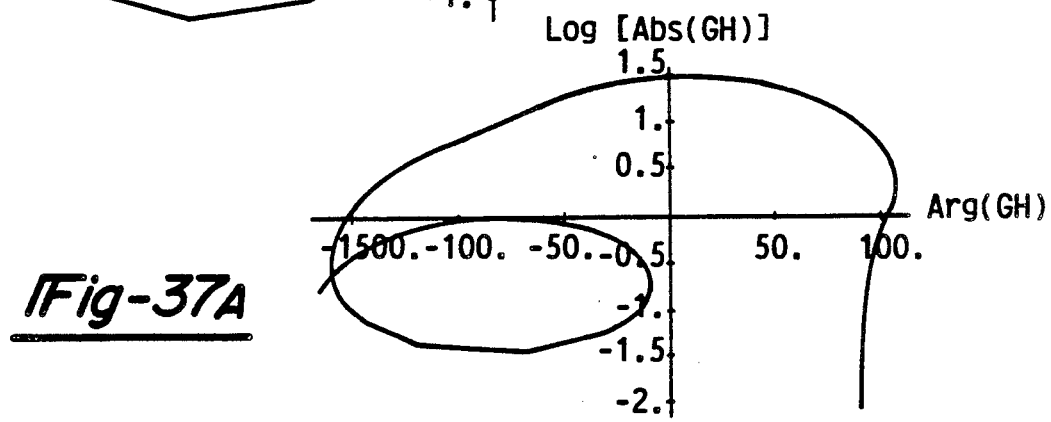
FIGS. 37A and 37B are Nichols Charts which depict stability characteristics of a power steering system which utilizes a rotary valve for low and moderate values of steering load, respectively.
Figure 37B:
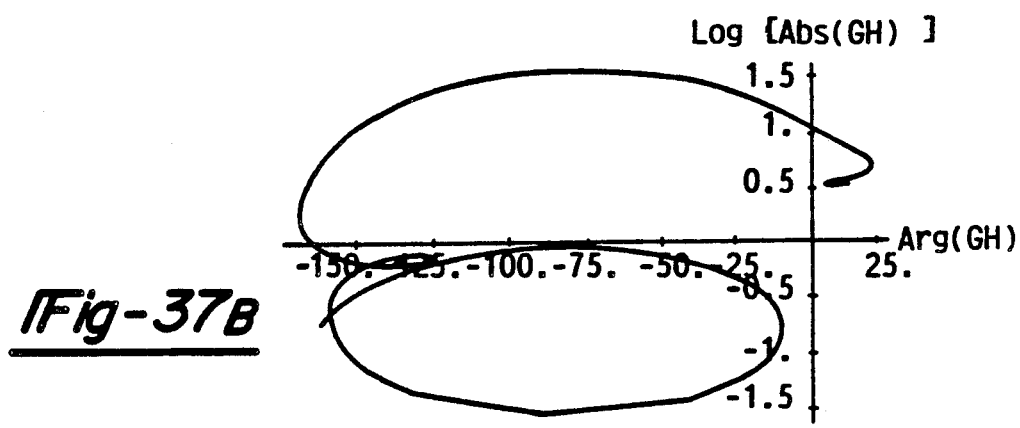
Figure 38A:
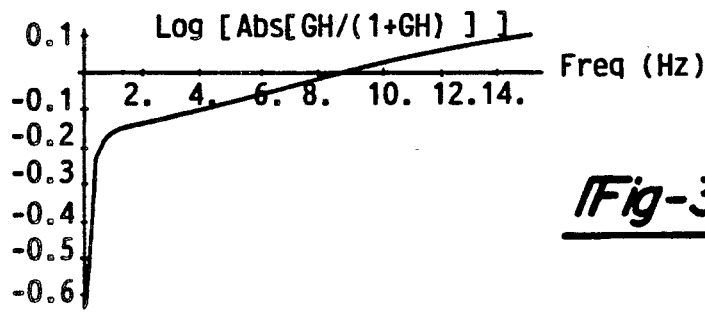
Figure 38B:
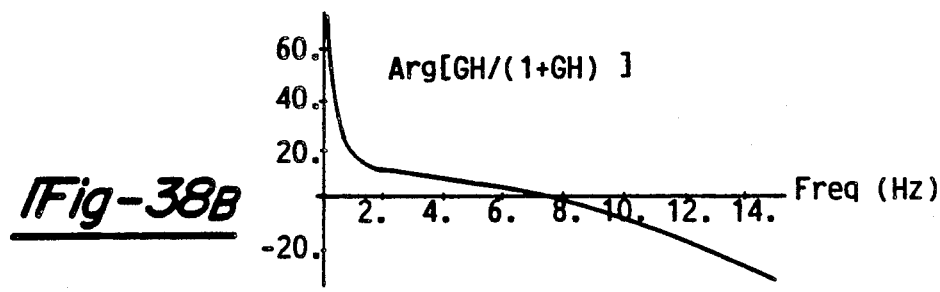
Figure 38C:
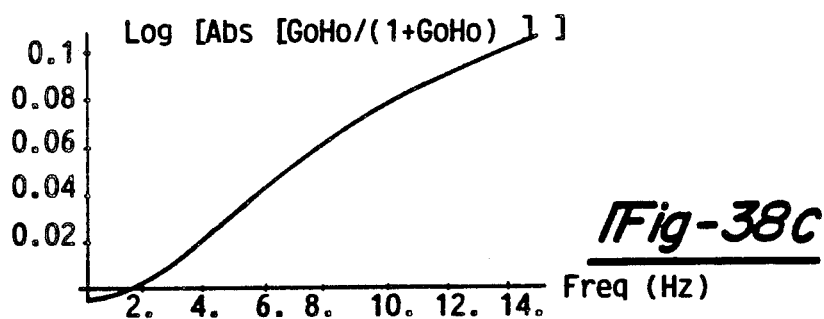
Figure 38D:
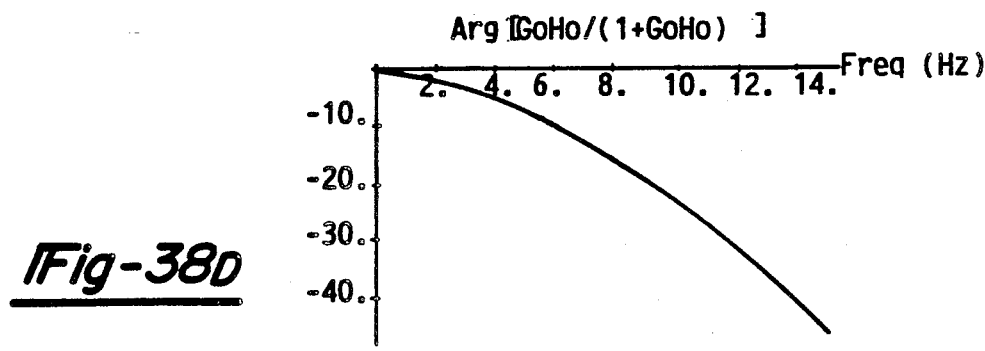
Figure 39C:
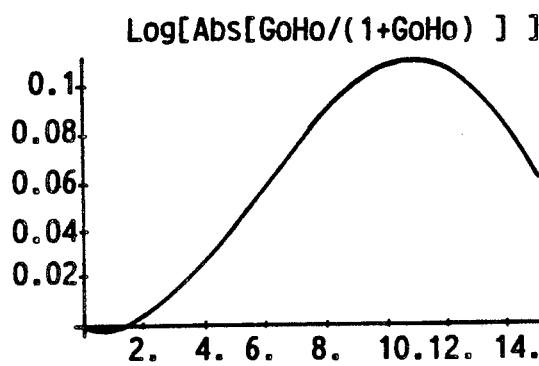
Figure 39D:
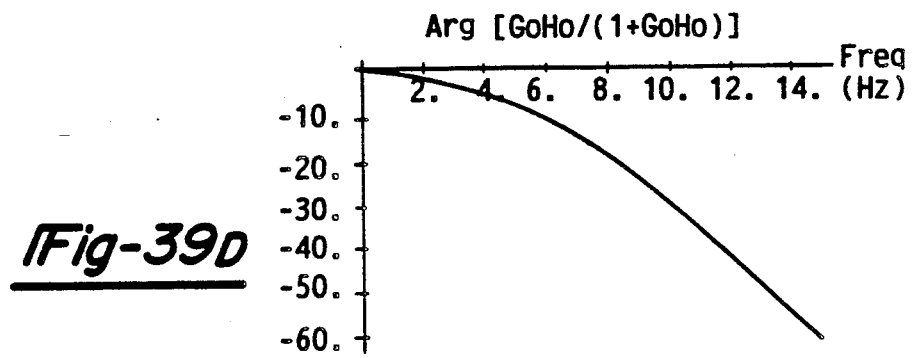
Figure 39E:
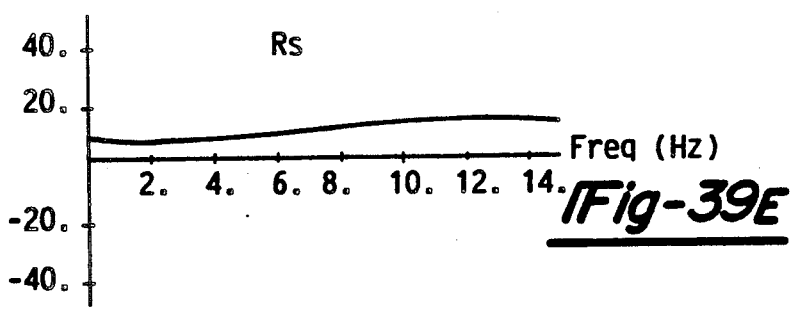
Figure 39F:
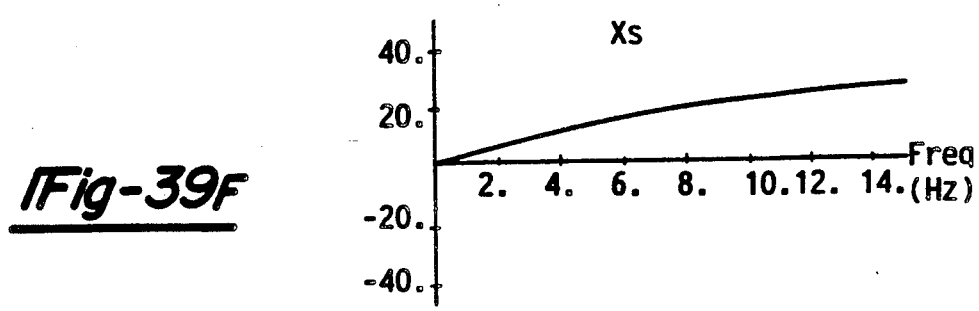
Figure 40A:
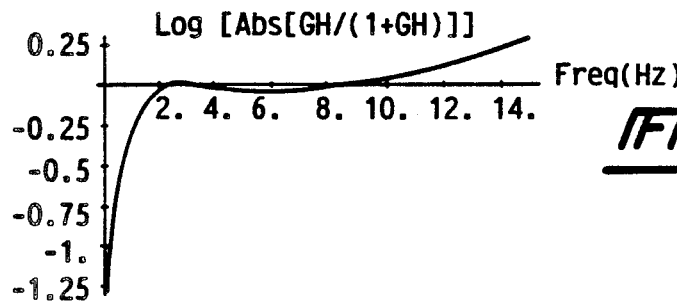
FIGS. 40A through 40F are dynamic signature plots depicting tactile steering interface between a driver and a vehicle equipped with a power steering system comprising the rotary valve and operated as depicted in FIG. 37A.
Figure 40B:
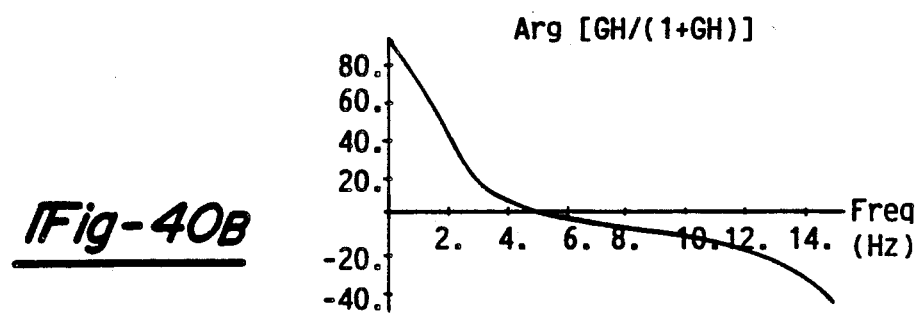
Figure 40C:
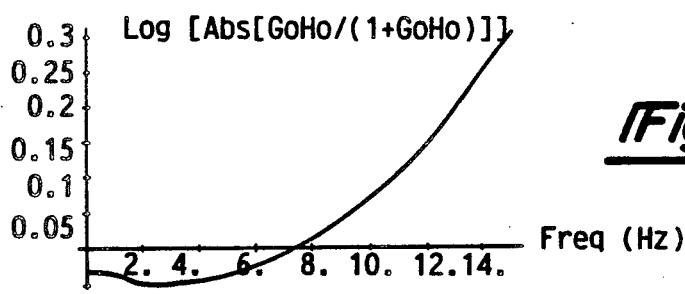
Figure 40D:
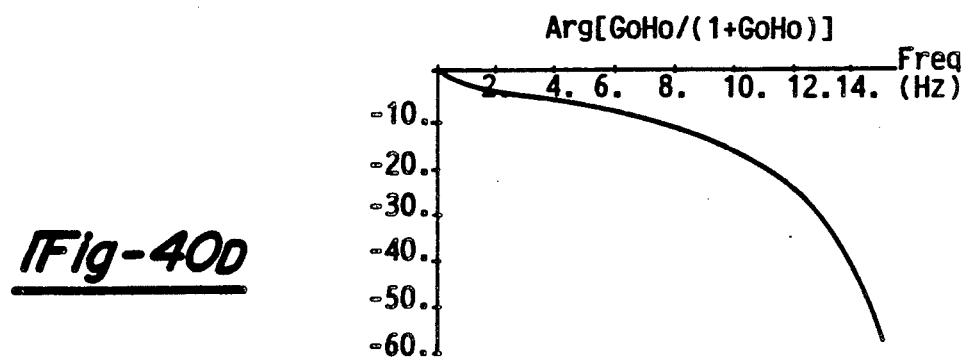
Figure 40E:
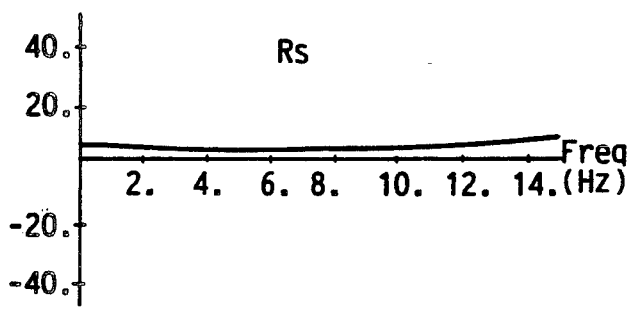
Figure 40F:
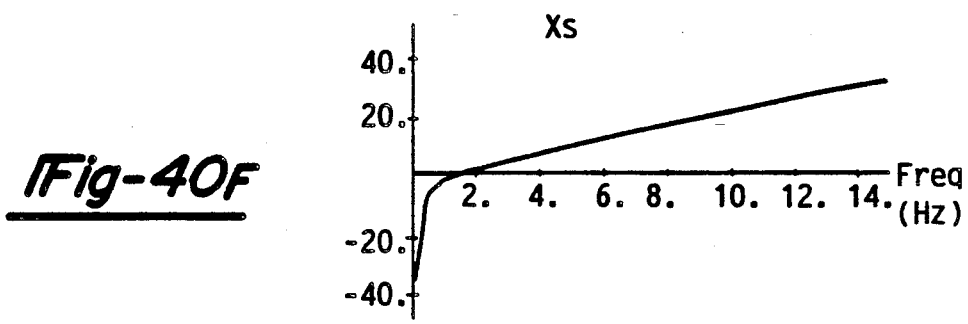
Figure 41A:
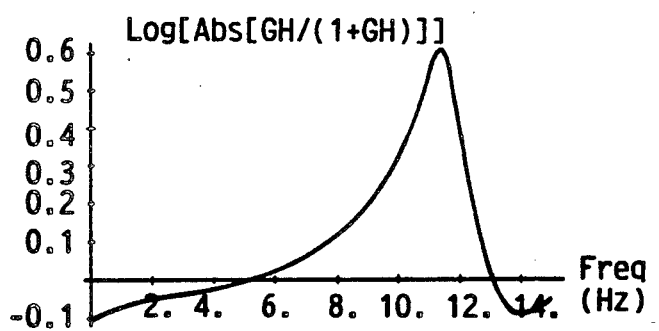
Figure 41B:
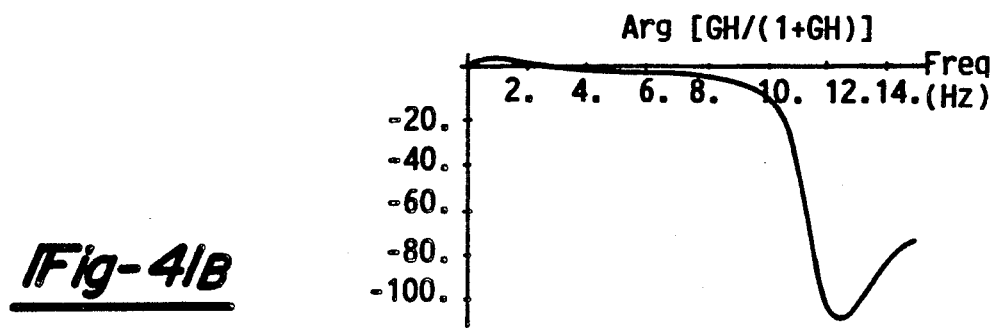
Figure 4I:
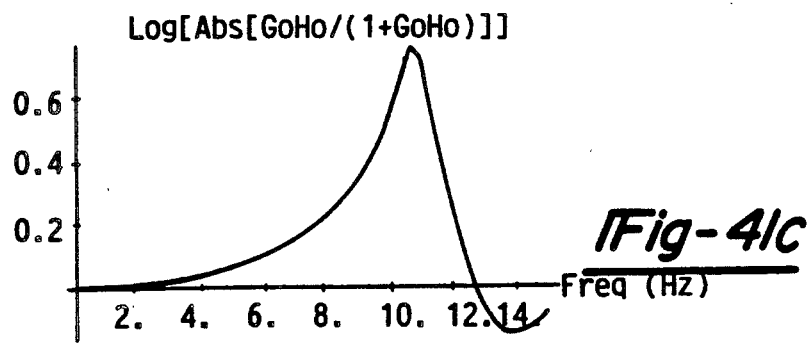
Figure 4I:
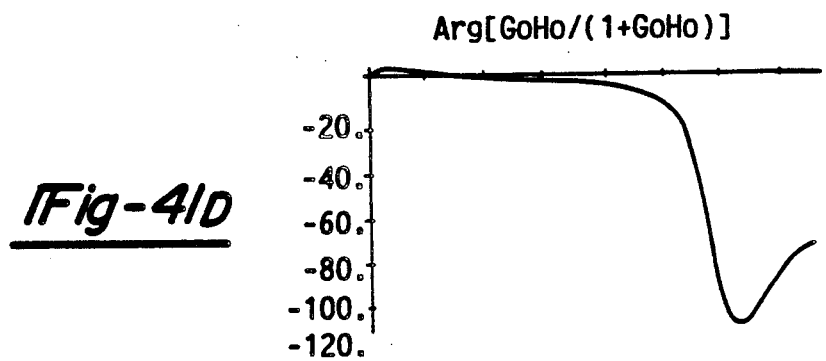
Figure 4I:
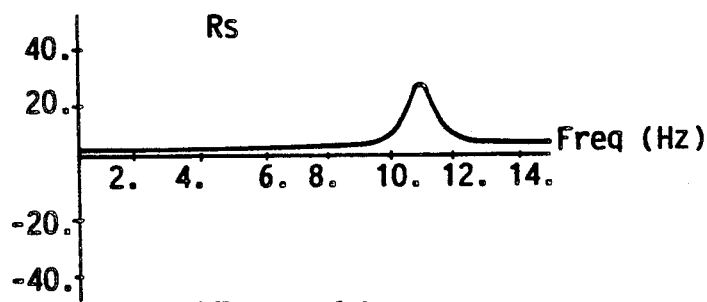
Figure 4I:
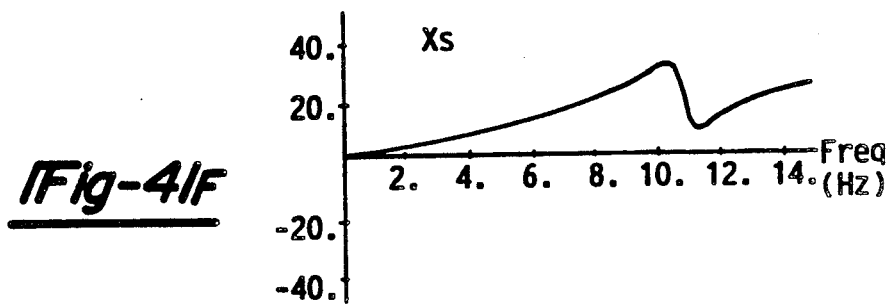

FIGS. 37A and 37B are Nichols Charts which depict stability characteristics of a power steering system utilizing nominal values for its various control elements and a rotary valve for low and moderate values of steering load, respectively. It is clearly stable at low load. However, it is nearly unstable at moderate load. As described above, the closed-loop gain of a rotary valve continuously increases (i.e., $K_q$ continuously increases and $K_p$ continuously decreases) as output pressure increases. Thus, it is reasonable to expect unstable behavior at high loads.

(In fact, rotary valves are known to be unstable at high loads. The phenomenon is known in the industry as "valve buzz". It is artificially quieted via utilizing a pressurized O-ring located between inner and outer valve members of rotary valves as a brake (i.e., Coulomb friction is thereby introduced which stops the "valve buzz"). For instance, see FIG. 2 of U.S. Pat. No. 4,452,274 issued on June 5, 1984. Although the O-ring in question is not numbered, it can be clearly seen immediately to the left of a hole 38 shown in that figure.)

Because each of the improved torque reaction valves 710, 760 and 786 comprises modifications to the torque reaction valve (as described in FIGS. 1-21) which tend to lower its gain (assuming all other control elements maintain their values), it may be concluded that they will similarly tend to have stable operation. On the other hand, because both ($K_v$) very large, the "star" valve can have very large gain values and its stability is in question.

As noted hereinabove, actual steering interface between driver and vehicle can be characterized by complex dynamic signatures which relate steering system output displacement to steering wheel torque and displacement. These signatures comprise plots of the log of the absolute value of $B/R = GH/(1+GH)$ and its argument, and $B_o/R_o = G_oH_o/(1+G_oH_o)$ and its argument, as functions of frequency. The complete signature pattern also comprises plots of real and imaginary parts of steering wheel input impedance values as functions of frequency.

Values of the logs of the absolute value of either $B/R = GH/(1+GH)$ or $B_o/R_o = G_oH_o/(1+G_oH_o)$ less than zero indicate output motion less than a driver would expect tactilely and suggest power steering system stability. On the other hand, values greater than zero indicate output motion greater than a driver would expect tactilely and suggest power steering system instability. Positive values of the arguments suggest spring-like behavior while negative values suggest mass-like behavior.

Positive values of the real part of the steering wheel input impedance indicate positive resistive torsional impedance values will be encountered by a driver. The effect is to tactilely limit steering wheel rotational velocity. Higher values of resistive torsional impedance lead to a feeling of security. Negative values thereof would be very disturbing. Negative values of the imaginary part of the steering wheel input impedance indicate a spring-like feeling will be encountered by a driver. Positive values indicate a mass-like feeling will be encountered by a driver. Normally, such positive values will be encountered by the driver at all but the lowest frequencies because of the dominance of the mass of a steering wheel rim.

Shown in FIGS. 38A through 38F are dynamic signature plots depicting tactile steering interface between a driver and a vehicle equipped with a power steering system comprising a torque reaction valve and subjected to low steering force levels. Shown in FIGS. 39A through 39F are dynamic signature plots depicting tactile steering interface between a driver and a vehicle equipped with a power steering system comprising the torque reaction valve and subjected to moderate steering force levels. These two sets of plots depict a power steering system whose performance is predictable and stable.

Shown in FIGS. 40A through 40F are dynamic signature plots depicting tactile steering interface between a driver and a vehicle equipped with a power steering system comprising a rotary valve and subjected to low steering force levels. Shown in FIGS. 41A through 41F are dynamic signature plots depicting tactile steering interface between a driver and a vehicle equipped with a power steering system comprising the rotary valve and subjected to moderate steering force levels. These two sets of plots depict a power steering system whose performance varies dramatically depending on steering load. Furthermore, the values shown in the FIGS. 41A and 41C suggest a power steering system that could be quite unstable at moderate loads.

Power steering systems incorporating any of the torque reaction valves 210 or 260, or improved torque reaction valves 710, 760 or 786, have distinct advantages over power steering systems incorporating either a rotary valve or a reaction valve such as the "star" valve. These advantages include the following:

In power steering systems incorporating a rotary valve there is no direct relationship between steering load as represented by the total steering force $F_t$. Further, the control elements $K_q/(\tau s+1)$ (shown at the block 960) and $1/[(K_c+K_p\tau)s+K_p+L]$ (shown at the block 863), and their product $K_q/(\tau s+1)[(K_c+K_p\tau)s+K_p+L]$, are excessively non-single-valued. Thus, such power steering systems have extremely small values of gain for low values of input torque—which are concomitant with a significant range of values of system input error angle $\theta_e$. This results in a "soft-backlash" like static performance characteristic at low input torque values for such systems. The end result is a vague relationship between driver inputs, as measured by physical error signal values, and dirigible wheel angle $\theta_w$.

Thus, a vehicle equipped with a power steering system incorporating a rotary valve is subject to unwanted perturbations of the dirigible wheel angle, $\theta_e$, via any source of disturbing torque $T_d$ (as introduced at the summing point 797 shown in FIG. 29B). This is evidenced by swerving when encountering street car tracks and the like—or by excessive front-end chatter when encountering uneven road surfaces with such a vehicle.

In vehicles equipped with any of the torque reaction valves (or backlash-free manual steering for that matter), no such unwanted perturbations of the dirigible wheel angle occur. With the torque reaction valves 210 and 260, and the improved torque reaction valve 710, this is because significant gain values are present at very small physical error signal values. With the improved torque reaction valves 760 and 786, this characteristic is further enhanced because they additionally incorporate "center-point" feel via their input and output members being locked together by the modified "clothespin" springs 762 at low input torque values.

In power steering systems incorporating a rotary valve, the gain of the valve becomes so high at high values of steering load that the system can become unstable and oscillate. This is known as "valve-buzz" in the industry and it is artificially precluded by introducing Coulomb friction between the input and output valve elements. Since the maximum gain of any of the torque reaction valves is limited by linear elements (i.e., spring stiffnesses), maximum values of gain in torque reaction valves are known values which are determined via selective design of the valves themselves. Thus, power steering systems which incorporate torque reaction valves are stable by design.

In power steering systems incorporating a rotary valve, dynamic performance varies dramatically with steering load. At higher values of steering load the dynamic performance characteristics become tactilely unstable for a driver. On the other hand, in power steering systems incorporating any of the torque reaction valves, the dynamic performance characteristics are predictable and tactilely stable for a driver.

In power steering systems incorporating known types of reaction valves (such as a "star" valve), there is no element serving the function of the torsion spring 213. Further, there is no controlled flow restrictor equivalent to the control element 1/R shown at the block 817. Thus, the gain of such power steering systems is also excessively non-single-valued and subject to many of the non-linear behavior characteristics described above with respect to power steering systems incorporating rotary valves.

In power steering systems incorporating known types of reaction valves, gain becomes very high at high values of steering load and these systems can also become unstable and oscillate. This is generally precluded by choosing high values of stiffness for a "feedback" spring (which spring actually serves the same function as the torsion bar extension 712) coupled with valve designs wherein relatively long valve motions occur. (Such a "feedback" spring is shown by part designation number 35 in FIG. 6 of the aforementioned U.S. Pat. No. 4,217,932. And, as can be seen generally in FIG. 2 of U.S. Pat. No. 4,217,932, the various orifices utilized by the "star" valve described therein are narrow and thus are required to have relatively long travel motions.) Generally, it is not possible to selectively design such known types of reaction valves for optimum static and dynamic performance.

And, in power steering systems incorporating known types of reaction valves, dynamic performance also varies dramatically with steering load. One undesirable characteristic is that the real part (i.e., resistive part) of steering wheel impedance is relatively low. Thus, quick torque inputs, such as those typical by a driver under emergency conditions, are not tactilely opposed by the steering system. Because this condition is inherent in a power steering system incorporating any of the torque reaction valves, skidding under such conditions—especially on low traction surfaces such as ice or snow—is less likely in a vehicle so equipped.

I claim:

1. An apparatus for generating an output force from an input torque, said output force comprised of first and second forces and said input torque comprised of first and second torques, the onset of said second force and said second torque being delayed until said first force and said first torque reach their respective maximum values, said apparatus comprising:
   an input shaft operable to receive said input torque;
   means for generating said first force including:
   first output means for mechanically converting said first torque value into said first force, and
   preloaded biasing means operable to couple said first torque from said input shaft to said first output means;
   means for generating said second force including:
   means for receiving said second torque from said input shaft and generating a hydraulic fluid pressure in response thereto, said means for receiving said second torque comprising a flow control valve including a first valve member coupled to said input shaft and a second valve member supported for rotation relative to said first valve member, said second valve member being in fluid communication with said first valve member such that said first and second valve members are operable to generate said hydraulic fluid pressure;
   first coupling means for compliantly coupling said second valve member to a reference position,
   reference means for establishing said reference position, said reference means comprising a pinion shaft operably associated with said first output means, and
   means for generating said second force in response to said hydraulic fluid pressure generated by said flow control valve;
   second coupling means for compliantly coupling said input shaft to said second valve member, and wherein said preloaded biasing means is a spring member operably coupling said pinion shaft to said input shaft to inhibit relative compliance therebetween until said first torque exceeds it maximum value; and
   said pinion shaft and said first valve member each having a slot such that said spring member is operable to engage each of said slots for providing a preselected preload therebetween.

2. The apparatus of claim 1, wherein said spring comprises a helically coiled portion and two leg portions, each of said leg portions of said spring having a "V"-shaped portion.

3. The apparatus of claim 2, wherein said "V"-shaped portions of said leg portions are operable to engage each of said slots.

4. A method for allowing an operator of a power assisted steering system to generate an output steering force comprising the steps of:
   delivering an input torque to an input member which mechanically communicates with a first valve member;
   supporting a second valve member for rotation relative to said first valve member;
   compliantly coupling said second valve member to a reference member;
   mechanically coupling said reference member to an output member;
   compliantly coupling said second valve member to said input shaft;
   rotating said first valve member with respect to said second valve member so as to generate a hydraulic fluid pressure;

generating a preloaded biasing force on said first valve member and said second valve member for inhibiting relative compliant movement between said input member and said reference member until said input torque exceeds a preselected value for overcoming said biasing force, said preloaded biasing force being generated by operably disposing a torsion spring in engagement with said reference member and said first valve member to produce said preloaded biasing force therebetween, said torsion spring having a helically coiled portion and two legs which are operable to engage aligned slots extending through said reference member and said first valve member; and generating an output steering force in response to said hydraulic pressure in which the ratio of said output steering force to said input torque is variable.

5. The method of claim 4, wherein said first compliant coupling step includes securing a first end of a torsion bar to said reference member and a second end to said input member, said second compliant coupling step includes securing an intermediate portion of said torsion bar to said second valve member.

6. The method of claim 4, wherein said supporting step comprises providing hydrostatic bearing means operable to support said second valve member with respect to said first valve member for relative rotation therebetween.

7. The method of claim 6, wherein said hydrostatic bearing means is interposed between spherical seat surfaces formed in facing relation on said first and second valve members.

8. An apparatus for generating an output force form an input torque, the ratio of said output force to said input torque being variable, said apparatus comprising:
an input shaft operable to receive said input torque;
a flow control valve assembly adapted to generate hydraulic reaction torque, said valve assembly including a first valve member mechanically coupled to said input shaft, and a second valve member in fluid communication with said first valve member, said first and second valve members operable for generating a hydraulic fluid pressure in response to said input torque;
a rack assembly having a gear rack and a piston, said piston operable to convert said hydraulic fluid pressure into said output force;
a pinion shaft adapted to define a reference position, said pinion shaft having a gear disposed thereon which meshingly engages said gear rack;
a torsion bar having a first end fixedly secured to said pinon shaft and an intermediate portion fixedly secured to said second valve member whereby said torsion bar is adapted to compliantly couple said pinion shaft to said second valve member;
torsion bar extension means for compliantly coupling said second valve member to said input shaft, said torsion bar extension means including a second end of said torsion bar being fixedly secured to said input shaft, said input torque being divided between said second end of said torsion bar and a hydraulic interface between said first and second valve members such that non-linearly increasing hydraulic reaction torque is concomitant with increasing input torque applied to said input shaft; and preloaded spring means operable to couple said pinion shaft to said input shaft in a preselected rotational orientation such that relative compliance therebetween is inhibited until the magnitude of said input torque exceeds a preselected load exerted by said preloaded spring means, said preloaded spring means including a torsion spring operably coupled between said pinion shaft and said first valve member, each of said pinion shaft and said first valve member having a slot adapted to retain and preload said torsion spring, whereby upon said input torque exceeding said preselected load said hydraulic reaction torque acts to increase non-linearly concomitantly with increasing input torque.

9. The apparatus of claim 8, wherein said torsion spring has a helically coiled portion and two leg members which are adapted to engage said slots, said coiled portion concentrically surrounding said torsion bar between said first end and said intermediate portion thereof.

10. The apparatus of claim 9, wherein said flow control valve assembly is an open-center four-way valve assembly for controlling movement of said piston in a double-acting utilization device, said four-way valve assembly comprising:
said first valve member having identically numbered pluralities of axially oriented internal inlet and return slots therebetween first and second output zones are alternately disposed,
said second valve member having identical numbered pluralities of external input and return ridges each disposed in radial juxtaposition to one of said input or return slots of said first valve member, respectively,
a peripheral surface defining the radial extent of each input ridge which is tangentially narrower than an exit mouth of its respective juxtaposed input slot, thus forming first and second sets of axially disposed input orifices for metering incoming fluid flow between said input slots and said first and second output zones, respectively,
a peripheral surface defining the radial extent of each return ridge which is tangentially narrower than an entrance mouth of its respective juxtaposed return slot, thus forming first and second sets of axially disposed return orifices for metering returning fluid flow between said first and second output zones, respectively, and said return slots,
peripheral surfaces of said input and return ridges being formed at slightly smaller radii than male corner edges defining said input and return slots, respectively,
said first and second valve members are mechanically adapted for relative tangential motion therebetween, and
said male corner edges defining said return slot entrance mouths are formed at larger radii than said male corner edges defining said inlet slot exit mouths, whereby differential pressure values present in said first and second output zones are enabled to generate reaction torque values in a feedback manner.

* * * * *

UNITED STATES PATENT AND TRADEMARK OFFICE
CERTIFICATE OF CORRECTION

PATENT NO. : 5,103,715
DATED : April 14, 1992
INVENTOR(S) : Edward H. Phillips

It is certified that error appears in the above-identified patent and that said Letters Patent is hereby corrected as shown below:

Column 14, line 49, "$P_d$(lbs/in.)" should be --$P_d$(lbs/in.$^2$)--

Column 14, line 50, "$Q_d$(in.$^3$sec.)" should be --$Q_d$(in.$^3$/sec.)--

Column 14, line 50, "ted" should be --illustrated--

Column 15, line 4, "valve" (second occurrence) should be --value--

Column 18, line 34, "($dX_m dt$)" should be --($dX_m/dt$)--

Column 19, line 10, "$A_v$ .1" should be --$A_v=.1$--

Column 20, line 22, after "pressure", insert --)--

Column 20, line 38, after "pressure", insert --)--

Column 21, line 68, "$(X_o+X_v)^3$" (first occurrence) should be --$(X_o-X_v)^3$--

Column 24, line 33, "667" should be --767--

Column 26, line 43, "Kfis" should be --$K_f$ is--

Column 28, line 3, "These" should be --There--

Column 29, line 34, "$B_o R_o$" should be --$B_o/R_o$--

UNITED STATES PATENT AND TRADEMARK OFFICE
CERTIFICATE OF CORRECTION

PATENT NO. : 5,103,715

DATED : April 14, 1992

INVENTOR(S) : Edward H. Phillips

It is certified that error appears in the above-identified patent and that said Letters Patent is hereby corrected as shown below:

Column 29, line 37, "$B_oR_o$" should be --$B_o/R_o$--

Column 29, line 38, "$(1=G_oH_o)$" should be --$(1+G_oH_o)$--

Column 30, line 36, "$(J_s s + B_s s)$" should be --$(J_s s^2 + B_s s)$--

Column 34, line 39, claim 1, "it" should be --its--

Column 35, line 49 claim 8, "form" should be --from--

Column 35, line 34 claim 8, "pinon" should be --pinion--

Signed and Sealed this

Twenty-sixth Day of October, 1993

Attest:

BRUCE LEHMAN

Attesting Officer

Commissioner of Patents and Trademarks